(12) United States Patent
Abdallah

(10) Patent No.: US 9,965,281 B2
(45) Date of Patent: May 8, 2018

(54) CACHE STORING DATA FETCHED BY ADDRESS CALCULATING LOAD INSTRUCTION WITH LABEL USED AS ASSOCIATED NAME FOR CONSUMING INSTRUCTION TO REFER

(71) Applicant: Intel Corporation, Santa Clara, CA (US)

(72) Inventor: Mohammad A. Abdallah, El Dorado Hills, CA (US)

(73) Assignee: INTEL CORPORATION, Santa Clara ( * ) Notice: Subject to any disclaimer, the term of this patent is extended or adjusted under 35 U.S.C. 154(b) by 0 days. days.

(21) Appl. No.: 15/357,943

(22) Filed: Nov. 21, 2016

(65) Prior Publication Data

US 2017/0139714 A1 May 18, 2017

Related U.S. Application Data

(63) Continuation of application No. 14/194,589, filed on Feb. 28, 2014, now Pat. No. 9,501,280, which is a continuation of application No. 12/514,303, filed as application No. PCT/US2007/084710 on Nov. 14, 2007, now Pat. No. 8,677,105.

(60) Provisional application No. 60/865,813, filed on Nov. 14, 2006, provisional application No. 60/865,816, filed on Nov. 14, 2006, provisional application No. 60/865,818, filed on Nov. 14, 2006, provisional application No. 60/865,820, filed on Nov. 14, 2006.

(51) Int. Cl.
*G06F 9/30* (2018.01)

(52) U.S. Cl.
CPC ........ *G06F 9/30123* (2013.01); *G06F 9/3009* (2013.01)

(58) Field of Classification Search
None
See application file for complete search history.

(56) References Cited

U.S. PATENT DOCUMENTS

| 727,487 A | 5/1903 | Swan |
|---|---|---|
| 4,075,704 A | 2/1978 | O'Leary |
| 4,245,344 A | 1/1981 | Richter |
| 4,356,550 A | 10/1982 | Katzman et al. |
| 4,414,624 A | 11/1983 | Summer, Jr. et al. |

(Continued)

FOREIGN PATENT DOCUMENTS

| CN | 1214666 A | 4/1999 |
|---|---|---|
| CN | 1305150 A | 7/2001 |

(Continued)

OTHER PUBLICATIONS

Abandonment from U.S. Appl. No. 13/824,013, dated Mar. 3, 2015, 1 page.

(Continued)

*Primary Examiner* — Eric Coleman
(74) *Attorney, Agent, or Firm* — Nicholson De Vos Webster & Elliott, LLP

(57) ABSTRACT

A unified architecture for dynamic generation, execution, synchronization and parallelization of complex instruction formats includes a virtual register file, register cache and register file hierarchy. A self-generating and synchronizing dynamic and static threading architecture provides efficient context switching.

12 Claims, 20 Drawing Sheets

Physically Segmented/Architecturally Unified Register File

(56) References Cited

U.S. PATENT DOCUMENTS

| | | |
|---|---|---|
| 4,524,415 A | 6/1985 | Mills, Jr. et al. |
| 4,527,237 A | 7/1985 | Frieder et al. |
| 4,577,273 A | 3/1986 | Hopper et al. |
| 4,597,061 A | 6/1986 | Cline et al. |
| 4,600,986 A | 7/1986 | Scheuneman et al. |
| 4,633,434 A | 12/1986 | Scheuneman |
| 4,682,281 A | 7/1987 | Woffinden et al. |
| 4,727,487 A | 2/1988 | Masui et al. |
| 4,816,991 A | 3/1989 | Watanabe et al. |
| 4,835,680 A | 5/1989 | Hogg et al. |
| 4,920,477 A | 4/1990 | Colwell et al. |
| 4,930,066 A | 5/1990 | Yokota |
| 4,943,909 A | 7/1990 | Huang |
| 5,197,130 A | 3/1993 | Chen et al. |
| 5,294,897 A | 3/1994 | Notani et al. |
| 5,317,705 A | 5/1994 | Gannon et al. |
| 5,317,754 A | 5/1994 | Blandy et al. |
| 5,339,398 A | 8/1994 | Shah et al. |
| 5,404,470 A | 4/1995 | Miyake |
| 5,469,376 A | 11/1995 | Abdallah |
| 5,471,593 A | 11/1995 | Branigin |
| 5,509,130 A | 4/1996 | Trauben et al. |
| 5,517,651 A | 5/1996 | Huck et al. |
| 5,524,090 A | 6/1996 | Iwamura |
| 5,548,742 A | 8/1996 | Wang et al. |
| 5,559,986 A | 9/1996 | Alpert et al. |
| 5,574,878 A | 11/1996 | Onodera et al. |
| 5,581,725 A | 12/1996 | Nakayama |
| 5,590,084 A | 12/1996 | Miyano et al. |
| 5,634,068 A | 5/1997 | Nishtala et al. |
| 5,649,136 A | 7/1997 | Shen et al. |
| 5,675,759 A | 10/1997 | Shebanow et al. |
| 5,699,537 A | 12/1997 | Sharangpani et al. |
| 5,710,902 A | 1/1998 | Sheaffer et al. |
| 5,724,565 A | 3/1998 | Dubey et al. |
| 5,751,982 A | 5/1998 | Morley |
| 5,752,260 A | 5/1998 | Liu |
| 5,754,818 A | 5/1998 | Mohamed |
| 5,761,476 A | 6/1998 | Martell |
| 5,787,494 A | 7/1998 | Delano et al. |
| 5,793,941 A | 8/1998 | Pencis et al. |
| 5,802,602 A | 9/1998 | Rahman et al. |
| 5,806,085 A | 9/1998 | Berliner |
| 5,813,031 A | 9/1998 | Chou et al. |
| 5,819,088 A | 10/1998 | Reinders |
| 5,829,028 A | 10/1998 | Lynch et al. |
| 5,835,951 A | 11/1998 | McMahan |
| 5,852,738 A | 12/1998 | Bealkowski et al. |
| 5,860,146 A | 1/1999 | Vishin et al. |
| 5,864,657 A | 1/1999 | Stiffler |
| 5,872,985 A | 2/1999 | Kimura |
| 5,881,277 A | 3/1999 | Bondi et al. |
| 5,901,294 A | 5/1999 | Tran et al. |
| 5,903,750 A | 5/1999 | Yeh et al. |
| 5,905,509 A | 5/1999 | Jones et al. |
| 5,911,057 A | 6/1999 | Shiell |
| 5,918,251 A | 6/1999 | Yamada et al. |
| 5,956,753 A | 9/1999 | Glew et al. |
| 5,974,506 A | 10/1999 | Sicola et al. |
| 5,983,327 A | 11/1999 | Achilles et al. |
| 6,016,533 A | 1/2000 | Tran |
| 6,016,540 A | 1/2000 | Zaidi et al. |
| 6,021,484 A | 2/2000 | Park |
| 6,065,105 A | 5/2000 | Zaidi et al. |
| 6,073,230 A | 6/2000 | Pickett et al. |
| 6,075,938 A | 6/2000 | Bugnion et al. |
| 6,088,780 A | 7/2000 | Yamada et al. |
| 6,092,172 A | 7/2000 | Nishimoto et al. |
| 6,101,577 A | 8/2000 | Tran |
| 6,108,769 A | 8/2000 | Chinnakonda et al. |
| 6,115,809 A | 9/2000 | Mattson, Jr. et al. |
| 6,134,634 A | 10/2000 | Marshall, Jr. et al. |
| 6,138,226 A | 10/2000 | Yoshioka et al. |
| 6,157,998 A | 12/2000 | Rupley, II et al. |
| 6,167,490 A | 12/2000 | Levy et al. |
| 6,170,051 B1 | 1/2001 | Dowling |
| 6,178,482 B1 * | 1/2001 | Sollars ................ G06F 9/384 711/129 |
| 6,185,660 B1 | 2/2001 | Mulla et al. |
| 6,205,545 B1 | 3/2001 | Shah et al. |
| 6,209,085 B1 | 3/2001 | Hammond et al. |
| 6,212,542 B1 | 4/2001 | Kahle et al. |
| 6,212,613 B1 | 4/2001 | Belair |
| 6,216,215 B1 | 4/2001 | Palanca et al. |
| 6,226,732 B1 | 5/2001 | Pei et al. |
| 6,247,097 B1 | 6/2001 | Sinharoy |
| 6,253,316 B1 | 6/2001 | Tran et al. |
| 6,256,727 B1 | 7/2001 | McDonald |
| 6,256,728 B1 | 7/2001 | Witt et al. |
| 6,260,131 B1 | 7/2001 | Kikuta et al. |
| 6,260,138 B1 | 7/2001 | Harris |
| 6,269,439 B1 | 7/2001 | Hanaki |
| 6,272,616 B1 | 8/2001 | Fernando et al. |
| 6,272,662 B1 | 8/2001 | Jadav et al. |
| 6,275,917 B1 | 8/2001 | Okada |
| 6,282,583 B1 | 8/2001 | Pincus et al. |
| 6,282,638 B1 | 8/2001 | Dowling |
| 6,308,323 B1 | 10/2001 | Douniwa |
| 6,321,298 B1 | 11/2001 | Hubis |
| 6,327,650 B1 | 12/2001 | Bapst et al. |
| 6,332,189 B1 | 12/2001 | Baweja et al. |
| 6,339,822 B1 | 1/2002 | Miller |
| 6,341,324 B1 | 1/2002 | Caulk, Jr. et al. |
| 6,345,357 B1 | 2/2002 | Sato |
| 6,360,311 B1 | 3/2002 | Zandveld et al. |
| 6,408,367 B2 | 6/2002 | Achilles et al. |
| 6,437,789 B1 | 8/2002 | Tidwell et al. |
| 6,449,671 B1 | 9/2002 | Patkar et al. |
| 6,457,120 B1 | 9/2002 | Sinharoy |
| 6,473,833 B1 | 10/2002 | Arimilli et al. |
| 6,490,673 B1 | 12/2002 | Heishi et al. |
| 6,502,187 B1 | 12/2002 | Miyagawa |
| 6,529,928 B1 | 3/2003 | Resnick et al. |
| 6,542,984 B1 | 4/2003 | Keller et al. |
| 6,557,083 B1 | 4/2003 | Sperber et al. |
| 6,557,095 B1 | 4/2003 | Henstrom |
| 6,594,755 B1 | 7/2003 | Nuechterlein et al. |
| 6,604,187 B1 | 8/2003 | McGrath et al. |
| 6,609,189 B1 | 8/2003 | Kuszmaul et al. |
| 6,615,340 B1 | 9/2003 | Wilmot, II |
| 6,658,549 B2 | 12/2003 | Wilson et al. |
| 6,668,316 B1 | 12/2003 | Gorshtein et al. |
| 6,681,395 B1 | 1/2004 | Nishi |
| 6,704,860 B1 | 3/2004 | Moore |
| 6,721,874 B1 * | 4/2004 | Le ................ G06F 9/30094 712/218 |
| 6,728,866 B1 | 4/2004 | Kahle et al. |
| 6,775,761 B2 * | 8/2004 | Wang ............... G06F 9/3012 712/217 |
| 6,829,698 B2 | 12/2004 | Arimilli et al. |
| 6,882,177 B1 | 4/2005 | Reddy et al. |
| 6,907,600 B2 | 6/2005 | Neiger et al. |
| 6,912,644 B1 | 6/2005 | O'Connor et al. |
| 6,920,530 B2 | 7/2005 | Musumeci |
| 6,944,744 B2 | 9/2005 | Ahmed et al. |
| 6,948,172 B1 | 9/2005 | D'Souza |
| 6,950,927 B1 | 9/2005 | Apisdorf et al. |
| 6,954,846 B2 | 10/2005 | Leibholz et al. |
| 6,985,591 B2 | 1/2006 | Graunke |
| 6,988,183 B1 | 1/2006 | Wong |
| 7,007,108 B2 | 2/2006 | Emerson et al. |
| 7,020,879 B1 | 3/2006 | Nemirovsky et al. |
| 7,047,322 B1 | 5/2006 | Bauman et al. |
| 7,111,145 B1 | 9/2006 | Chen et al. |
| 7,117,347 B2 | 10/2006 | Col et al. |
| 7,139,855 B2 | 11/2006 | Armstrong et al. |
| 7,143,273 B2 | 11/2006 | Miller et al. |
| 7,149,872 B2 | 12/2006 | Rozas et al. |
| 7,150,021 B1 | 12/2006 | Vajjhala et al. |
| 7,171,535 B2 | 1/2007 | Naoi |
| 7,206,925 B1 * | 4/2007 | Jacobson .......... G06F 9/30043 712/225 |
| 7,213,106 B1 | 5/2007 | Koster et al. |
| 7,213,248 B2 | 5/2007 | Arimilli et al. |

(56) References Cited

U.S. PATENT DOCUMENTS

| | | |
|---|---|---|
| 7,231,106 B2 | 6/2007 | Basavanhally et al. |
| 7,257,695 B2 | 8/2007 | Jiang et al. |
| 7,278,030 B1 | 10/2007 | Chen et al. |
| 7,284,092 B2 | 10/2007 | Nunamaker et al. |
| 7,290,261 B2 | 10/2007 | Burky et al. |
| 7,313,775 B2 | 12/2007 | Casey et al. |
| 7,343,476 B2 | 3/2008 | Floyd et al. |
| 7,373,637 B2 | 5/2008 | Dewitt et al. |
| 7,380,096 B1 | 5/2008 | Rozas et al. |
| 7,383,427 B2 | 6/2008 | Yamazaki |
| 7,398,347 B1 | 7/2008 | Pechanek et al. |
| 7,406,581 B2 | 7/2008 | Southwell et al. |
| 7,418,579 B2 | 8/2008 | Guibert et al. |
| 7,418,582 B1 | 8/2008 | Iacobovici et al. |
| 7,493,475 B2 | 2/2009 | Colavin |
| 7,539,879 B2 * | 5/2009 | Terechko ............... G06F 1/3203 |
| | | 713/300 |
| 7,546,420 B1 | 6/2009 | Shar et al. |
| 7,577,820 B1 | 8/2009 | Wentzlaff et al. |
| 7,634,637 B1 | 12/2009 | Lindholm et al. |
| 7,647,483 B2 | 1/2010 | Bates et al. |
| 7,680,988 B1 | 3/2010 | Nickolls et al. |
| 7,681,019 B1 | 3/2010 | Favor |
| 7,707,578 B1 | 4/2010 | Zedlewski et al. |
| 7,711,929 B2 | 5/2010 | Burky et al. |
| 7,716,460 B2 | 5/2010 | Stempel et al. |
| 7,757,065 B1 | 7/2010 | Jourdan et al. |
| 7,770,161 B2 | 8/2010 | Mitran et al. |
| 7,783,868 B2 | 8/2010 | Ukai |
| 7,783,869 B2 | 8/2010 | Grandou et al. |
| 7,809,925 B2 | 10/2010 | Mejdrich et al. |
| 7,848,129 B1 | 12/2010 | Deshpande et al. |
| 7,856,530 B1 | 12/2010 | Mu |
| 7,861,060 B1 | 12/2010 | Nickolls et al. |
| 7,877,582 B2 | 1/2011 | Gschwind et al. |
| 7,913,058 B2 | 3/2011 | Rozas et al. |
| 7,925,869 B2 | 4/2011 | Kelsey et al. |
| 8,044,951 B1 | 10/2011 | Brown et al. |
| 8,046,775 B2 | 10/2011 | Kang et al. |
| 8,082,420 B2 | 12/2011 | Comparan et al. |
| 8,108,545 B2 | 1/2012 | Arimilli et al. |
| 8,145,844 B2 | 3/2012 | Bruce |
| 8,145,880 B1 | 3/2012 | Cismas et al. |
| 8,145,882 B1 | 3/2012 | Kishore et al. |
| 8,200,949 B1 | 6/2012 | Tarjan et al. |
| 8,219,996 B1 | 7/2012 | Morris |
| 8,230,423 B2 | 7/2012 | Frigo et al. |
| 8,239,656 B2 | 8/2012 | Rozas et al. |
| 8,301,847 B2 | 10/2012 | Dantzig et al. |
| 8,316,435 B1 | 11/2012 | Varadhan et al. |
| 8,327,115 B2 | 12/2012 | Abdallah |
| 8,438,366 B2 | 5/2013 | Akizuki et al. |
| 8,522,253 B1 | 8/2013 | Rozas et al. |
| 8,539,486 B2 | 9/2013 | Cain, III et al. |
| 8,645,965 B2 | 2/2014 | Zimmer et al. |
| 8,756,329 B2 | 6/2014 | Reynolds et al. |
| 8,868,838 B1 | 10/2014 | Glasco et al. |
| 8,930,674 B2 | 1/2015 | Avudaiyappan et al. |
| 9,047,178 B2 | 6/2015 | Talagala et al. |
| 9,135,003 B2 | 9/2015 | Suh et al. |
| 2001/0016901 A1 | 8/2001 | Topham |
| 2001/0032303 A1 | 10/2001 | Pechanek et al. |
| 2001/0049782 A1 | 12/2001 | Hsu et al. |
| 2002/0029308 A1 | 3/2002 | Babaian et al. |
| 2002/0062435 A1 | 5/2002 | Nemirovsky et al. |
| 2002/0069326 A1 | 6/2002 | Richardson et al. |
| 2002/0082824 A1 | 6/2002 | Neiger et al. |
| 2002/0099913 A1 | 7/2002 | Steely et al. |
| 2002/0126657 A1 | 9/2002 | Frouin et al. |
| 2002/0129085 A1 | 9/2002 | Kubala et al. |
| 2002/0174321 A1 | 11/2002 | John et al. |
| 2002/0188833 A1 | 12/2002 | Henry et al. |
| 2003/0035422 A1 | 2/2003 | Hill |
| 2003/0065887 A1 | 4/2003 | Maiyuran et al. |
| 2003/0088752 A1 | 5/2003 | Harman |
| 2003/0093776 A1 | 5/2003 | Hilton |
| 2003/0101322 A1 | 5/2003 | Gardner |
| 2003/0101444 A1 | 5/2003 | Wu et al. |
| 2003/0126408 A1 | 7/2003 | Vajapeyam et al. |
| 2003/0131335 A1 | 7/2003 | Hamlin |
| 2003/0149862 A1 | 8/2003 | Kadambi |
| 2003/0163642 A1 | 8/2003 | Borkenhagen et al. |
| 2003/0169626 A1 | 9/2003 | Burk et al. |
| 2003/0200396 A1 | 10/2003 | Musumeci |
| 2003/0200412 A1 | 10/2003 | Peinado et al. |
| 2003/0202530 A1 | 10/2003 | Jenkins et al. |
| 2003/0225938 A1 | 12/2003 | Glasco et al. |
| 2003/0226001 A1 * | 12/2003 | Moyer ............... G06F 9/30123 |
| | | 712/228 |
| 2003/0233394 A1 | 12/2003 | Rudd et al. |
| 2004/0034762 A1 | 2/2004 | Kacevas |
| 2004/0044850 A1 | 3/2004 | George et al. |
| 2004/0064668 A1 | 4/2004 | Kjos et al. |
| 2004/0073909 A1 | 4/2004 | Arimilli et al. |
| 2004/0078538 A1 | 4/2004 | Dutt et al. |
| 2004/0093483 A1 | 5/2004 | Nguyen et al. |
| 2004/0098567 A1 | 5/2004 | Hansen et al. |
| 2004/0103251 A1 | 5/2004 | Alsup |
| 2004/0117593 A1 | 6/2004 | Uhlig et al. |
| 2004/0117594 A1 | 6/2004 | Vanderspek |
| 2004/0122887 A1 | 6/2004 | Macy |
| 2004/0138857 A1 | 7/2004 | Souza et al. |
| 2004/0139441 A1 | 7/2004 | Kaburaki et al. |
| 2004/0143727 A1 | 7/2004 | McDonald |
| 2004/0158822 A1 | 8/2004 | Sandham et al. |
| 2004/0187123 A1 | 9/2004 | Tremblay et al. |
| 2004/0193857 A1 | 9/2004 | Miller et al. |
| 2004/0205296 A1 | 10/2004 | Bearden |
| 2004/0215886 A1 | 10/2004 | Cargnoni et al. |
| 2004/0216105 A1 | 10/2004 | Burky et al. |
| 2004/0216120 A1 | 10/2004 | Burky et al. |
| 2004/0225872 A1 | 11/2004 | Bonanno et al. |
| 2005/0005085 A1 | 1/2005 | Miyanaga |
| 2005/0027961 A1 | 2/2005 | Zhang |
| 2005/0044547 A1 | 2/2005 | Gipp |
| 2005/0055504 A1 | 3/2005 | Hass et al. |
| 2005/0060457 A1 | 3/2005 | Olukotun |
| 2005/0066131 A1 | 3/2005 | Biles et al. |
| 2005/0108480 A1 | 5/2005 | Correale, Jr. et al. |
| 2005/0108715 A1 | 5/2005 | Kanai et al. |
| 2005/0114603 A1 | 5/2005 | Buti et al. |
| 2005/0120191 A1 | 6/2005 | Akkary et al. |
| 2005/0120194 A1 | 6/2005 | Kissell |
| 2005/0132145 A1 | 6/2005 | Dybsetter et al. |
| 2005/0154867 A1 | 7/2005 | DeWitt, Jr. et al. |
| 2005/0204118 A1 * | 9/2005 | Jen ............... G06F 9/30032 |
| | | 712/225 |
| 2005/0216920 A1 | 9/2005 | Tewari et al. |
| 2005/0251639 A1 | 11/2005 | Vishin et al. |
| 2005/0251649 A1 | 11/2005 | Yamazaki |
| 2005/0262270 A1 | 11/2005 | Latorre et al. |
| 2005/0289299 A1 * | 12/2005 | Nunamaker ........ G06F 9/30036 |
| | | 711/122 |
| 2005/0289530 A1 | 12/2005 | Robison |
| 2006/0004964 A1 | 1/2006 | Conti et al. |
| 2006/0026381 A1 | 2/2006 | Doi et al. |
| 2006/0026408 A1 | 2/2006 | Morris et al. |
| 2006/0036516 A1 * | 2/2006 | Glebe ............... G06Q 10/087 |
| | | 705/28 |
| 2006/0094446 A1 | 5/2006 | Duan |
| 2006/0095720 A1 | 5/2006 | Biles et al. |
| 2006/0143390 A1 | 6/2006 | Kottapalli |
| 2006/0161421 A1 * | 7/2006 | Kissell ............... G06F 9/4812 |
| | | 703/26 |
| 2006/0161921 A1 | 7/2006 | Kissell |
| 2006/0179257 A1 | 8/2006 | Chu et al. |
| 2006/0179281 A1 | 8/2006 | Jensen et al. |
| 2006/0179289 A1 | 8/2006 | Floyd et al. |
| 2006/0190707 A1 | 8/2006 | McIlvaine et al. |
| 2006/0212687 A1 | 9/2006 | Chen et al. |
| 2006/0230243 A1 | 10/2006 | Cochran et al. |
| 2006/0230253 A1 | 10/2006 | Codrescu et al. |
| 2006/0230409 A1 | 10/2006 | Frigo et al. |
| 2006/0236074 A1 | 10/2006 | Williamson et al. |

(56) References Cited

U.S. PATENT DOCUMENTS

| | | |
|---|---|---|
| 2006/0242365 A1 | 10/2006 | Ali et al. |
| 2006/0242384 A1 | 10/2006 | Ahmed et al. |
| 2006/0256641 A1 | 11/2006 | Johnstone |
| 2006/0277365 A1 | 12/2006 | Pong |
| 2006/0282839 A1 | 12/2006 | Hankins et al. |
| 2007/0006231 A1 | 1/2007 | Wang et al. |
| 2007/0074005 A1 | 3/2007 | Abernathy et al. |
| 2007/0198665 A1 | 8/2007 | De Matteis et al. |
| 2007/0214343 A1 | 9/2007 | Lindholm et al. |
| 2007/0262270 A1 | 11/2007 | Huang et al. |
| 2008/0016507 A1 | 1/2008 | Thomas et al. |
| 2008/0040724 A1 | 2/2008 | Kang et al. |
| 2008/0046666 A1 | 2/2008 | Termaine et al. |
| 2008/0052432 A1 | 2/2008 | Wilson et al. |
| 2008/0077813 A1 | 3/2008 | Keller et al. |
| 2008/0091880 A1 | 4/2008 | Vishin |
| 2008/0104598 A1 | 5/2008 | Chang |
| 2008/0109611 A1 | 5/2008 | Liu et al. |
| 2008/0126643 A1 | 5/2008 | Higuchi |
| 2008/0126771 A1 | 5/2008 | Chen et al. |
| 2008/0148237 A1 | 6/2008 | Jiang et al. |
| 2008/0184211 A1 | 7/2008 | Nickolls et al. |
| 2008/0195844 A1 | 8/2008 | Shen et al. |
| 2008/0215865 A1 | 9/2008 | Hino et al. |
| 2008/0225987 A1 | 9/2008 | Fazzi |
| 2008/0235500 A1 | 9/2008 | Davis et al. |
| 2008/0250227 A1 | 10/2008 | Linderman et al. |
| 2008/0256278 A1 | 10/2008 | Thomas et al. |
| 2008/0256330 A1 | 10/2008 | Wang et al. |
| 2008/0270758 A1 | 10/2008 | Ozer et al. |
| 2008/0270774 A1 | 10/2008 | Singh et al. |
| 2008/0282037 A1 | 11/2008 | Kusachi et al. |
| 2008/0320476 A1 | 12/2008 | Wingard et al. |
| 2009/0019264 A1 | 1/2009 | Correale, Jr. et al. |
| 2009/0031104 A1 | 1/2009 | Vorbach et al. |
| 2009/0070554 A1 | 3/2009 | Wang et al. |
| 2009/0113170 A1 | 4/2009 | Abdallah |
| 2009/0119457 A1 | 5/2009 | Latorre et al. |
| 2009/0138659 A1 | 5/2009 | Lauterbach |
| 2009/0138670 A1 | 5/2009 | Mutlu et al. |
| 2009/0150647 A1 | 6/2009 | Mejdrich et al. |
| 2009/0150890 A1 | 6/2009 | Yourst |
| 2009/0157980 A1 | 6/2009 | Bruce |
| 2009/0158017 A1 | 6/2009 | Mutlu et al. |
| 2009/0164733 A1 | 6/2009 | Kim et al. |
| 2009/0164766 A1 | 6/2009 | Suggs et al. |
| 2009/0165007 A1 | 6/2009 | Aghajanyan |
| 2009/0172344 A1 | 7/2009 | Grochowski et al. |
| 2009/0240919 A1 | 9/2009 | Alexander et al. |
| 2009/0249026 A1 | 10/2009 | Smelyanskiy et al. |
| 2009/0251476 A1 | 10/2009 | Jiao et al. |
| 2009/0282101 A1 | 11/2009 | Lim et al. |
| 2009/0287912 A1 | 11/2009 | Sendag |
| 2009/0307450 A1 | 12/2009 | Lee |
| 2009/0328053 A1 | 12/2009 | Dice |
| 2010/0058033 A1 | 3/2010 | Abernathy et al. |
| 2010/0064121 A1 | 3/2010 | Alexander et al. |
| 2010/0082912 A1 | 4/2010 | Lesartre et al. |
| 2010/0088443 A1 | 4/2010 | Riocreux et al. |
| 2010/0100690 A1 | 4/2010 | Rajamani et al. |
| 2010/0100704 A1 | 4/2010 | Hill et al. |
| 2010/0100707 A1 | 4/2010 | Mejdrich et al. |
| 2010/0115167 A1 | 5/2010 | Tardieux et al. |
| 2010/0115244 A1 | 5/2010 | Jensen et al. |
| 2010/0138607 A1 | 6/2010 | Hughes |
| 2010/0154042 A1 | 6/2010 | Miyamoto et al. |
| 2010/0161948 A1 | 6/2010 | Abdallah |
| 2010/0169578 A1 | 7/2010 | Nychka et al. |
| 2010/0169611 A1 | 7/2010 | Chou et al. |
| 2010/0205603 A1 | 8/2010 | Merten et al. |
| 2010/0211746 A1 | 8/2010 | Tsukishiro |
| 2010/0280996 A1 | 11/2010 | Gross, IV et al. |
| 2010/0286976 A1 | 11/2010 | Gao et al. |
| 2010/0299671 A1 | 11/2010 | Kinsey |
| 2010/0306503 A1 | 12/2010 | Henry et al. |
| 2010/0325394 A1 | 12/2010 | Golla et al. |
| 2011/0010521 A1 | 1/2011 | Wang et al. |
| 2011/0055479 A1 | 3/2011 | West et al. |
| 2011/0067016 A1 | 3/2011 | Mizrachi et al. |
| 2011/0082980 A1 | 4/2011 | Gschwind et al. |
| 2011/0082983 A1 | 4/2011 | Koktan |
| 2011/0093857 A1 | 4/2011 | Sydow et al. |
| 2011/0119660 A1 | 5/2011 | Tanaka |
| 2011/0153955 A1 | 6/2011 | Herrenschmidt |
| 2011/0225588 A1 | 9/2011 | Pollock et al. |
| 2012/0005462 A1 | 1/2012 | Hall et al. |
| 2012/0023318 A1 | 1/2012 | Xing et al. |
| 2012/0042105 A1 | 2/2012 | Maeda et al. |
| 2012/0042126 A1 | 2/2012 | Krick et al. |
| 2012/0066483 A1 | 3/2012 | Boury et al. |
| 2012/0089812 A1 | 4/2012 | Smith |
| 2012/0096204 A1 | 4/2012 | Auerbach et al. |
| 2012/0246450 A1 | 9/2012 | Abdallah |
| 2012/0246657 A1 | 9/2012 | Abdallah |
| 2012/0278593 A1 | 11/2012 | Clark et al. |
| 2013/0019047 A1 | 1/2013 | Podvalny et al. |
| 2013/0036296 A1 | 2/2013 | Hickey et al. |
| 2013/0046934 A1 | 2/2013 | Nychka et al. |
| 2013/0086417 A1 | 4/2013 | Sivaramakrishnan et al. |
| 2013/0097369 A1 | 4/2013 | Talagala et al. |
| 2013/0238874 A1 | 9/2013 | Avudaiyappan et al. |
| 2013/0283286 A1 | 10/2013 | Lee et al. |
| 2013/0304991 A1 | 11/2013 | Boettcher et al. |
| 2013/0311759 A1 | 11/2013 | Abdallah |
| 2013/0346699 A1 | 12/2013 | Walker |
| 2014/0032844 A1 | 1/2014 | Avudaiyappan et al. |
| 2014/0032845 A1 | 1/2014 | Avudaiyappan et al. |
| 2014/0032856 A1 | 1/2014 | Avudaiyappan et al. |
| 2014/0075168 A1 | 3/2014 | Abdallah |
| 2014/0108730 A1 | 4/2014 | Avudaiyappan et al. |
| 2014/0123145 A1 | 5/2014 | Barrow-Williams et al. |
| 2014/0156947 A1 | 6/2014 | Avudaiyappan et al. |
| 2014/0181833 A1 | 6/2014 | Bird et al. |
| 2014/0281242 A1 | 9/2014 | Abdallah et al. |
| 2014/0281411 A1 | 9/2014 | Abdallah |
| 2014/0281412 A1 | 9/2014 | Abdallah |
| 2014/0281416 A1 | 9/2014 | Abdallah |
| 2014/0281426 A1 | 9/2014 | Abdallah |
| 2014/0281427 A1 | 9/2014 | Abdallah |
| 2014/0281428 A1 | 9/2014 | Abdallah |
| 2014/0281436 A1 | 9/2014 | Abdallah |
| 2014/0282592 A1 | 9/2014 | Abdallah |
| 2014/0282601 A1 | 9/2014 | Abdallah |
| 2014/0317387 A1 | 10/2014 | Abdallah |
| 2014/0344554 A1 | 11/2014 | Abdallah |
| 2014/0373022 A1 | 12/2014 | Chan |
| 2015/0039859 A1 | 2/2015 | Abdallah |
| 2015/0046683 A1 | 2/2015 | Abdallah |
| 2015/0046686 A1 | 2/2015 | Abdallah |
| 2015/0186144 A1 | 7/2015 | Abdallah |
| 2016/0041908 A1 | 2/2016 | Avudaiyappan |
| 2016/0041913 A1 | 2/2016 | Avudaiyappan |
| 2016/0041930 A1 | 2/2016 | Avudaiyappan |
| 2016/0154653 A1 | 6/2016 | Abdallah |
| 2016/0210145 A1 | 7/2016 | Abdallah |
| 2016/0210176 A1 | 7/2016 | Abdallah |
| 2016/0371188 A1 | 12/2016 | Abdallah et al. |

FOREIGN PATENT DOCUMENTS

| | | |
|---|---|---|
| CN | 1451115 A | 10/2003 |
| CN | 1214666 C | 8/2005 |
| CN | 1713137 A | 12/2005 |
| CN | 1774709 A | 5/2006 |
| CN | 1841314 A | 10/2006 |
| CN | 1848095 A | 10/2006 |
| CN | 1881223 A | 12/2006 |
| CN | 101114218 A | 1/2008 |
| CN | 101241428 A | 8/2008 |
| CN | 101344840 A | 1/2009 |
| CN | 101449256 A | 6/2009 |
| CN | 101582025 A | 11/2009 |
| CN | 101627365 A | 1/2010 |
| CN | 101916180 A | 12/2010 |

(56) References Cited

FOREIGN PATENT DOCUMENTS

| | | | |
|---|---|---|---|
| CN | 102105864 A | 6/2011 | |
| EP | 0596636 A2 | 5/1994 | |
| EP | 0706133 A2 | 4/1996 | |
| EP | 2616928 A2 | 7/2013 | |
| GB | 2343270 A | 5/2000 | |
| KR | 20010050794 A | 6/2001 | |
| KR | 20010053622 | 6/2001 | |
| KR | 20100003309 A | 1/2010 | |
| TW | 200707284 | 3/1995 | |
| TW | 539996 B | 7/2003 | |
| TW | 544626 B | 8/2003 | |
| TW | 200401187 A | 1/2004 | |
| TW | 200405201 A | 4/2004 | |
| TW | 591530 B | 6/2004 | |
| TW | 200422949 A | 11/2004 | |
| TW | I233545 B | 6/2005 | |
| TW | I281121 B | 5/2007 | |
| TW | 200813766 A | 3/2008 | |
| TW | 200844853 A | 11/2008 | |
| TW | 200941339 A | 10/2009 | |
| TW | I315488 B | 10/2009 | |
| TW | 200949690 A | 12/2009 | |
| TW | I329437 B | 8/2010 | |
| TW | I331282 B | 10/2010 | |
| TW | I352288 B | 11/2011 | |
| TW | 201227520 A | 7/2012 | |
| TW | 201241744 A | 10/2012 | |
| TW | 201305819 A | 2/2013 | |
| WO | 9750031 A1 | 12/1997 | |
| WO | 9919793 A1 | 4/1999 | |
| WO | 0125921 A1 | 4/2001 | |
| WO | 2004114128 A2 | 12/2004 | |
| WO | 2008021434 A1 | 2/2008 | |
| WO | 2008061154 A2 | 5/2008 | |
| WO | 2009012296 A2 | 1/2009 | |
| WO | 2009101563 A1 | 8/2009 | |
| WO | 2010049585 A1 | 5/2010 | |
| WO | 2012135031 A2 | 10/2012 | |
| WO | 2012135050 A2 | 10/2012 | |

OTHER PUBLICATIONS

Advisory Action from U.S. Appl. No. 12/296,919, dated Aug. 26, 2011, 3 pages.
Alimohammad et al., "Modeling of FPGA Local/global Interconnect Resources and Derivation of Minimal Test Configuration," 2002, IEEE, Proceedings of the 17th IEEE International Symposium on Defect and Fault Tolerance in VLSI Systems, DFT'02, pp. 1-9.
Communication pursuant to Article 94(3) EPC for European Application No. 070864410, dated Mar. 16, 2012, 4 pages.
Communication pursuant to Article 94(3) EPC for European Application No. 070864410, dated Nov. 14, 2012, 4 pages.
Communication pursuant to Article 94(3) EPC for European Application No. 07811845, dated Apr. 16, 2014, 5 pages.
Communication pursuant to Article 94(3) EPC for European Application No. 07811845, dated Dec. 21, 2015, 3 pages.
Communication pursuant to Article 94(3) EPC for European Application No. 07811845 , dated Feb. 3, 2014, 5 pages.
Communication pursuant to Article 94(3) EPC for European Application No. 07811845, dated Feb. 16, 2012, 6 pages.
Communication pursuant to Article 94(3) EPC for European Application No. 07811845, dated Jan. 27, 2012, 7 pages.
Communication pursuant to Article 94(3) EPC for European Application No. 12150513, dated Apr. 16, 2013, 5 pages.
Communication pursuant to Article 94(3) EPC for European Application No. 12150513, dated Dec. 21, 2015, 4 pages.
Communication pursuant to Article 94(3) EPC for European Application No. 12150513, dated May 9, 2014, 8 pages.
Communication pursuant to Article 94(3) EPC for European Application No. 12174228, dated Jun. 11, 2013, 3 pages.
Communication pursuant to Article 94(3) EPC for European Application No. 12764627, dated Oct. 4, 2016, 4 pages.
Decision to Grant a Patent for European Application No. 07811845, dated Jun. 16, 2016, 2 pages.
Decision to Grant a Patent for European Application No. 12150513, dated Jun. 16, 2016, 2 pages.
Decision to Grant a Patent for European Application No. 12174228, dated Dec. 13, 2013, 5 pages.
Decision to Grant a Patent for Korean Application No. KR1020137027843, dated Apr. 29, 2016, 2 pages.
Decision to Grant a Patent from foreign counterpart Korean Patent Application No. 20137033565, dated Apr. 29, 2016, 2 pages.
Decision to Grant a Patent from foreign counterpart Korean Patent Application No. 20137033566, dated Apr. 29, 2016, 2 pages.
Extended European Search Report for Application No. 07811845.2, dated Nov. 2, 2009, 7 pages.
Extended European Search Report for Application No. 07864410, dated Feb. 19, 2010, 8 pages.
Extended European Search Report for Application No. 12150513, dated Jun. 19, 2012, 8 pages.
Extended European Search Report for Application No. 12174228, dated Oct. 16, 2012, 4 pages.
Extended European Search Report for Application No. 12174229, dated Jul. 4, 2014, 10 pages.
Extended European Search Report for Application No. 12174229, dated Oct. 10, 2012, 7 pages.
Extended European Search Report for Application No. 12788989, dated May 12, 2016, 9 pages.
Extended European Search Report for Application No. 12789667, dated Feb. 26, 2016, 7 pages.
Extended European Search Report for Application No. EP110826042, dated Jan. 24, 2014, 6 pages.
Extended European Search Report for Application No. EP11876128, dated Jun. 21, 2016, 8 pages.
Extended European Search Report for Application No. EP12764627, dated Jul. 10, 2014, 5 pages.
Final Office Action from U.S. Appl. No. 12/296,919, dated Jun. 14, 2011, 7 pages.
Final Office Action from U.S. Appl. No. 12/296,919, dated Oct. 22, 2010, 7 pages.
Final Office Action from U.S. Appl. No. 12/514,303, dated Jan. 24, 2013, 11 pages.
Final Office Action from U.S. Appl. No. 13/428,440, dated Dec. 24, 2014, 19 pages.
Final Office Action from U.S. Appl. No. 13/475,708, dated Jun. 9, 2016, 35 pages.
Final Office Action from U.S. Appl. No. 13/475,708, dated May 8, 2015, 23 pages.
Final Office Action from U.S. Appl. No. 13/475,739, dated Feb. 4, 2015, 12 pages.
Final Office Action from U.S. Appl. No. 13/475,739, dated Nov. 23, 2015, 28 pages.
Final Office Action from U.S. Appl. No. 14/194,589, dated Apr. 19, 2016, 7 pages.
Final Office Action from U.S. Appl. No. 14/212,203, dated Dec. 13, 2016, 20 pages.
Final Office Action from U.S. Appl. No. 14/212,533, dated Jan. 4, 2017, 27 pages.
Final Office Action from U.S. Appl. No. 14/213,692, dated Jan. 20, 2016, 18 pages.
Final Office Action from U.S. Appl. No. 14/360,284, dated Mar. 1, 2017, 10 pages.
First Office Action from foreign counterpart China Patent Application No. CN201280034725, dated Oct. 26, 2015, 26 pages.
First Office Action from foreign counterpart China Patent Application No. CN201280034739, dated Nov. 3, 2015, 39 pages.
First Office Action from foreign counterpart China Patent Application No. CN201310589048, dated Feb. 2, 2016, 8 pages.
Franklin et al., "The Expandable Split Window Paradigm for Exploiting Fine-Grain Parallelism," ACM Sigarch Computer Architecture News, ACM Special Interest Group on Computer Architecture, vol. 20 (2), 1992, 10 pages.

(56) References Cited

OTHER PUBLICATIONS

Intention to Grant a patent for European Application No. 07811845, dated Mar. 31, 2016, 58 pages.
Intention to Grant a patent for European Application No. 12150513, dated Mar. 15, 2016, 59 pages.
International Preliminary Report on Patentability and for Application No. PCT/US2007/084710, dated May 19, 2009, 4 pages.
International Preliminary Report on Patentability and Written Opinion for Application No. PCT/US2007/066536, dated Oct. 14, 2008, 6 pages.
International Preliminary Report on Patentability and Written Opinion for Application No. PCT/US2012/038711, dated Nov. 20, 2013, 5 pages.
International Preliminary Report on Patentability and Written Opinion for Application No. PCT/US2012/038713, dated Nov. 20, 2013, 5 pages.
International Preliminary Report on Patentability for Application No. PCT/US2011/051992, dated Mar. 28, 2013, 8 pages.
International Preliminary Report on Patentability for Application No. PCT/US2011/061953, dated Jun. 5, 2014, 7 pages.
International Preliminary Report on Patentability for Application No. PCT/US2012/30360, dated Oct. 10, 2013, 6 pages.
International Preliminary Report on Patentability for Application No. PCT/US2014/024608, dated Sep. 24, 2015, 8 pages.
International Preliminary Report on Patentability for Application No. PCT/US2014/024722, dated Sep. 24, 2015, 6 pages.
International Search Report and Written Opinion for Application No. PCT/US2007/084710, dated May 22, 2008, 6 pages.
International Search Report and Written Opinion for Application No. PCT/US2011/051992, dated Mar. 28, 2012, 11 pages.
International Search Report and Written Opinion for Application No. PCT/US2011/061953, dated Jul. 24, 2012, 8 pages.
International Search Report and Written Opinion for Application No. PCT/US2012/30360, dated Oct. 29, 2012, 7 pages.
International Search Report and Written Opinion for Application No. PCT/US2014/024608, dated Jul. 31, 2014, 9 pages.
International Search Report and Written Opinion for Application No. PCT/US2014/024722, dated Jun. 27, 2014, 7 pages.
International Search Report for Application No. PCT/US2007/066536, dated Jul. 30, 2008, 2 pages.
International Search Report for Application No. PCT/US2012/038711, dated Nov. 28, 2012, 3 pages.
International Search Report for Application No. PCT/US2012/038713, dated Oct. 29, 2012, 3 pages.
Kozyrakis et al., "A New Direction for Computer Architecture Research," IEEE, Nov. 1, 1998, vol. 31 (11), pp. 24-32.
Mogul J.C., et al., "Potential benefits of delta encoding and data compression for HTTP,", Oct. 1, 1997, ACM, SIGCOMM '97, pp. 181-194.
Nagarajan et al., "A Design Space Evaluation of Grid Processor Architectures," 34th ACM/IEEE International Symposium, Piscataway, NJ, Dec. 1-5, 2001, pp. 40-51.
Nanda A.K., et al., "The Misprediction Recovery Cache," International Journal of Parallel Programming, Plenum Publishing Corporation, 1998, vol. 26 (4), pp. 383-415.
Non-Final Office Action from U.S. Appl. No. 12/296,919, dated Apr. 7, 2011, 8 pages.
Non-Final Office Action from U.S. Appl. No. 12/296,919, dated Jun. 14, 2010, 7 pages.
Non-Final Office Action from U.S. Appl. No. 12/296,919, dated Mar. 7, 2012, 7 pages.
Non-Final Office Action from U.S. Appl. No. 12/514,303, dated Jun. 27, 2013, 7 pages.
Non-Final Office Action from U.S. Appl. No. 12/514,303, dated May 10, 2012, 9 pages.
Non-Final Office Action from U.S. Appl. No. 13/428,440, dated Jun. 18, 2014, 16 pages.
Non-Final Office Action from U.S. Appl. No. 13/428,440, dated May 4, 2015, 13 pages.
Non-Final Office Action from U.S. Appl. No. 13/475,708, dated Feb. 11, 2015, 27 pages.
Non-Final Office Action from U.S. Appl. No. 13/475,708, dated Feb. 12, 2016, 37 pages.
Non-Final Office Action from U.S. Appl. No. 13/475,739, dated May 21, 2015, 14 pages.
Non-Final Office Action from U.S. Appl. No. 13/475,739, dated Sep. 2, 2014, 15 pages.
Non-Final Office Action from U.S. Appl. No. 13/691,609, dated Jan. 15, 2014, 5 pages.
Non-Final Office Action from U.S. Appl. No. 13/691,609, dated Sep. 5, 2013, 11 pages.
Non-Final Office Action from U.S. Appl. No. 14/194,589, dated Nov. 19, 2015, 12 pages.
Non-Final Office Action from U.S. Appl. No. 14/212,203, dated Sep. 8, 2016, 52 pages.
Non-Final Office Action from U.S. Appl. No. 14/212,533, dated Sep. 22, 2016, 52 pages.
Non-final Office Action from U.S. Appl. No. 14/213,692, dated Aug. 24, 2015, 30 pages.
Non-final Office Action from U.S. Appl. No. 14/213,692, dated Jun. 13, 2016, 17 pages.
Non-final Office Action from U.S. Appl. No. 14/360,284, dated Oct. 21, 2016, 32 pages.
Notice of Allowance from foreign counterpart Chinese Patent Application No. 200780046679, dated Feb. 6, 2017, 8 pages.
Notice of Allowance from U.S. Appl. No. 12/296,919, dated Jul. 27, 2012, 6 pages.
Notice of Allowance from U.S. Appl. No. 12/514,303, dated Oct. 25, 2013, 12 pages.
Notice of Allowance from U.S. Appl. No. 13/428,440, dated Feb. 26, 2016, 10 pages.
Notice of Allowance from U.S. Appl. No. 13/428,440, dated Nov. 16, 2016, 9 pages.
Notice of Allowance from U.S. Appl. No. 13/428,440, dated Nov. 20, 2015, 9 pages.
Notice of Allowance from U.S. Appl. No. 13/475,708, dated Oct. 13, 2016, 17 pages.
Notice of Allowance from U.S. Appl. No. 13/475,739, dated Aug. 3, 2016, 11 pages.
Notice of Allowance from U.S. Appl. No. 13/475,739, dated Mar. 25, 2016, 25 pages.
Notice of Allowance from U.S. Appl. No. 13/691,609, dated Aug. 6, 2014, 11 pages.
Notice of Allowance from U.S. Appl. No. 13/691,609, dated Feb. 23, 2015, 16 pages.
Notice of Allowance from U.S. Appl. No. 14/194,589, dated Jul. 27, 2016, 7 pages.
Notice of Allowance from U.S. Appl. No. 14/213,692, dated Dec. 23, 2016, 19 pages.
Notification of Reason for Refusal from foreign counterpart Korean Patent Application No. 20137033565, dated Sep. 30, 2015, 6 pages.
Notification of Reason for Refusal from foreign counterpart Korean Patent Application No. 20137033566, dated Sep. 30, 2015, 9 pages.
Notification of Reason for Refusal from foreign counterpart Korean Patent Application No. KR1020137027843, dated Sep. 30, 2015, 8 pages.
Notification to Grant Patent Right for Invention from foreign counterpart China Patent Application No. CN201280034725, dated Aug. 12, 2016, 3 pages.
Notification to Grant Patent Right for Invention from foreign counterpart China Patent Application No. CN201310589048, dated May 5, 2016, 3 pages.
Nuth et al., "The Named-State Register File: Implementation and Performance," High-Performance Computer Architecture, First IEEE Symposium, 1995, 10 pages.
Office Action from foreign counterpart Chinese Patent Application No. 200780046679, dated May 21, 2013, 14 pages.
Restriction Requirement from U.S. Appl. No. 12/296,919, dated Feb. 8, 2011, 4 pages.
Restriction Requirement from U.S. Appl. No. 12/514,303, dated Oct. 15, 2012, 4 pages.

(56) References Cited

OTHER PUBLICATIONS

Rixner et al., "Register Organization for Media Processing," IEEE, 2000.
Santos et al., "The 2D-VLIW Architecture," Mar. 2006, 13 pages.
Sassone et al., "Dynamic Strands: Collapsing Speculative Dependence Chains for Reducing Pipeline Communication," Microarchitecture, IEEE, 37th International Symposium on Portland, USA Dec. 2004, Piscataway, NJ, USA.
Search Report for Chinese Application No. CN201280024012, dated May 19, 2016, 2 pages.
Second Office Action from foreign counterpart China Patent Application No. 201180076244, dated Nov. 18, 2016, 19 pages.
Second Office Action from foreign counterpart China Patent Application No. CN201280034725, dated Apr. 14, 2016, 8 pages.
Second Office Action from foreign counterpart China Patent Application No. CN201280034739, dated Jun. 23, 2016, 44 pages.
Shiliang Hu., et al., "An Approach for Implementing Efficient Superscalar CISC Processors," High Performance Computer Architecture, 2006, Twelfth International Symposium on Austin, Texas Feb. 11-15, 2006, pp. 40-51.
Summons to attend Oral Proceedings for European Application No. 070864410, mailed Apr. 3, 2013, 3 pages.
Third Office Action from foreign counterpart Chinese Patent Application No. 201280034739, dated Dec. 27, 2016, 18 pages.
Wallace S., et al.,"Multiple Branch and Block Prediction," Third International symposium on High-Performance computer Architecture, IEEE, Feb. 1997, pp. 94-103.
Written Opinion for Application No. PCT/US2007/066536, dated Jul. 30, 2008, 5 pages.
Ye J., et al.,"A New Recovery Mechanism in Superscalar Microprocessors by Recovering Critical Misprediction," IEICE Transactions on Fundamentals of Electronics, Communications and Computer Sciences, 2011, vol. E94-A (12), pp. 2639-2648.
Yeh T., et al.,"Increasing the Instruction Fetch Rate via Multiple Branch Prediction and a Branch Address Cache," 7th International Conference on Supercomputing, ACM, 1993, pp. 67-76.
Communication pursuant to Rules 161(2) and 162 EPC for U.S. Appl. No. 12/763,717, dated Nov. 22, 2013, 3 pages.
Communication pursuant to Rules 70(2) and 70a(2) EPC for U.S. Appl. No. 12/763,717, dated Oct. 10, 2014, 1 page.
Decision to Grant a Patent for Korean Patent Application No. 20137027842, dated Mar. 31, 2016, 2 pages.
Examination Report for European Application No. 12763717, dated Nov. 28, 2016, 5 pages.
Extended European Search Report for Application No. EP12763717, dated Sep. 24, 2014, 5 pages.
Extended European Search Report for Application No. EP12764838, dated Jul. 10, 2014, 5 pages.
Final Office Action from U.S. Appl. No. 13/428,438, dated Dec. 24, 2014, 17 pages.
Final Office Action from U.S. Appl. No. 13/428,452, dated Dec. 24, 2014, 20 pages.
Final Office Action from U.S. Appl. No. 14/213,115, dated Feb. 3, 2015, 11 pages.
Final Office Action from U.S. Appl. No. 14/213,115, dated Mar. 7, 2016, 18 pages.
Final Office Action from U.S. Appl. No. 14/213,854, dated Nov. 9, 2015, 19 pages.
Final Office Action from U.S. Appl. No. 14/214,045, dated Aug. 29, 2016, 14 pages.
First Office Action from foreign counterpart Chinese Patent Application No. 201280024054.0, dated May 30, 2016, 24 pages.
First Office Action from foreign counterpart Chinese patent application No. 201280024095, dated May 26, 2016, 32 pages.
International Preliminary Report on Patentability for Application No. PCT/US2012/030383, dated Oct. 10, 2013, 6 pages.
International Preliminary Report on Patentability for Application No. PCT/US2012/030409, dated Oct. 10, 2013, 6 pages.
International Preliminary Report on Patentability for Application No. PCT/US2014/024276, dated Sep. 24, 2015, 6 pages.
International Search Report and Written Opinion for Application No. PCT/US2012/030383, dated Oct. 25, 2012, 8 pages.
International Search Report and Written Opinion for Application No. PCT/US2012/030409, dated Oct. 12, 2012, 7 pages.
International Search Report and Written Opinion for Application No. PCT/US2014/024276, dated Jul. 31, 2014, 7 pages.
Non-Final Office Action from U.S. Appl. No. 13/428,438, dated Apr. 24, 2014, 15 pages.
Non-Final Office Action from U.S. Appl. No. 13/428,438, dated May 1, 2015, 12 pages.
Non-Final Office Action from U.S. Appl. No. 13/428,452, dated Apr. 23, 2015, 11 pages.
Non-Final Office Action from U.S. Appl. No. 13/428,452, dated Apr. 28, 2014, 21 pages.
Non-Final Office Action from U.S. Appl. No. 14/213,115, dated Oct. 19, 2015, 24 pages.
Non-Final Office Action from U.S. Appl. No. 14/213,115, dated Sep. 22, 2014, 19 pages.
Non-Final Office Action from U.S. Appl. No. 14/213,854, dated Apr. 29, 2016, 13 pages.
Non-Final Office Action from U.S. Appl. No. 14/213,854, dated Jun. 19, 2015, 23 pages.
Non-Final Office Action from U.S. Appl. No. 14/214,045, dated Apr. 1, 2016, 61 pages.
Non-Final Office Action from U.S. Appl. No. 14/214,045, dated Dec. 19, 2016, 88 pages.
Notice of Allowance from foreign counterpart Korean Patent Application No. 20137027841, dated Mar. 31, 2016, 2 pages.
Notice of Allowance from U.S. Appl. No. 13/428,438, dated Aug. 10, 2016, 9 pages.
Notice of Allowance from U.S. Appl. No. 13/428,438, dated Dec. 29, 2016, 9 pages.
Notice of Allowance from U.S. Appl. No. 13/428,438, dated Mar. 4, 2016, 14 pages.
Notice of Allowance from U.S. Appl. No. 13/428,438, dated Nov. 6, 2015, 9 pages.
Notice of Allowance from U.S. Appl. No. 13/428,440, dated Mar. 10, 2017, 52 pages.
Notice of Allowance from U.S. Appl. No. 13/428,452, dated Oct. 21, 2015, 9 pages.
Notice of Allowance from U.S. Appl. No. 13/475,708, dated Mar. 17, 2017, 55 pages.
Notice of Allowance from U.S. Appl. No. 14/213,115, dated Jun. 27, 2016, 9 pages.
Notice of Allowance from U.S. Appl. No. 14/213,115, dated Oct. 3, 2016, 20 pages.
Notice of Allowance from U.S. Appl. No. 14/213,854, dated Oct. 7, 2016, 19 pages.
Notification of Reason for Refusal from Foreign Counterpart Korean Patent Application No. 10-2013-7027842, dated Sep. 18, 2015, 7 pages.
Notification of Reason for Refusal from foreign counterpart Korean Patent Application No. 20137027841, dated Sep. 18, 2015, 10 pages.
Office Action from foreign counterpart Chinese patent application No. 201280024012, dated Feb. 3, 2017, 20 pages.
Office Action from foreign counterpart Chinese patent application No. 201280024095, dated Feb. 4, 2017, 31 pages.
Office Action from foreign counterpart European Patent Application No. EP12764838, dated Oct. 4, 2016, 4 pages.
Second Office Action from foreign counterpart Chinese Patent Application No. 201280024054.0, dated Dec. 26, 2016, 11 pages.
Extended European Search Report for Application No. 16196777.3, dated Mar. 20, 2017, 6 pages.
Final Office Action from U.S. Appl. No. 14/213,218, dated Jul. 6, 2016, 24 pages.
Final Office Action from U.S. Appl. No. 14/213,218, dated Jul. 22, 2015, 16 pages.
Final Office Action from U.S. Appl. No. 14/214,176, dated Aug. 29, 2016, 17 pages.
Non-Final Office Action from U.S. Appl. No. 14/213,218, dated Apr. 22, 2015, 22 pages.

(56) References Cited

OTHER PUBLICATIONS

Non-Final Office Action from U.S. Appl. No. 14/213,218, dated Feb. 2, 2016, 17 pages.
Non-Final Office Action from U.S. Appl. No. 14/214,176, dated Jan. 6, 2017, 36 pages.
Non-Final Office Action from U.S. Appl. No. 14/214,176, dated Mar. 25, 2016, 25 pages.
Barham P., et al., "Xen and the Art of Virtualization," Proceedings of the ACM Symposium on Operating Systems Principles, XP002298786, Oct. 2003, pp. 164-177.
Communication pursuant to Rules 70(2) and 70a(2) EPC for European Application No. 11876314.3, dated Jul. 1, 2016, 1 page.
Cooperman G.,"Cache Basics," 2003, pp. 1-3, URL: http://www.ccs.neu.edu/course/com3200/parent/NOTES/cache-basics.html.
Extended European Search Report for Application No. 11876314.3, dated Jun. 14, 2016, 6 pages.
Final Office Action from U.S. Appl. No. 14/216,493, dated Aug. 30, 2016, 21 pages.
Final Office Action from U.S. Appl. No. 14/360,282, dated Feb. 16, 2017, 10 pages.
First Office Action and Search report from foreign counterpart China Patent Application No. 201180076248.0, dated Mar. 17, 2016, 25 pages.
Garmany J., "The Power of Indexing," archieved on Mar. 9, 2009, 7 pages.
Grant of Patent for Korean Application No. 10-2014-7016763, dated Oct. 31, 2016, 2 pages.
International Preliminary Report on Patentability for Application No. PCT/US2011/061957, dated Jun. 5, 2014, 7 pages.
International Search Report and Written Opinion for Application No. PCT/US2011/061957, dated Jul. 20, 2012, 8 pages.
Jacobson et al., "Path-based Next Trace Prediction," IEEE, 1997, pp. 14-23.
Non-Final Office Action from U.S. Appl. No. 14/215,633, dated Oct. 22, 2015, 18 pages.
Non-final Office Action from U.S. Appl. No. 14/216,493, dated Apr. 4, 2016, 26 pages.
Non-Final Office Action from U.S. Appl. No. 14/216,493, dated Mar. 29, 2017, 18 pages.
Non-Final Office Action from U.S. Appl. No. 14/360,282, dated Oct. 21, 2016, 13 pages.
Non-final Office Action from U.S. Appl. No. 15/257,593, dated Apr. 7, 2017, 37 pages.
Notice of Allowance from U.S. Appl. No. 14/215,633, dated Mar. 23, 2017, 17 pages.
Notice of Allowance from U.S. Appl. No. 14/215,633, dated May 23, 2016, 9 pages.
Notice of Allowance from U.S. Appl. No. 14/215,633, dated Sep. 29, 2016, 13 pages.
Notification of Reason for Refusal from Korean Application No. 10-2014-7016763, dated Apr. 29, 2016, 11 pages.
Restriction Requirement from U.S. Appl. No. 14/360,282, dated Jul. 28, 2016, 4 pages.
Rotenberg E., et al.,"Trace Cache: a Low Latency Approach to High Bandwidth Instruction Fetching," Apr. 11, 1996, 48 pages.
Second Office Action from foreign counterpart China Patent Application No. 201180076248.0, dated Oct. 20, 2016, 25 pages.
Extended European Search Report for Application No. 14769411.1, dated Apr. 5, 2017, 8 pages.
Final Office Action from U.S. Appl. No. 14/213,730, dated May 11, 2016, 14 pages.
Final Office Action from U.S. Appl. No. 14/216,859, dated Jun. 9, 2016, 16 pages.
First Office Action from foreign counterpart China Patent Application No. 201280024012.7, dated May 30, 2016, 21 pages.
International Preliminary Report on Patentability for Application No. PCT/US2014/024677, dated Sep. 24, 2015, 7 pages.
International Preliminary Report on Patentability for Application No. PCT/US2014/024828, dated Sep. 24, 2015, 8 pages.
International Search Report and Written Opinion for Application No. PCT/US2014/024677, dated Jun. 30, 2014, 9 pages.
International Search Report and Written Opinion for Application No. PCT/US2014/024828, dated Jul. 28, 2014, 9 pages.
Non-Final Office Action from U.S. Appl. No. 14/212,533, dated Apr. 20, 2017, 116 pages.
Non-Final Office Action from U.S. Appl. No. 14/213,730, dated Jan. 7, 2016, 27 pages.
Non-Final Office Action from U.S. Appl. No. 14/216,859, dated Jan. 28, 2016, 33 pages.
Notice of Allowance from U.S. Appl. No. 13/428,438, dated Apr. 13, 2017, 62 pages.
Notice of Allowance from U.S. Appl. No. 13/428,440, dated Apr. 20, 2017, 46 pages.
Notice of Allowance from U.S. Appl. No. 14/213,730, dated Oct. 27, 2016, 16 pages.
Notice of Allowance from U.S. Appl. No. 14/214,045, dated Apr. 18, 2017, 88 pages.
Notice of Allowance from U.S. Appl. No. 14/216,859, dated Jan. 24, 2017, 17 pages.
Notification of Reason for Refusal from foreign counterpart Korean Patent Application No. KR1020157029107, dated Oct. 13, 2016, 11 pages.
Partial Supplementary European Search Report for Application No. EP14770976.0, dated Mar. 24, 2017, 7 pages.
Advisory Action from U.S. Appl. No. 14/214,280, dated May 15, 2017, 3 pages.
Communication pursuant to Article 94(3) EPC for European Application No. 12788989.7, dated Jun. 22, 2017, 6 pages.
Decision to grant a patent from foreign counterpart Korean Patent Application No. 10-2014-7016774, dated Jul. 25, 2016, 2 pages.
Decision to Grant a Patent from foreign counterpart Korean Patent Application No. KR1020157029107, dated Apr. 25, 2017, 2 pages.
Extended European Search Report for Application No. 14770976.0, dated Jul. 3, 2017, 9 pages.
Extended European Search Report for Application No. EP11876130, dated Jun. 1, 2016, 7 pages.
Final Office Action from U.S. Appl. No. 14/213,135, dated Oct. 26, 2015, 20 pages.
Final Office Action from U.S. Appl. No. 14/216,493, dated May 22, 2017, 17 pages.
First Office Action and Search Report from foreign counterpart China Patent Application No. 201480024463.X, dated Apr. 1, 2017, 31 pages. (Translation available only for office action).
First Office Action and Search report from foreign counterpart Chinese Patent Application No. 201180076244.2, dated Mar. 22, 2016, 18 pages. (Translation available only for Office Action).
First Office Action from foreign counterpart China Patent Application No. 201180076245.7, dated Mar. 21, 2016, 10 pages.
Intel "Programming on Intel® Platform," The edition team of Intel® Software College course book, Shanghai Jiao Tong University Press, published Jan. 31, 2011, pp. 175-180.
International Preliminary Report on Patentability for Application No. PCT/US2011/061940, dated Jun. 5, 2014, 6 pages.
International Search Report and Written Opinion for Application No. PCT/US2011/061940, dated Jul. 20, 2012, 8 pages.
Non-Final Office Action from U.S. Appl. No. 14/213,135, dated May 14, 2015, 23 pages.
Non-Final Office Action from U.S. Appl. No. 14/213,135, dated May 31, 2016, 14 pages.
Non-Final Office Action from U.S. Appl. No. 14/360,280, dated Feb. 23, 2017, 34 pages.
Non-Final Office Action from U.S. Appl. No. 14/360,282, dated Jun. 22, 2017, 97 pages.
Non-Final Office Action from U.S. Appl. No. 14/733,827, dated Apr. 28, 2017, 99 pages.
Non-Final Office Action from U.S. Appl. No. 15/219,063, dated May 30, 2017, 102 pages.
Notice of Allowance from U.S. Appl. No. 13/475,708, dated Jun. 16, 2017, 51 pages.
Notice of Allowance from U.S. Appl. No. 13/475,708, dated Jun. 30, 2017, 53 pages.

(56) References Cited

OTHER PUBLICATIONS

Notice of Allowance from U.S. Appl. No. 14/213,135, dated Oct. 17, 2016, 17 pages.
Notice of Allowance from U.S. Appl. No. 14/213,218, dated Jun. 16, 2017, 89 pages.
Notice of Allowance from U.S. Appl. No. 14/214,176, dated May 10, 2017, 88 pages.
Notice of Allowance from U.S. Appl. No. 14/214,280, dated Jun. 29, 2017, 86 pages.
Notice of Allowance from U.S. Appl. No. 14/215,633, dated Jun. 30, 2017, 83 pages.
Notice of Allowance from U.S. Appl. No. 14/360,284, dated Jun. 14, 2017, 100 pages.
Notice of Allowance from U.S. Appl. No. 15/019,920, dated Jul. 14, 2017, 100 pages.
Notice of Allowance from U.S. Appl. No. 15/082,867, dated Jul. 7, 2017, 98 pages.
Notice of Final Rejection from foreign counterpart Korean Patent Application No. 10-2015-7029262, dated May 23, 2017, 7 pages.
Notice of Preliminary Rejection from foreign counterpart Korean Patent Application No. 10-2016-7017150, dated Apr. 20, 2017, 5 pages.
Notification of Reason for Refusal from foreign counterpart Korean Patent Application No. 10-2014-7016774, dated Jan. 28, 2016, 4 pages.
Notification of Reason for Refusal from foreign counterpart Korean Patent Application No. 10-2015-7029262, dated Oct. 17, 2016, 12 pages.
Notification of Reason for Refusal from foreign counterpart Korean Patent Application No. 10-2017-7002379, dated May 26, 2017, 6 pages.
Notification of Reason for Refusal from foreign counterpart Korean Patent Application No. 10-2017-7002473, dated May 26, 2017, 7 pages.
Notification to Grant Patent Right for Invention from foreign counterpart China Patent Application No. 201180076245.7, dated Nov. 2, 2016, 3 pages.
Office Action and Search Report from foreign counterpart Taiwan Patent Application No. 101117854, dated Mar. 30, 2017, 7 pages.
Third Office Action and Search report from foreign counterpart China Patent Application No. 201180076248.0, dated May 2, 2017, 27 pages.
Third Office Action from foreign counterpart Chinese Patent Application No. 201180076244.2, dated May 2, 2017, 20 pages.
Extended European Search Report for Application No. 14769450.9, dated Feb. 21, 2017, 16 pages.
Final Office Action from U.S. Appl. No. 14/214,280, dated Mar. 6, 2017, 12 pages.
Final Office Action from U.S. Appl. No. 14/214,280, dated Mar. 11, 2016, 18 pages.
Final Office Action from U.S. Appl. No. 14/214,280, dated Oct. 24, 2016, 20 pages.
Grant of Patent for Korean Application No. 10-2015-7028745, dated Nov. 30, 2016, 2 pages.
International Preliminary Report on Patentability for Application No. PCT/US2014/024775, dated Sep. 24, 2015, 6 pages.
International Search Report and Written Opinion for Application No. PCT/US2014/024775, dated Jun. 2, 2014, 7 pages.
Non-Final Office Action from U.S. Appl. No. 14/212,203, dated Mar. 24, 2017, 68 pages.
Non-Final Office Action from U.S. Appl. No. 14/214,280, dated Jan. 6, 2017, 14 pages.
Non-Final Office Action from U.S. Appl. No. 14/214,280, dated Jun. 16, 2016, 12 pages.
Non-Final Office Action from U.S. Appl. No. 14/214,280, dated Sep. 18, 2015, 18 pages.
Notification of Reason for Refusal from Korean Application No. 10-2015-7028745, dated May 23, 2016, 8 pages.
Office Action from foreign counterpart Taiwan Patent Application No. 20140109479, dated Nov. 28, 2016, 4 pages.
Partial SupplementaryEuropean Search Report for Application No. 14769450.9, dated Oct. 11, 2016, 8 pages.
Final Office Action from U.S. Appl. No. 14/212,203, dated Sep. 12, 2017, 84 pages.
Final Office Action from U.S. Appl. No. 14/212,533, dated Sep. 8, 2017, 69 pages.
Final Office Action from U.S. Appl. No. 14/360,280, dated Aug. 10, 2017, 103 pages.
Final Office Action from U.S. Appl. No. 14/360,282, dated Oct. 4, 2017, 22 pages.
Final Office Action from U.S. Appl. No. 15/219,063, dated Nov. 20, 2017, 27 pages.
Non-Final Office Action from U.S. Appl. No. 15/082,359, dated Aug. 11, 2017, 108 pages.
Non-final Office Action from U.S. Appl. No. 15/354,742, dated Aug. 25, 2017, 152 pages.
Non-Final Office Action from U.S. Appl. No. 15/354,857, dated Sep. 12, 2017, 111 pages.
Notice of Allowance from U.S. Appl. No. 13/428,438, dated Aug. 7, 2017, 42 pages.
Notice of Allowance from U.S. Appl. No. 14/213,135, dated Aug. 3, 2017, 103 pages.
Notice of Allowance from U.S. Appl. No. 14/213,692, dated Sep. 28, 2017, 112 pages.
Notice of Allowance from U.S. Appl. No. 14/213,730, dated Aug. 31, 2017, 96 pages.
Notice of Allowance from U.S. Appl. No. 14/214,045, dated Oct. 6, 2017, 137 pages.
Notice of Allowance from U.S. Appl. No. 14/214,176, dated Oct. 19, 2017, 25 pages.
Notice of Allowance from U.S. Appl. No. 14/215,633, dated Oct. 4, 2017, 15 pages.
Notice of Allowance from U.S. Appl. No. 14/216,493, dated Aug. 4, 2017, 95 pages.
Notice of Allowance from U.S. Appl. No. 14/733,827, dated Sep. 22, 2017, 30 pages.
Notice of Allowance from U.S. Appl. No. 15/257,593, dated Oct. 11, 2017, 95 pages.
Notice on Grant of Patent Right for Invention from foreign counterpart China Application No. 201180076244.2, dated Aug. 28, 2017, 4 pages.
Notice on Grant of Patent Right for Invention from foreign counterpart Chinese Patent Application No. 201280024095.X, dated Nov. 7, 2017, 6 pages.
Office Action and Search Report from foreign counterpart Taiwan Patent Application No. 100142885, dated Jan. 23, 2017, 12 pages.
Third Office Action from foreign counterpart China Patent Application No. 201280024054.0, dated Jul. 28, 2017, 8 pages.
Third Office Action from foreign counterpart Chinese Patent Application No. 201280024012.7, dated Nov. 6, 2017, 8 pages.
Final Office Action from U.S. Appl. No. 15/354,742, dated Nov. 29, 2017, 20 pages.
Final Office Action from U.S. Appl. No. 15/354,857, dated Nov. 28, 2017, 23 pages.
Fourth Office Action and Search report from foreign counterpart China Patent Application No. 201180076248.0, dated Nov. 9, 2017, 38 pages. (Translation available only for office action).
Non-Final Office Action from U.S. Appl. No. 14/360,280, dated Dec. 14, 2017, 25 pages.
Notice of Allowance and Search Report from foreign counterpart Taiwan Patent Application No. 103109479, dated Nov. 30, 2017, 4 pages. (Translation available only for Search report).
Notice of Allowance from foreign counterpart Korean Patent Application No. 10-2017-7002379, dated Dec. 20, 2017, 3 pages.
Notice of Allowance from foreign counterpart Korean Patent Application No. 10-2017-7002473, dated Dec. 20, 2017, 6 pages.
Notice of Allowance from U.S. Appl. No. 13/475,708, dated Nov. 27, 2017, 24 pages.
Notice of Allowance from U.S. Appl. No. 14/216,859, dated Dec. 1, 2017, 113 pages.
Notice of Allowance from U.S. Appl. No. 15/019,920, dated Dec. 6, 2017, 24 pages.

(56) References Cited

OTHER PUBLICATIONS

Notice of Allowance from U.S. Appl. No. 15/082,867, dated Dec. 22, 2017, 25 pages.
Notice on Grant of Patent Right for Invention from foreign counterpart Chinese Patent Application No. 201280024054.0, dated Dec. 1, 2017, 4 pages.
Second Office Action from foreign counterpart China Patent Application No. 201480024463.X, dated Nov. 14, 2017, 34 pages.

* cited by examiner

FIG. 4

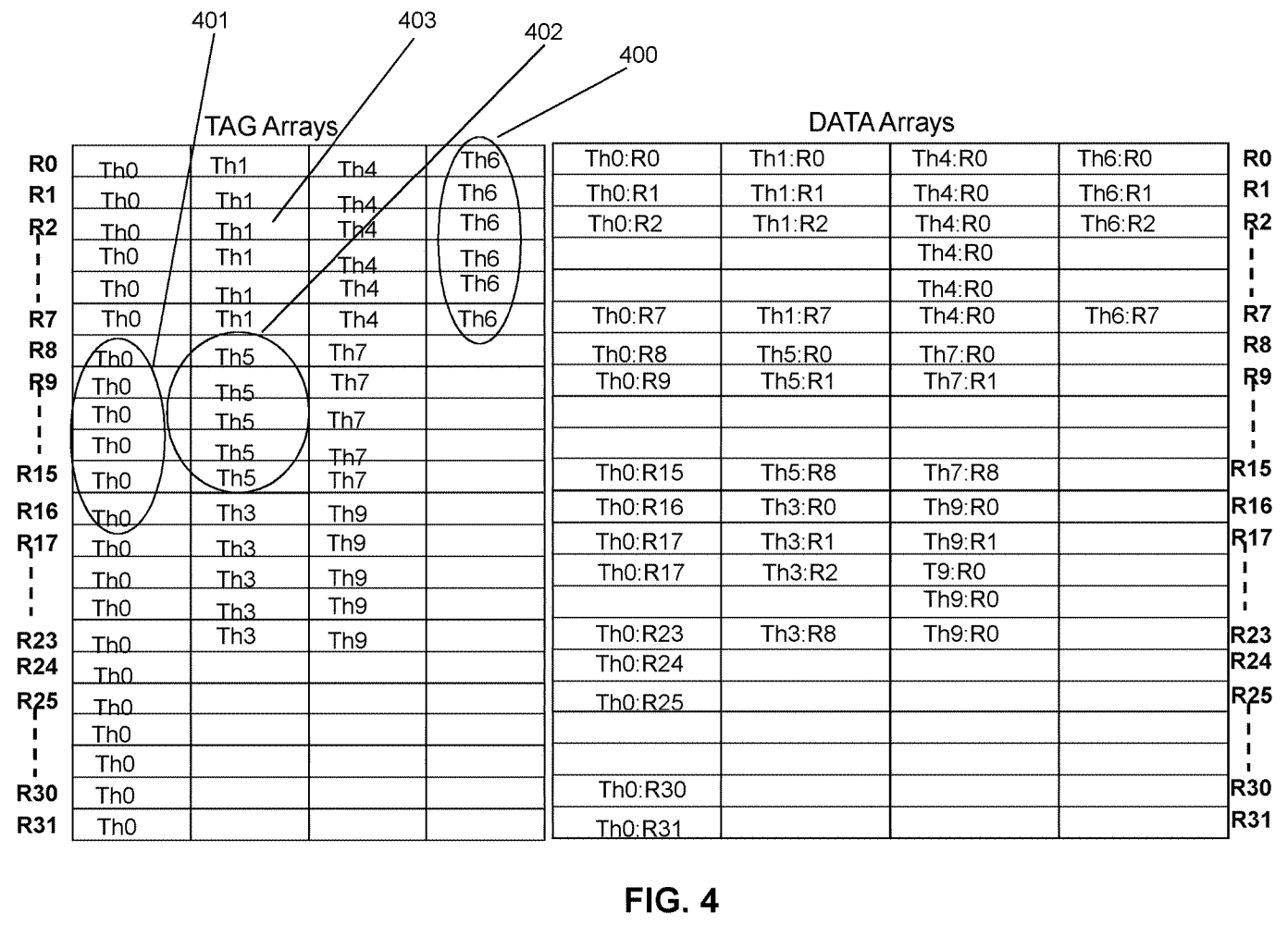

| | TAG Arrays | | | | DATA Arrays | | | |
|---|---|---|---|---|---|---|---|---|
| R0  | Th0 | Th1 | Th4 |     | Th0:R0  | Th1:R0 | Th4:R0 | Th6:R0 |
| R1  | Th0 | Th1 | Th4 | Th6 | Th0:R1  | Th1:R1 | Th4:R0 | Th6:R1 |
| R2  | Th0 | Th1 | Th4 | Th6 | Th0:R2  | Th1:R2 | Th4:R0 | Th6:R2 |
| --- | --- | --- | --- | --- | ---     | ---    | ---    | ---    |
| R7  | Th0 | Th1 | Th4 | Th6 | Th0:R7  | Th1:R7 | Th4:R0 |        |
| R8  | Th0 | Th5 | Th7 |     | Th0:R8  | Th5:R0 | Th4:R0 | Th6:R7 |
| R9  | Th0 | Th5 | Th7 |     | Th0:R9  | Th5:R1 | Th7:R0 |        |
| --- | --- | --- | --- | --- | ---     | ---    | ---    | ---    |
| R15 | Th0 | Th5 | Th7 |     | Th0:R15 | Th5:R8 | Th7:R8 |        |
| R16 | Th0 | Th3 | Th9 |     | Th0:R16 | Th3:R0 | Th9:R0 |        |
| R17 | Th0 | Th3 | Th9 |     | Th0:R17 | Th3:R1 | Th9:R1 |        |
| --- | --- | --- | --- | --- | ---     | ---    | ---    | ---    |
| R23 | Th0 | Th3 | Th9 |     | Th0:R23 | Th3:R8 | T9:R0  |        |
| R24 | Th0 |     |     |     | Th0:R24 |        | Th9:R0 |        |
| R25 | Th0 |     |     |     | Th0:R25 |        |        |        |
| --- | --- | --- | --- | --- | ---     | ---    | ---    | ---    |
| R30 | Th0 |     |     |     | Th0:R30 |        |        |        |
| R31 | Th0 |     |     |     | Th0:R31 |        |        |        |

400, 401, 402, 403

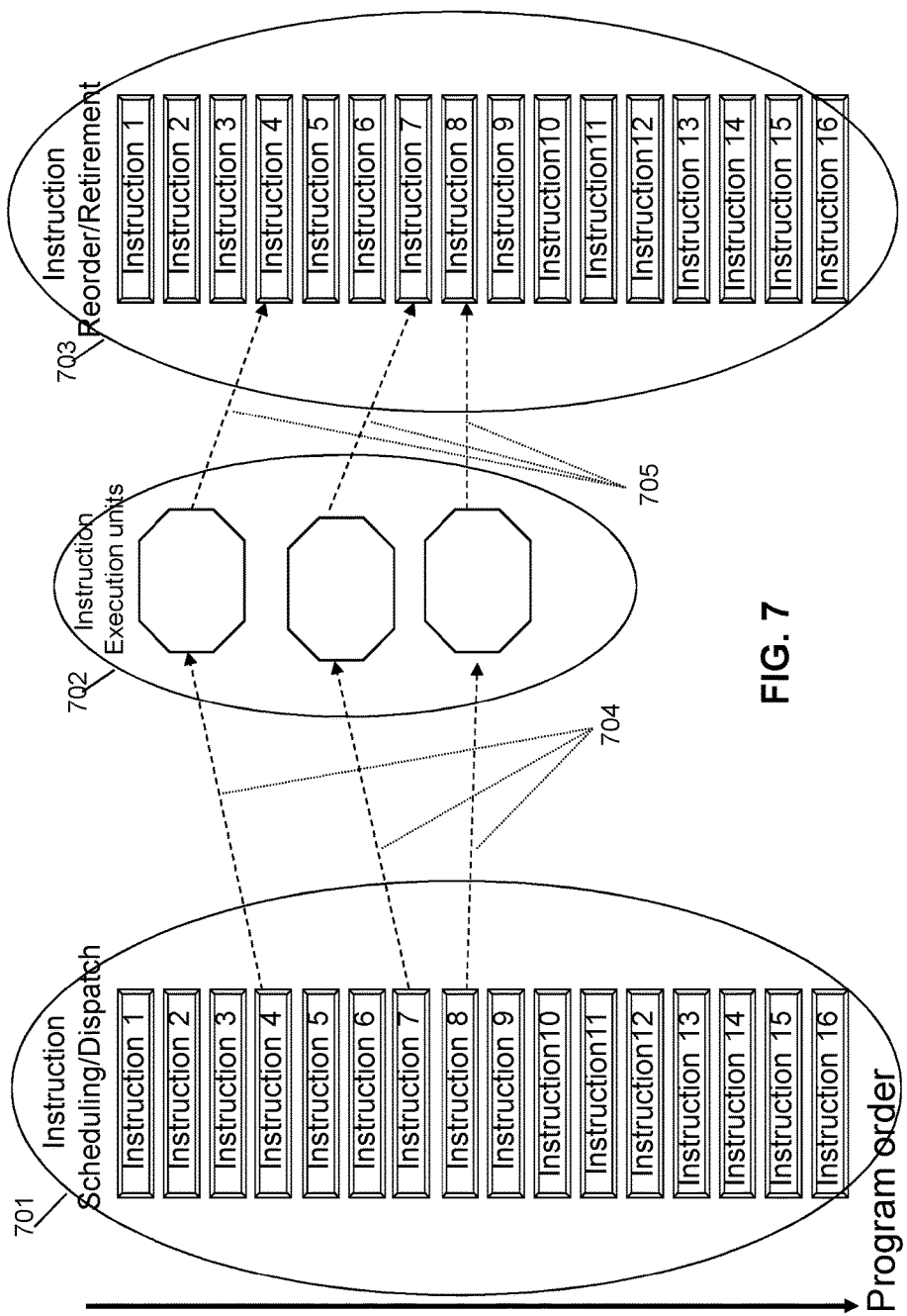

CACHE STORING DATA FETCHED BY ADDRESS CALCULATING LOAD INSTRUCTION WITH LABEL USED AS ASSOCIATED NAME FOR CONSUMING INSTRUCTION TO REFER

CROSS REFERENCE TO RELATED APPLICATIONS

This application is a continuation of U.S. patent application Ser. No. 14/194,589 filed Feb. 28, 2014 (U.S. Pat. No. 9,501,280), which is a continuation of U.S. patent application Ser. No. 12/514,303 filed Jan. 5, 2010 (U.S. Pat. No. 8,677,105), which claims priority to International Patent Application No. PCT/US2007/084710 filed Nov. 14, 2007, which claims priority to U.S. Provisional Patent Application Nos. 60/865,813, 60/865,816, 60/865,818, and 60/865,820, each filed on Nov. 14, 2006, the contents of which are incorporated herein by reference.

BRIEF DESCRIPTION OF THE INVENTION

This invention relates generally to digital circuitry. More particularly, this invention relates to improved processor designs.

BACKGROUND OF THE INVENTION

Processors are required to handle multiple tasks that are either dependent or totally independent. The internal state of such processors usually consists of registers that might hold different values at each particular instant of program execution. At each instant of program execution, the internal state image is called the architecture state of the processor.

When code execution is switched to run another function (e.g., another thread, process or program), then the state of the machine/processor has to be saved so that the new function can utilize the internal registers to build its new state. Once the new function is terminated then its state can be discarded and the state of the previous context will be restored and execution resumes. Such a switch process is called a context switch and usually includes 10's or hundreds of cycles especially with modern architectures that employ large number of registers (e.g., 64, 128, 256) and/or out of order execution.

In thread-aware hardware architectures, it is normal for the hardware to support multiple context states for a limited number of hardware-supported threads. In this case, the hardware duplicates all architecture state elements for each supported thread. This eliminates the need for context switch when executing a new thread. However, this still has multiple draw backs, namely the area, power and complexity of duplicating all architecture state elements (i.e., registers) for each additional thread supported in hardware. In addition, if the number of software threads exceeds the number of explicitly supported hardware threads, then the context switch must still be performed. This becomes common as parallelism is needed on a fine granularity basis requiring a large number of threads. The hardware thread-aware architectures with duplicate context-state hardware storage do not help non-threaded software code and only reduces the number of context switches for software that is threaded. However, those threads are usually constructed for coarse grain parallelism, and result in heavy Software overhead for initiating and synchronizing, leaving fine grain parallelism, such as function calls and loops parallel execution, without efficient threading initiations/auto generation. Such described overheads are accompanied with the difficulty of auto parallelization of such codes using sate of the art compiler or user parallelization techniques for non-explicitly/easily parallelized/threaded software codes.

SUMMARY OF THE INVENTION

A unified architecture for dynamic generation, execution, synchronization and parallelization of complex instructions formats includes a virtual register file, register cache and register file hierarchy. A self-generating and synchronizing dynamic and static threading architecture provides efficient context switching.

BRIEF DESCRIPTION OF THE FIGURES

The invention is more fully appreciated in connection with the following detailed description taken in conjunction with the accompanying drawings, in which:

FIG. 4 illustrates a register cache for virtualizing software contexts/threads in accordance with an embodiment of the invention.

FIG. 7 illustrates a known super scalar execution architecture.

Like reference numerals refer to corresponding parts throughout the several views of the drawings.

DETAILED DESCRIPTION OF THE INVENTION

One aspect of the invention reduces context switch penalty. A context switch penalty occurs because of the time it takes to save the architecture state (e.g., data registers, control registers, program counters, etc.) The state of the previous context has to be restored before resuming execution. This means that many loads/stores of a large number of registers need to occur for something as common as an involved function call. Disclosed is an architecture state structure to do a gradual self context-switch as well as an instant context switch on the architecture state. Also, the concepts of a virtual register file and a register cache are introduced as possible implementation components. The virtual register file or register cache also provide support for virtually larger number of threads or contexts in the hardware than possible using traditional hardware thread support. A multi hierarchal register file support provides larger bandwidth to the register file.

Figure 1:
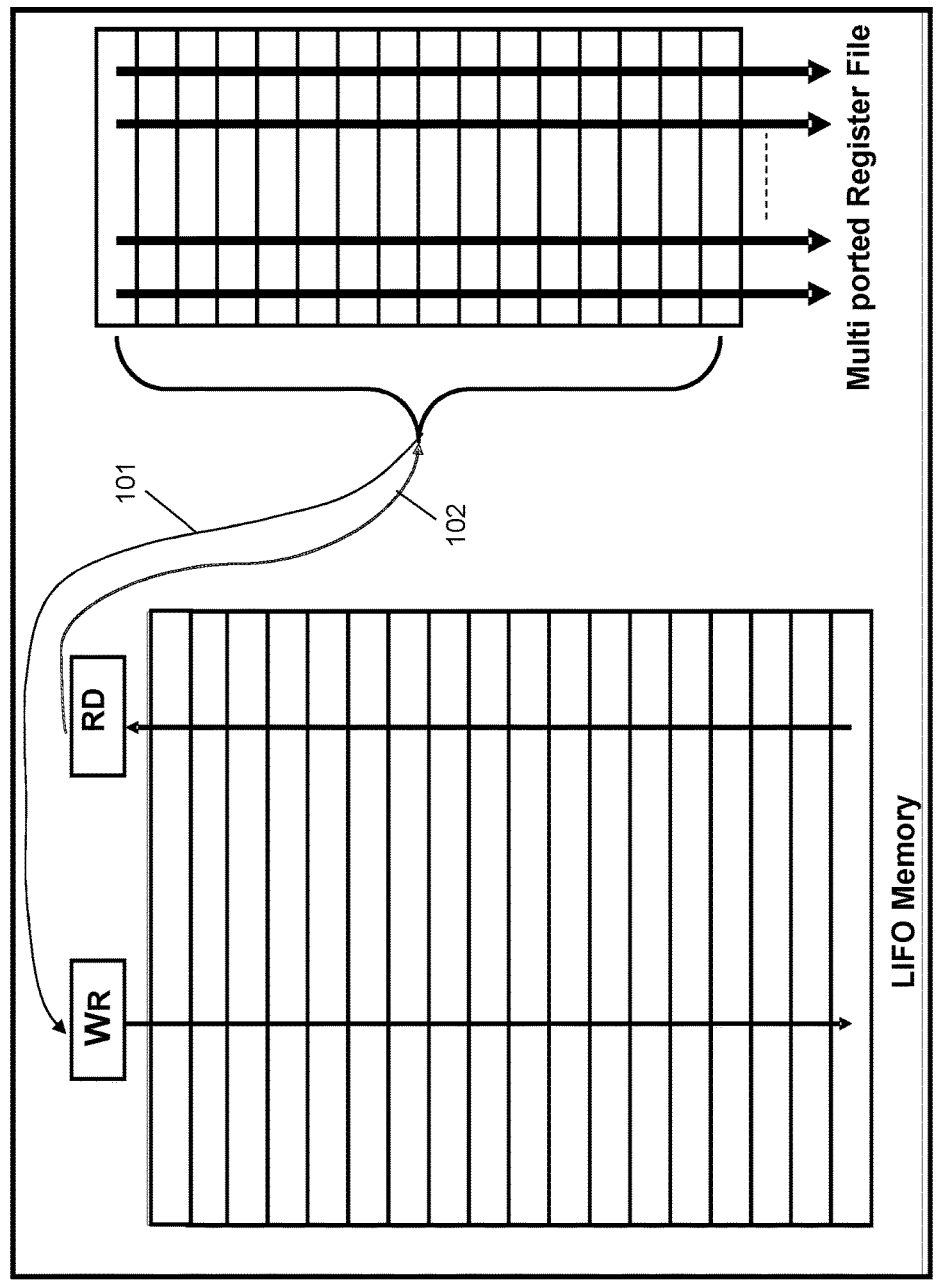
FIG. 1 illustrates instant saving and restoration of register state using direct connectivity to a register file.

The techniques can also be combined with threading support. One part of the architecture state will undergo an instant hardware/software supported context switch where all the architecture state is saved quickly/instantly by the hardware using a LIFO (Last-In First-Out) circuit. The use of a LIFO circuit allows for lower complexity and efficient speed and area implementations, as opposed to register file or random access memory implementations. Each subsequent context switch that belongs to this category is saved on top of the old context in the LIFO. This technique is well suited for recursive functions calls or nested parallelized loops where the context of one call in the recursion will naturally be entered and exited in a LIFO manner. FIG. 1 illustrates one embodiment of hardware context-switch support.

Another way of doing this quick saving of the architecture state is to save the register file content as one block in memory or cache (e.g., one cache line or block). A register batch is a series of subsequent register numbers (e.g., registers 0 to 7 might be a subset of a larger register set 0-64) that can be stored as a one cache line of size 64 bytes when a context switch involving those 8 registers occurs. The register file has dedicated wide buses 101 and 102 that directly carry all of its content either in the same cycle or in a small number of cycles, as opposed to typical usage of loads and stores to save and restore each individual register. One possible implementation of the register file to cache transfer is to use the buses 102 and 101 to connect to the fill buffers that are commonly used to fill cache lines as a back door path to move registers directly to cache. One alternative implementation can use write/read combining buffers that are typically used to accumulate partial stores and loads data into a buffer before writing them on the bus to the memory as a single transaction, instead of each forming a partial bus transaction. Such a combining buffer can have a side door bus connection through 101 and 102 to combine the series of registers into one write combining buffer that can then transfer the whole cache line worth of registers into the cache or memory while it can use the read combining buffer to do the opposite transfer. The use of a specialized local memory with a LIFO circuit or random access memory buffer is also another implementation choice. The LIFO circuit is simpler and has less implementation constraints, but imposes a strict order of saving and restoring data (last in first out). On the other hand, a random access memory, such as using a direct bus to processor cache has the flexibility of using local memory, but imposes hardware implementation constraints, while allowing flexible saving and restoring of contexts in random order.

Another part of the architecture state may be saved and restored gradually as the new context is replacing the old context. In other words, the individual registers are swapped/read in and out by the hardware upon the use of that particular register in the new or old context. This gradual context switch is suitable for global variables and variables that are passed from one function to another through the context switch. It also fits those variables that are passed through nested loops if the loops are threaded, such that the inner loop is assigned to a different thread than the outer loop. It can also be applied to the cases where different iterations of the loop are assigned to different threads and these iterations pass several variables from one iteration to the other (loop carried dependency). In all those cases it is advantageous to perform a gradual context switch for the registers because the number of registers that are commonly used between threads (the registers that passes data between the contexts) is large, thus those registers can be shared and do not need to undergo a context switch, while the remaining registers can be swapped as needed gradually.

The invention may also utilize virtual registers to allow for the containment of a larger set of registers than those directly supported by the instruction set architecture. The extra registers are part of the hardware supported context switch or hardware/software threads. The concept of a register cache or register hierarchy is also applicable for such scenarios. A virtual register file is a register file architecture where the instruction set registers visible to the architecture are extended and are still visible using the virtual register file storage. This facilitates keeping multiple copies of the same architecture register that belong to different context switches or threads. This also enables larger or variable numbers of registers than those directly accessible using a traditional physical register file. Those copies of the architecture registers are visible to the hardware in the case the hardware is generating the threads/contexts (hardware-threads) and they can also be overloaded with software threads if the software is generating them (software-threads).

Figure 2:
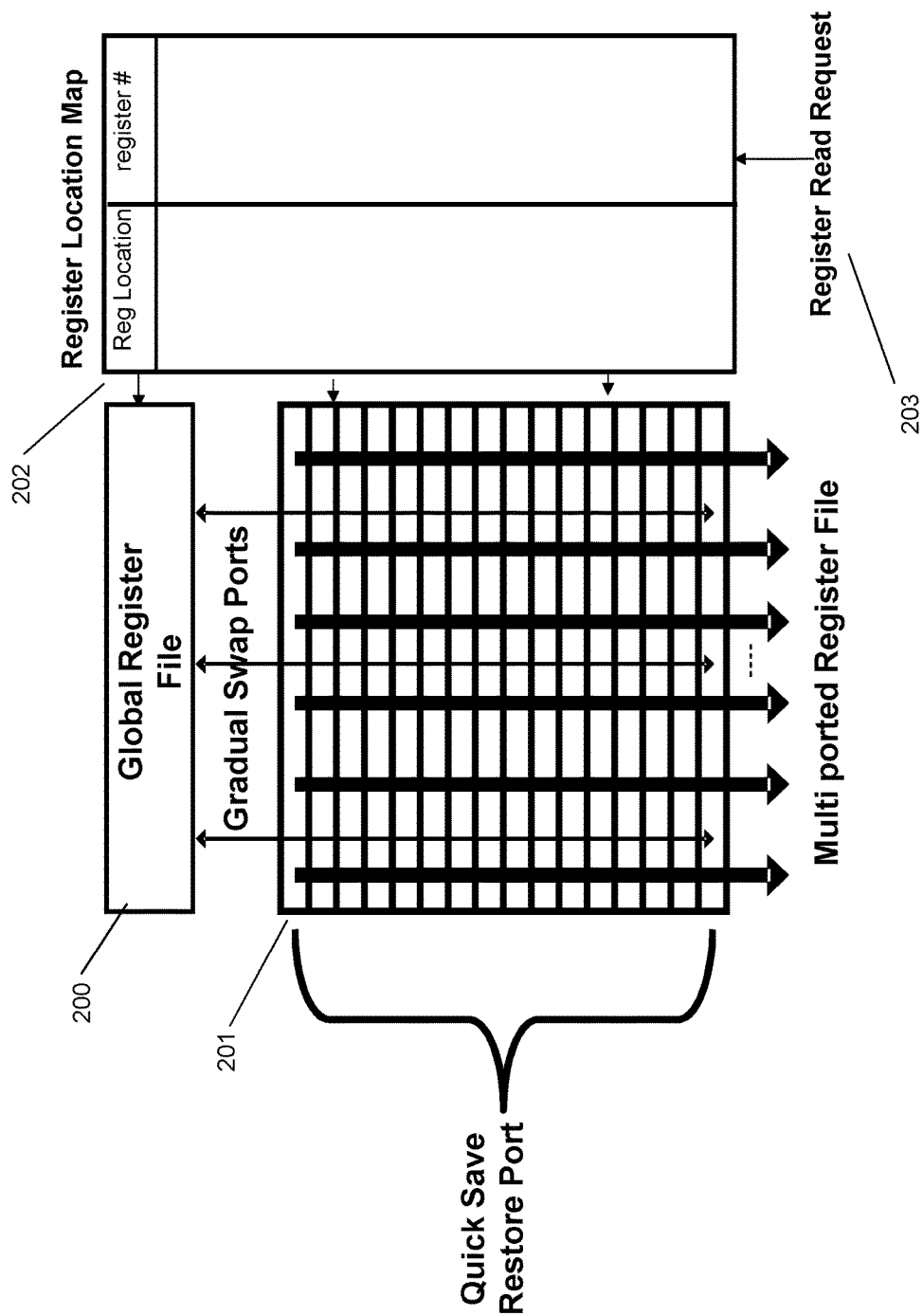
FIG. 2 illustrates a virtual register file with a register location map in accordance with an embodiment of the invention.

FIG. 2 shows one implementation of such a virtual register file by utilizing a hierarchy of the register file. Lower hierarchy levels 201 supports very high bandwidth to the execution units. Higher hierarchy 200 levels support lower bandwidth access. Some levels of the register file hierarchy contain the basic register set that is supported by the instruction set architecture, while other levels of the register file hierarchy contain virtual copies of the basic register set. It is also possible to allow the basic register set to be duplicated for multiple thread support.

It is also possible to include in this hierarchy a register cache where registers are cached in and out of this structure based on their relevancy to current context and their immediate access needs. One way to implement this virtual register file and register cache is by providing tags to the register locations such that they are accessed by the tags that include the actual register number in addition to other information, such as context ID number or static thread number and possibly the memory address where they should be saved for the context switch. Other alternative techniques are also described here in where an index map 202 uses position-based information about each of the architecture registers. The position (location) of the register copy in the hierarchy is looked up as part of the decoding phase of the register read access of the register file 203. Other mechanisms include passing the location of the register as part of the score board mechanism from the producer instruction of the register to its consumer instructions. Consumer instructions need to read the register so that they know which copy of that architecture register they need to access, but in the location/position based schemes, no tags are needed because the register is accessed by its register number and the location where the particular register copy is physically located among the multiple copies of that register in the multi-hierarchy register file.

The mechanism of gradual context switch can use similar mechanisms to current context switch of loading and storing the individual registers with the following differences. An individual register is hardware swapped/read when a new context attempts to use it and the local copy belongs to the old context. At that time the register belonging to the old context is swapped with the global register copy in 200 that belongs to the new context which is brought into the local register file 201. In one implementation, multiple registers that carry the same register number can coexist, but with different context ID tags. One implementation of the tag scheme can resemble a virtual register file where the same registers from different contexts are present. A virtual register file is interesting as it allows for a large virtual register file to be implemented as a hierarchy of multi level register-files with different bandwidth and capacity variations.

The following example illustrates different scenarios where functions are presented. Assume that different function calls within a single program/task are called at subsequent times.

```
Function 1 (values, references)
{
a-d: local variables
X-Z: global variables
Code
}
Function 2 (values, references)
{
a-d: local variables
X-Z: global Variables
Code
{
Function 3 (values, references)
a-d: local variables
X-Z: global variables
If (condition) then call Function 3( )
}
Main {
Function 1( )
....
Function 2( )
Function 3( )
....
}
```

The old local variables in the Local register file as a whole need to be saved if the old context is not needed, it makes sense here to use instant saving for contexts, other cases where the whole context needs to be saved are when a new independent process is invoked by the operating system.

On the other hand, if not all of the registers of the old context need to be saved, then only those that need to be saved are gradually swapped with the new context register values. This is the case where function 1 and 2 coexist together in the same local register file and share the same global registers in the global register file. This is the case for fine grain threads. In such case, when a particular register in a certain context needs to be accessed, its context ID is checked with the one that exists in the local register file. If they match, then it can be used, else it needs to be brought/read from a higher storage hierarchy (such as the global register file or the register cache) and may be swapped with the one that is in the local hierarchy storage (e.g., the temporary local register)

At the call of the Function, the new variables that are to be written within the function scope are assigned to new register copies (with a new context/thread ID compared to the external scope of the function). Those new register name copies can be assigned either by a hardware management unit (HMU) or by a compiler/programmer that generates code for this architecture. In case of the HMU, the HMU unit upon entering the function code (the one between the call and return instructions) will assign a new context/thread ID number to each register name that is being written within the function scope, thus generating copies of the register names. Upon reaching the return instruction this context/thread ID becomes free for reassignment and all the register name copies can be reused again. There is no overhead in creating and synchronizing these temporary contexts because the hardware automatically manages the assigning and freeing of these temporary copies of register names.

The compiler can handle the management of the register names in different contexts if the instruction architecture allows for extending the register name with a context/thread ID number. This way the instructions that write into a specific register name will also specify the context/thread that the instruction writes to and reads from. Consider a typical instruction with 3 sources (S1,S2,S3) and one destination (Dest) as encoded below $$DEST/S1 \leftarrow ADD(S2, S3)$$

In this example, the registers and their association to threads will be formatted as:

$$Th_y:R_x \leftarrow ADD(Th_z:R_i, Th_w:R_k)$$

This shows how the instruction architecture allows for specifying the context/thread ID i.e., "$Th_y$ where y is the thread ID" alongside register $R_x$ with register name x. The compiler or the programmer can specify the context/thread number that the register names belong to. When a code for a function is compiled the compiler can increment the context/thread ID number using a special instruction to increment the thread ID counter; then this counter is decremented upon exiting the function call using a decrement instruction. Another mechanism that the instruction architecture can use is to implement a free thread selector instruction. The compiler/programmer uses this instruction to poll the hardware to find a free context/thread ID which it can use. Upon returning from the function it can uses another instruction such as a context/thread free instruction. The following illustrates these 2 methods:

```
Increment thread ID counter
Function A: (( Th+:R_y ← Move Th:R_y)
{
Function body
}
Return ( Th-:R_i ← Move Th:R_i)
Decrement thread ID counter
```

The reason for having the increment before the function call and the decrement after the return is to allow for passing the values between the caller and callee. The increment creates the new context/thread number and the decrement frees it.

An alternative method that does the same task uses an instruction that selects a free context/thread number and another instruction to free that context/thread number.

```
J =current Thread number
I=Select free thread ID number
Function A: ( Th{I}:R_y ← Move Th{J}:R_y )
{
Function body
}
Return ( Th{J}:R_x ← Move Th:R_x )
Free thread ID number {I}
```

To reduce the encoding space for the context/thread number associated with each register name, the instruction architecture can specify that a register is associated with the parent thread or with the current child thread; this can be encoded with one bit (we will call the parent/child bit: "P/C" bit). Each new generated thread will specify its parent thread (the thread that it was spun out of). The parent ID number will be kept along with the other thread state. A hybrid scheme can be used where the instruction can specify one/more sources from the current child or parent thread using the parent/child bit and one/more sources from another non-related thread using an explicit thread number along with that source register name. The following instruction set architecture illustrates such hybrid scheme:

$P/C:R_x \leftarrow ADD(P/C:R_i, P/C:R_j, Th_w:R_k)$

The "P/C" bit specifies if the register belongs to the parent thread or the child thread. This scheme can be generalized where more bits can be designated to encode active threads within a higher level context. The following illustrates this more general scheme. A high level context defines few threads within its state. Processor architecture allows for small size of stored states that the instruction set can abbreviate. Assuming that the processor hardware can support a total of N threads, the instruction set can support an abbreviation of those threads that allows intercommunication of M threads through the registers in the instruction set encodings, where M<N. This will allow for a larger number of threads to be supported by the instruction set architecture than the abbreviated encoding bits allows. For example, let us assume that the hardware can support 128 threads (N=128). One can define the instruction set encoding to have an encoding for only 4 threads (M=4), such that those threads' registers can be simultaneously accessed by 4 active threads out of the 128 threads. Those 4 threads can rotate among the 128 threads depending on the active region of the program. Few bits ($T_1 \ldots T_{log\ M}$) can be used to encode M threads in the instruction. In this example 2 bits $T_1T_2$ are used to encode 4 threads.

$T_1T_2:R_x \leftarrow ADD(T_1T_2:R_i, T_1T_2:R_j, Th_w:R_k)$

Mapping the active threads within a program region to the overall set of threads supported by the hardware can be done though mapping or assignment instructions as the following example shows $Map(T_1T_2=00), TH=0001101$ $Map(T_1T_2=01), TH=1001000$ $Map(T_1T_2=10), TH=1010101$ $Map(T_1T_2=11), TH=0111100$ $01:R_x \leftarrow ADD(01:R_i, 10:R_j, 1000110:R_k)$ In the above example of code the instructions map the hardware threads to the abbreviated encoding represented by the 2 bits $T_1T_2$ of the mapping instructions. By way of example, the add instruction encodes only 2 abbreviated bits for the threads of each source and the destination. The third source, however, explicitly encodes the thread of its source. The decision of the number of bits to encode in the instruction set to abbreviate the threads is an implementation decision that can vary from one architecture to another, also including a third source or having its thread explicitly encoded is an implementation choice.

To implement the pipeline of a processor that executes such instructions or micro operations (microcode implementation of the instructions), this pipeline will store those maps and use them to access the correct thread state when it executes an instruction that encodes the abbreviated thread bits. Those mapping states can expand a register allocation algorithm for mapping single thread variables to registers, where the compiler can allocate a larger set of threads to the limited number of mapping states and then perform the register allocation within each thread. This way the mapping states can be reallocated for new threads through out the program using live ranges of threads similar to live ranges of registers.

Figure 3:
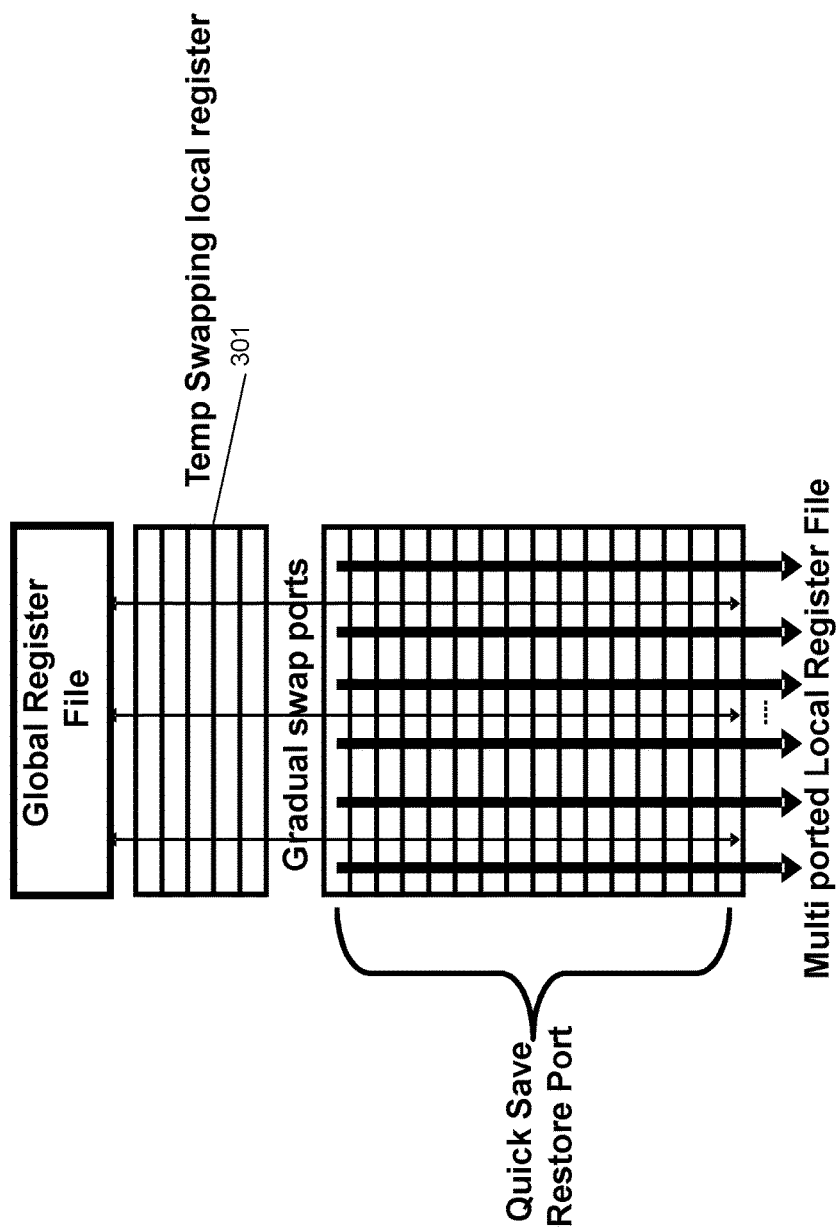
FIG. 3 illustrates a multiple hierarchy register file with temporary storage for speculative register state in accordance with an embodiment of the invention.

$Map(T_1T_2=00), TH=0001101$ $Map(T_1T_2=01), TH=1001000$ $Map(T_1T_2=10), TH=1010101$ $Map(T_1T_2=11), TH=0111100$ $01:R_5 \leftarrow ADD(01:R_2, 10:R_3, 1000110:R_{10})$ $01:R_8 \leftarrow MUL(01:R_4, 01:R_5, 1000110:R_{12})$ $Map(T_1T_2=10), TH=1011111$ $01:R_5 \leftarrow ADD(01:R_2, 10:R_3, 1000110:R_{10})$ $01:R_8 \leftarrow MUL(01:R_4, 01:R_5, 1000110:R_{12})$ If the processor is an out of order processor, it can also allow for renaming of those abbreviation maps to allow for more of those active region threads to be executed simultaneously. For example, in such an out of order processor, the above code will be decoded to rename those abbreviated bits internally in the actual micro operation encodings to the full thread number. In such an out of order machine temporary speculative registers are also implemented to keep those renamed registers and states. FIG. 3 implements temporary registers where speculative state can live in temporary registers such as 301 before they are committed to the global register file.

The general scheme described enables fine grain threads to communicate, cooperate and synchronize execution on register level execution without the need to go through memory, while at the same time having the instruction set encodings very compact by providing register association to threads, while minimizing instruction encoding space. All the schemes described above require the compiler to insert instructions to manage the threads and set the extension bits, can be performed by a hardware management unit that executes similar actions to the instructions and manage the setting of those extension bits (as described throughout the invention).

We generalize the above mechanisms to handle fine grain threads beyond function calls, to include threads across loop boundaries and creating threads between the body of the loop and the code outside a loop body. Consider the following code:

```
Loop ( j= 1 to 100)
{
Instruction A
Instruction B
Loop (i=1 to j)
{
  Instruction 1
  Instruction 2
}
Instruction C
}
```

Using the compiler or the hardware management unit, the thread that represents the inner loop body (instructions 1 and 2) and the thread that represents the instructions outside the inner loop body can be mapped into hardware supported threads.

The following implementation, by way of example, represents one scheme where those fine grain threads can be live in the register file/register cache and be swapped in and out into higher level register file hierarchies as well as memory hierarchies.

The assumption is that a compiler will be designed to use some convention that saves context depending on the number of registers used in the called function. So it can save a number of registers in an incremental way. For example, if the design convention is to use register batches in increments of 8, then if a function needs to use a number of registers that is between 1 and 8 registers it will save registers 1 thru 8 of the old context (and will restore them when it restores the old context). If it needs to use a number of registers between 1 and 16 it will then save registers 1 to 16 and so on and so forth to the full extent of saving the whole registers supported by the architecture. One other scheme that allows for establishing a virtual register file is the aliasing of the registers of different contexts/threads that need a smaller number of registers than that provided by the instruction set architecture. For example, a small function call or a worker thread might only need to use a subset of all the registers e.g., 8 registers (register 0 to 7) out of the 32 registers available by the instruction set. If this is the case, then the hardware/compiler will alias this 8 logical register batch on top of another free physical register batch, the register batch that the thread gets mapped to does not need to be with the same register numbers; i.e., registers 0-7 can be mapped onto physical registers 8-15 or 16-23 or 24-31 that are available in another context physical state storage.

FIG. 4 shows such scenario. Thread 5 state 402 which is composed of registers 0-7 is aliased on top of a free context register batch 8-15. This means that more threads can be accommodated than the typical case where each thread is mapped onto the whole 32 register state. In FIG. 4, typically only 4 threads can coexist at the same time because there are only 4 sets of 32 registers that can be used simultaneously. However if most of the additional threads (beside the main thread which might need the 32 register large sate for itself) have small set register requirements and they can each live with 8 registers small state, then we can simultaneously process 13 threads in total. The maximum number of simultaneous threads that can coexist in this 8 register batch aliasing configuration is 16 small state threads. Obviously, we do not need to store a tag per register as shown in the figure for illustrative purposes. In efficient implementations you can store a thread tag per batch (8 registers in this example) or also alternatively threads can be allocated according to a number aliasing scheme where the thread number starts at boundaries of multiples of 8. For example, if we start allocating registers based on this scheme, FIG. 4 shows the software threads numbers 0, 1, 3, 4, 5, 6, 7 and 9. As described earlier, the software threads will be mapped to the physical hardware threads either by instruction set (thru the compiler) or by a hardware management unit. The aliasing scheme now allows 16 hardware threads to be mapped to the software threads. In this scenario software thread 0 reserves hardware threads 0,1,2,3 because it needs the whole 32 registers large state and thus uses 4 batches of 8 register each. However, software thread 1 reserves only one small state hardware thread storage and thus is mapped on hardware thread 4. Software thread 5 is mapped onto hardware thread 5, software thread 3 is mapped on hardware thread 6 and software thread 6 is mapped on hardware thread 12 (shown in the figure as point 400).

In instruction set or microinstruction encoding, to allow the aliasing scheme described above, the reference to a thread-register pair can be a continuous encoding of bits, where the top 4 bits will be the hardware thread number (indicating which batch of 8 registers the thread references) and the lower 3 bits will indicate individual register in the register batch 0-7.

As an example, assume that the software needs to perform the following high level threaded task of adding certain registers in different threads and write the result in register 2 in software thread 1, shown as 403 in FIG. 4 as follows:

$$Th1{:}R_2 \leftarrow ADD(Th0{:}R_{13}, Th3{:}R2, Th6{:}R_3)$$

Then the mapping of the software threads to hardware threads will be done either by the compiler or the hardware management unit. Such mapping ensures that software threads which need more than 8 registers reserve more than just one hardware-thread storage, thus no other software thread can use those reserved hardware threads to map onto. The actual instruction encoding of the task will be written as follows, $$0100010 \leftarrow ADD(0001101, 0110010, 1100011) \text{ which decodes to the following:}$$

$$HWTh4{:}R_2 \leftarrow ADD(HWTh1{:}R_5, HWTh6{:}R_2, Th12{:}R_3)$$

Note that software thread 0 register 13 was encoded as hardware thread 1 (401) register 5 (0001 101, first 4 bits are hardware thread number and last 3 bits are register number) because the mapping of software thread was aliased on 4 small state hardware threads 0,1,2,3 each of which has a batch of only 8 registers. Alternatively the same encoding can be read as hardware thread 0 register 13 (00 01101, the first 2 bits is the number of large state hardware thread (one with 32 register state) and the last 5 bits are the register number among the 32 registers)

Figure 5:
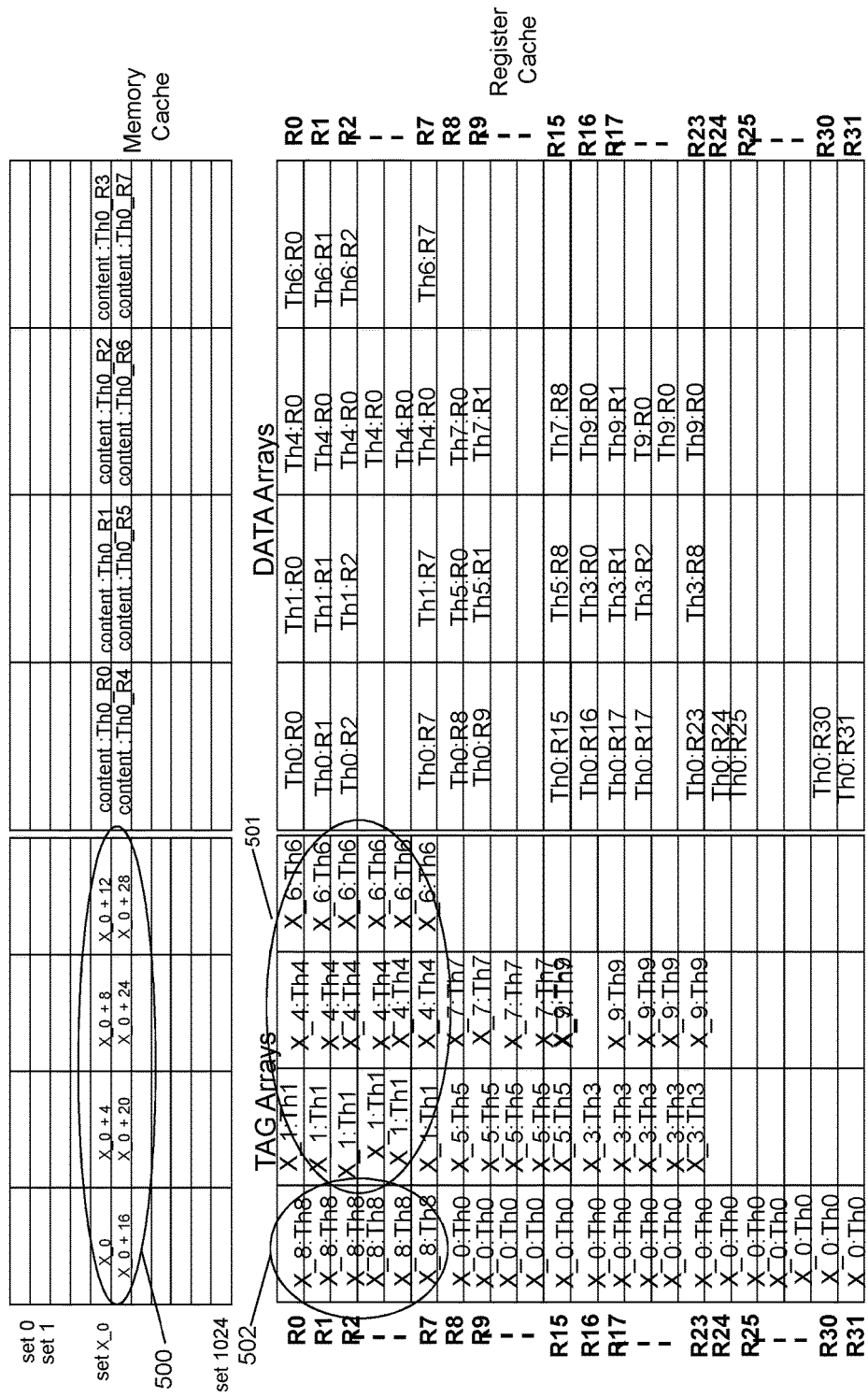
FIG. 5 illustrates a register cache with an automatic mechanism to spill and reload registers upon a context switch in accordance with an embodiment of the invention.

Another scheme that can be implemented on top of previous register cache scheme is one that provides an automatic store load mechanism between this register cache and the memory cache to allow the register cache to spill out and reload registers automatically upon context switches and thread context swapping which is illustrated in The following code illustrates the scheme and how the hardware described in FIG. 5 works to allow a seamless multithreading context switching. The register cache (built similarly to typical associative caches with sets and ways) has tow parts; the tag array and the data array. The data array is accessed similar to any threaded register array; a register read happens upon any instruction that accesses that thread register. However, the tag array is accessed upon any load or store instruction that is a part of a context switch, which is also known as saving and restoring the context. The tag part of the register cache is only updated with a current stack memory address for a particular register when the current thread context for that register is stored (saving the context) provided that there is no need to actually store the value to the memory because there is still empty ways in that particular register set in the register file cache. Later this tag is used to actually evict the register when there is no free ways in the register cache to store a new thread that needs to allocate the same register name. The following code illustrates this:

Main (thread 0)
. . .
Thread 1 {Save register batch (0-7) starting address X_1}
{address X_1←store R0, address (X_1+4)←R1, . . . ,
address(X_1+28)←R7}
. . .
Thread 4 {Save register batch (0-7) starting address X_4}
{address X_4←store R0, address (X_4+4)←R1, . . . ,
address(X_4+28)←R7}
. . .
Thread 6 {Save register batch (0-7) starting address X_6}
{address X_6←store R0, address (X_6+4)←R1, . . . ,
address(X_6+28)←R7}
. . .
Function foo (thread 8)
{Save register batch (0-7) starting address X_8}
{address X_8←store R0, address (X_8+4)←R1, . . . ,
address(X_8+28)←R7}
R0←add . . .
R1←move . . .
R3←subtract . . .
R2←add . . .
R5←move . . .
R5←subtract . . .
Restore register batch (0-8)
{R0←LD address X_8, R1←Ld address (X_8+4), . . . ,
R7←LD address(X_8+28)}
Return In the above code the compiler wants to save to the memory stack, registers R0 thru R7 of thread 0 that will be overwritten by threads 1, 4 and 6. In this scheme we allocate the memory region in the stack to accommodate register batch (0-7) but the hardware do not really perform the store of the registers of thread 0 to the memory/memory cache when threads 1, 4 and 6 are encountered. This is because the multi-context register file cache is able to provide storage 501 to the extra 8 registers (0-7) that those threads need without destroying registers 0-8 of the original thread (thread 0). As long as the multi-context register file cache can accommodate those registers, it only updates the tag array in the register cache with the stack memory address that the store instructions intended to perform. Notice that when thread 8 is encountered ("function foo"), because the ways of the register cache are all occupied for register batch 0-7 then the stores of registers 0-7 for thread 0 has to happen and in fact it is similar to the eviction process in a typical cache where the registers 0-7 of thread 0 are evicted to the real stack memory/cache hierarchy storage 500 while the register file cache thereafter, contains values for register 0-7 of thread 8 in the storage area 502.

The mechanism for context switch can also facilitate other techniques, such as the dynamic self generation and synchronization of threads. Concurrent execution of different parts of a single task or program currently requires the implementation of an out-of-order "Super scalar" processor architecture. However, out-of-order execution requires plenty of hardware investment and complexity. The following are typical implementation components that are needed for such concurrent execution using an out-of-order microarchitecture:

1—Allocation logic to allocate all resources in the sequential order of the program.
2—Rename logic and register map to map logical registers to physical registers at allocation and update the logical registers at retirement of physical registers.
3—Reservation station to dispatch the operations out-of-order according to availability of resources and after dynamically resolving dependencies.
4—Reorder buffer to allow for reordering the results in the initial sequential order before retiring them to the architecture state. It also maintains precise exception behavior.
5—A memory reorder buffer to reorder memory accesses that are dispatched out of order to maintain the same consistency model as if they are dispatched in order, for example, checking for load after store to the same address. It is also necessary to maintain the order of access for special memory accesses like memory mapped I/O.

Few architectures have capitalized on the super scalar nature of the out-of-order machines and their ability to dispatch multiple independent streams of instructions to allow multiple software threads to simultaneously execute in the machine. This simultaneous multi-threading requires duplicating the architecture state of the machine for each hardware supported-thread and partitioning the micro architecture resources between threads and sharing the memory structures like caches between those threads.

Despite the fact that those machines are out-of-order, they do not initiate, self dispatch, synchronize or enable concurrency between threads by the out-of-order hardware itself. Rather, all those tasks are left to the software, which initiates/generates and dispatches the threads when their dispatch condition/dependency is met (e.g. using barriers). The software synchronizes them when there is common control or dependencies between them (using locks for example). The software also determines the concurrency between them. The software mentioned earlier could be the actual master thread code or the compiler that tries to statically parallelize non-threaded code. Usually those threads are implemented using coarse-grain parallelism leaving fine grain parallelism without efficient threading initiations because of the difficulty of automatic parallelization of such codes.

The following discussion illustrates that with a new paradigm of hardware/software, automatic parallelization is achieved even without using the elaborate out of order micro-architecture support. The new hardware generates, synchronizes, parallelizes and concurrently executes those fine/coarse grain static and dynamic threads by dynamically detecting that the control conditions and/or the dependencies are resolved and/or by allowing for the cross reference of registers between threads also by disambiguating memory references across those threads. This is done by having the hardware monitor either a control condition associated with triggering the thread or the write back of cross referenced register values on which the current thread depends on.

The initiation/generation of the thread dynamically by hardware is triggered when all its dependency registers and/or control conditions, particularly those of cross reference nature (e.g., inter-thread registers) are satisfied. This can be monitored through the explicit list of sources that this thread is dependent on. These hardware initiated dynamic threads can be thought of or actually can be things like a function call or a method or subroutine or even a loop instance that can be encapsulated in a form of a repeated function call. This function call has a parameter list on which its execution is dependent. Those parameter lists or registers are monitored for their write back stage occurrence. Once each parameter/register is written back after its updating instruction has executed, a flag is set. When all the flags of those parameters/registers are set, then the function/thread can be dynamically dispatched by the hardware. The allowance for cross referencing of the registers or virtual registers and/or memory references among the different threads (both the hardware generated as well as the software generated) establishes a way to generate, synchronize, parallelize and concurrently execute those threads using a natural dependency resolving method such as the one used to create consistent execution of programs using registers to communicate dependencies.

The lazy gradual context switch mentioned earlier also helps to allow the new state of those dynamically generated or software static threads to be built/swapped with other existing dynamic/static threads as illustrated earlier.

Figure 6:
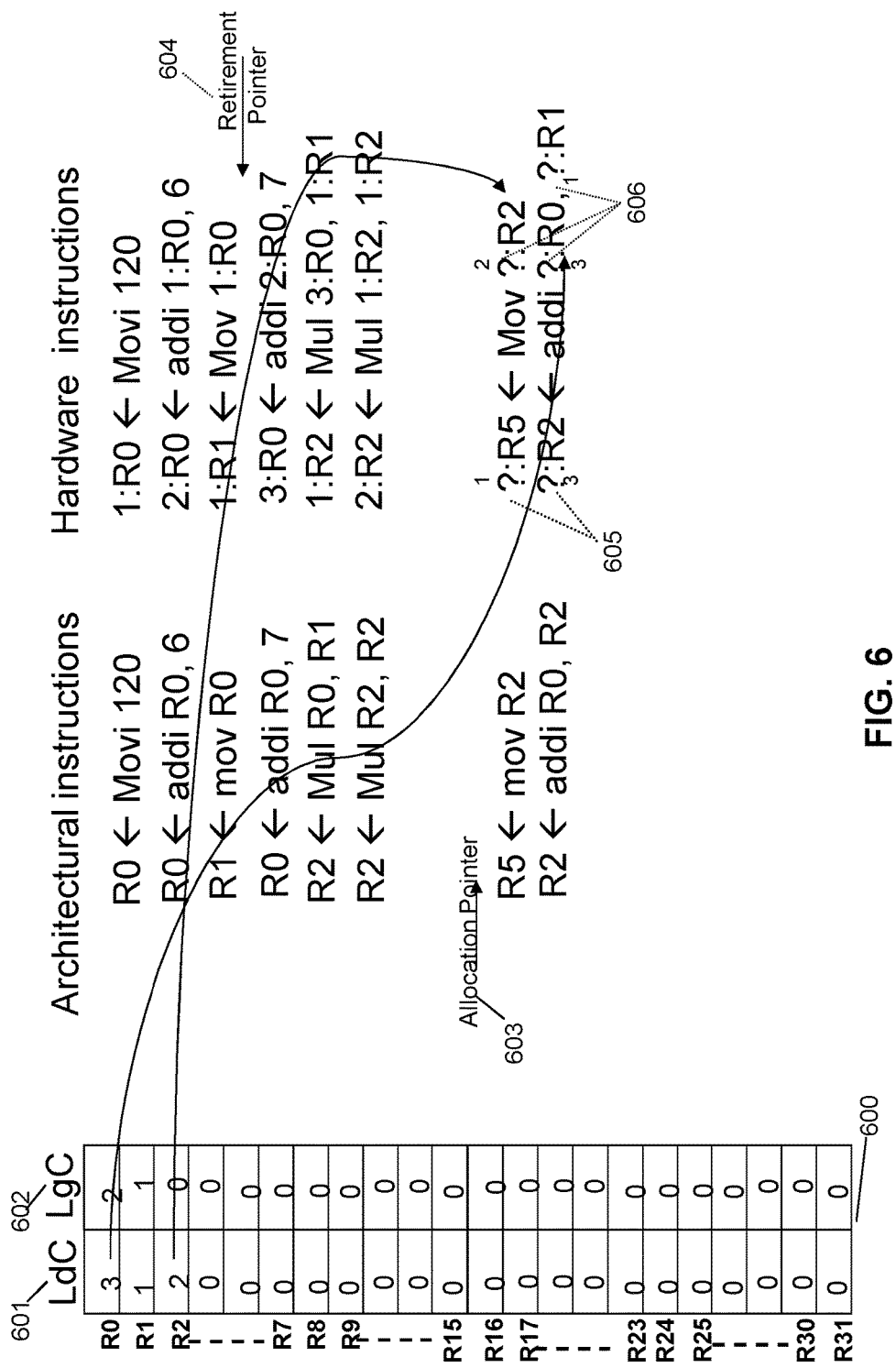
FIG. 6 illustrates the resolution of false dependencies on register names using a counter scheme in accordance with an embodiment of the invention.

FIG. 6 shows one possible mechanism of resolving false dependency on the same-name registers during the dynamic execution of those threads. This can also maintain sequential order of register updates by augmenting the register number with a differentiating bit-field that is tagged at instruction allocation time in the machine. At the front end, each register has 2 counter values corresponding to this bit filed. One counter value (lead counter) 601 is incremented at each new assignment of that register as a destination to an instruction. Another pointer 602 (lag counter) is incremented at each commit of a corresponding register to the architecture state. The lag counter can never bypass the lead counter. The lead counter can wrap around to the initial value after reaching the maximum; the lag counter has the same functionality. Those counters can be extended to be thread-specific, such that each thread has its own counter.

The lead counter 601 for a specific register keeps incrementing as a new instant of the same register is being assigned as a destination to a new instruction. Each time a register is reassigned as a destination to new allocated instructions 603, this bit field of that register is incremented (in the front end of the machine) and attached to the hardware instructions 605. Each subsequent instruction using this register as a source 606 will use the new incremented register number extended field. Whenever that register commits to final architecture state, then that register bit field lag counter 602 at the front end is incremented. The reason to use and increment the lag counter is to determine if a particular register value needs to be read from the speculative reorder buffer or from the retired register file by comparing (at the instruction register read stage) the register extended field of the hardware instruction with the lag counter of that register from the lag counter pointer. The lag counter 602 gets incremented at retirement pipeline stage 604 This mechanism can also apply to individual instructions and not only to function's calls or threads.

Figure 8A:
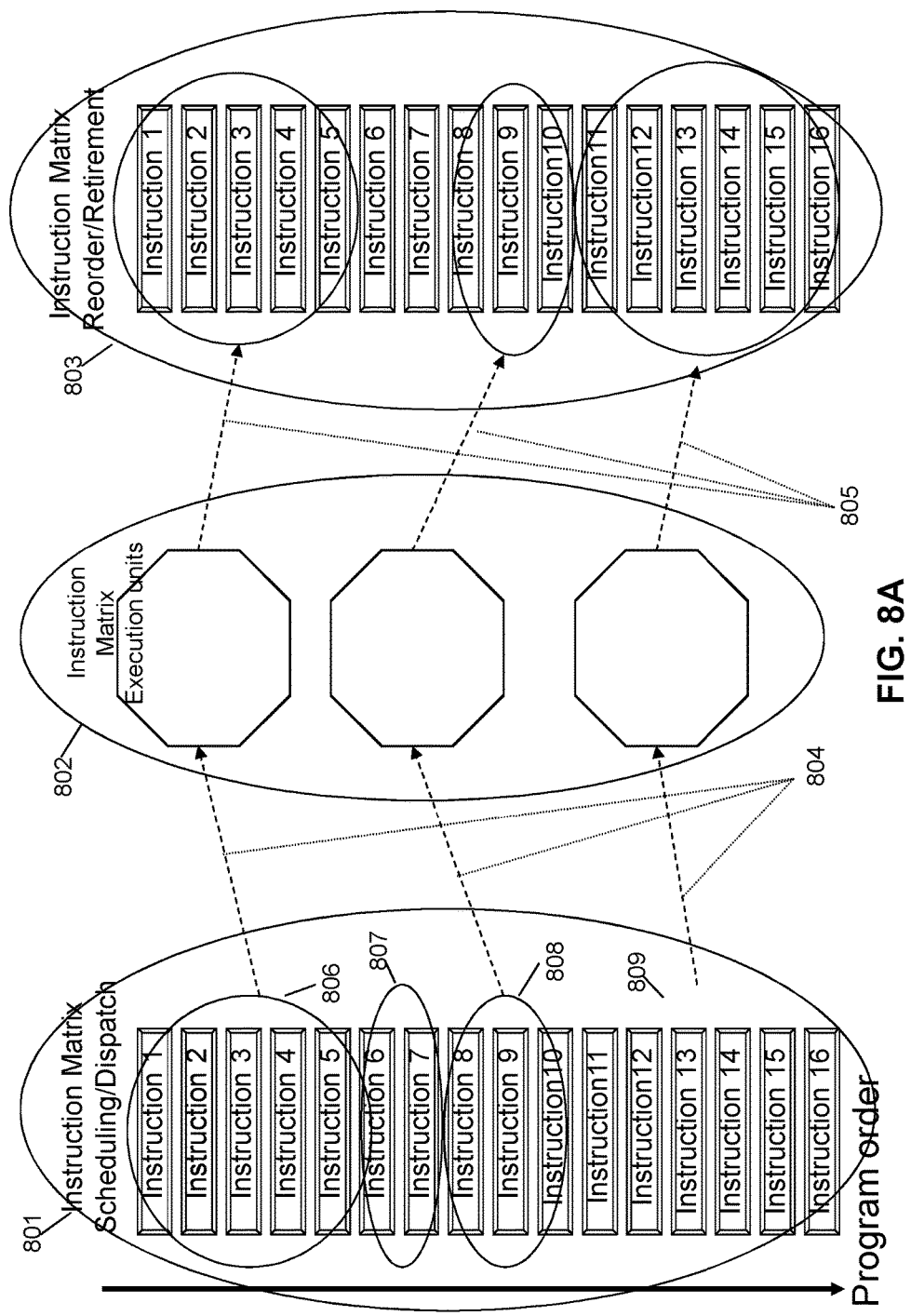
FIG. 8A illustrates an execution architecture utilized in accordance with an embodiment of the invention.
Figure 8B:
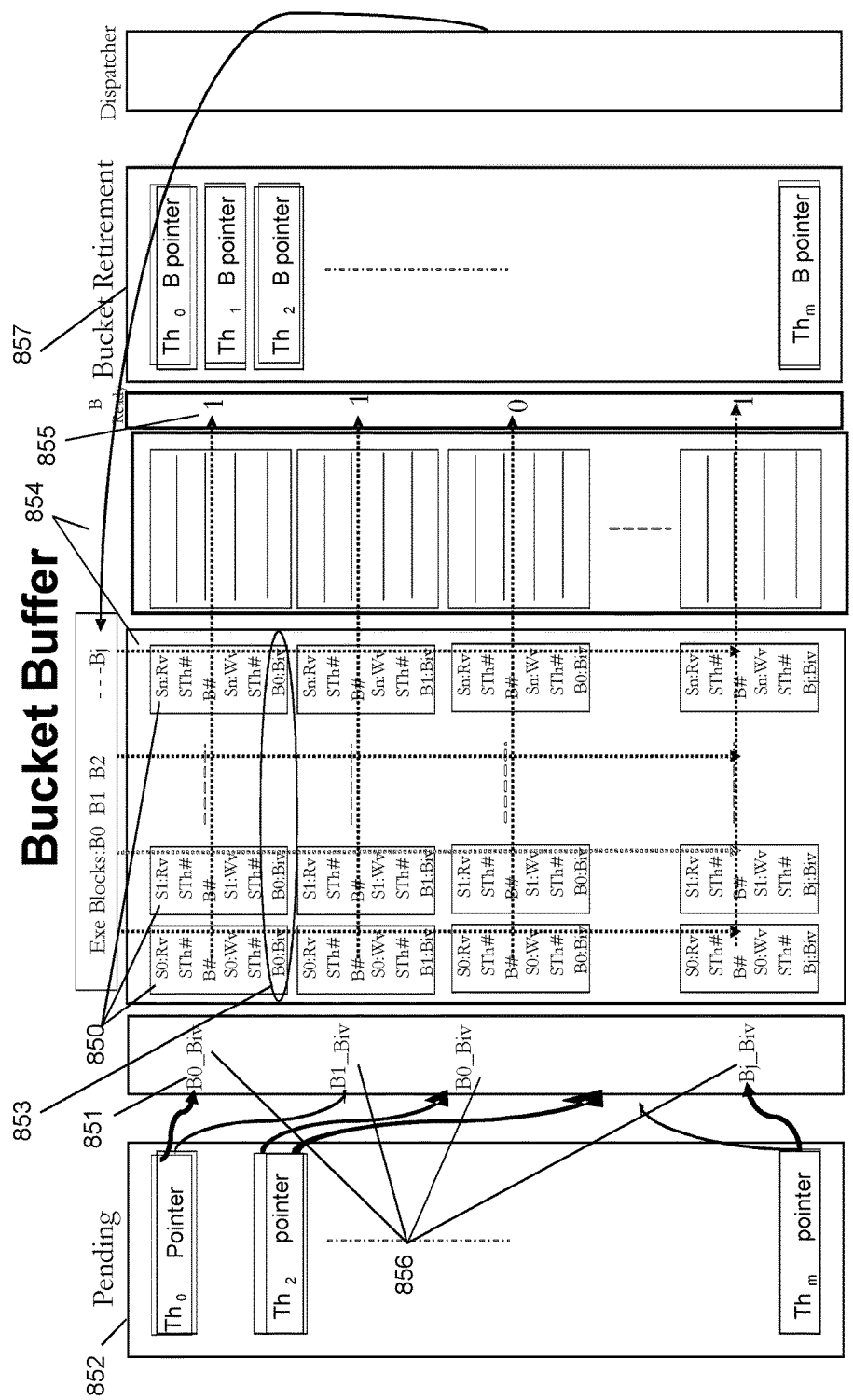
FIG. 8B illustrates a buffer, scheduler and reorder unit that stores inheritance information in accordance with an embodiment of the invention.

The lead counter and lag counter table shown in FIG. 6 can be replaced with an inheritance vector that has a field for each of the architectural registers. At allocation time, this vector forwards the incremented values from each instruction to the next while each instruction increments the value in the bit field related to its destination register. A similar concept is shown in FIGS. 8.a/8.b but for a group of instructions as opposed to only one instruction.

In the following paragraph a preferred method is described to unify automatic/dynamic threading generation and synchronization along with the handling of context switches described earlier. In addition, the concept of physically-segmented architecturally-unified register file is disclosed with a register hierarchy that is well suited to such an implementation.

The architecture may also include an instruction matrix/block/bucket architecture (matrix, block or bucket are used exchangeably) where instructions are part of an "Ultra Large Instruction Matrix" referred to in a previous invention by the same inventor as "ULIM Architecture" in PCT/US2007/066536, which is incorporated herein by reference. The instruction matrix/bucket/block is a collection of instruction that might be totally dependent on each other or totally independent or something in between (some instructions depend on others while some are independent with respect to others). Usually the instruction matrix/block encapsulates instructions in a matrix format where dependent instructions must occupy a column within the matrix and independent instructions occupy rows or columns. The matrix dimensions (rows, columns) can be selected from few possible configurations that the architecture maps to its hardware execution units. The Matrix/Block/bucket architecture is a concept that allows the passing of dependencies on the level of an instruction block/Bucket identity instead of individual sources. Thus, the architecture efficiently removes complexities associated with CAM (content addressable Match) matching sources and destinations in a large scale concurrent instruction execution architecture. It is possible to design the disclosed inventions without the explicit use of the ULIM architecture or the even instruction buckets/blocks, by using instead a virtual identifier that serves a similar role to the bucket/block role such that it tracks and resolves dependencies on a source group level without really forming a matrix or block but by using grouping of simple instructions. This is an implementation advantage over the current schemes that use individual source dependency tracking and resolution per single instruction.

Within an instruction bucket and across the buckets, instructions can be assembled as VLIW or SIMD or MIMD. Then the buckets are dispatched and executed as dynamic threads. In addition, the static software threads can share the same mechanisms described for dynamic threads with the difference that they are generated based on the software application threads.

FIG. 7 illustrates a traditional super scalar out of order architecture as described in the related state of the art. Individual instructions are renamed using a rename table (not shown in the figure) that maps architecture registers into a pool of physical ones, then the instructions are scheduled, executed and retired. Shown in FIG. 7 is a typical instruction scheduler 701 with 3 dispatch ports 704. Up to 3 instructions can be scheduled and dispatched out of program order using those ports to execute on the 3 execution units 702. They write back their results using write back ports 705 to the reorder buffer 703 each cycle. Then up to 3 instructions can retire from the instruction reorder/retirement buffer 703 so that their destinations registers can non-speculatively and permanently update the architecture state.

In contrast to the typical implementation of out of order hardware of FIG. 7, the current invention describes a dynamic scheduling out of order architecture that scales much better using the concepts of the instruction matrix/bucket and the group level dependency check and instruction group dispatch and execution as shown in FIG. 8.a. An instruction matrix buffer and scheduler 801 stores those instruction matrices/blocks/buckets.

In this example, the instruction bucket 806 is determined to satisfy its dependency sources and thus it is ready to be dispatched and so is bucket 808 and 809. Those buckets can execute in single cycle if the underlying hardware allows that or they can be staged in execution units 802 over multiple consecutive cycles in a pipelined or non pipelined fashion. After their execution is finished their results are written into instruction matrix retirement register file 803. They are written as a group of registers representing the bucket using the write back ports 805. Those bucket destination registers stay in the bucket retirement buffer until the bucket as a whole can update the architecture state in the original sequential order of the program.

One possible implementation for this concept is described in with 3 components:
1—The front end
2—The Scheduler and Execution
3—The Back end retirement The front end includes: Speculative Thread Bucket-pointers, Bucket Sources and destinations lists. The scheduler and execution buckets include a bucket dispatch selector and the virtual register match and read, including the possibility of a register hierarchy and a register cache. The Back end is where executed buckets are logged and exception ordering is enforced before retirement. The register hierarchy/cache also serves as an intermediate storage for the executed bucket results until they are non-speculative and can update the architecture state similar to 803 shown in FIG. 8.a.

The following discloses one possible implementation of the front end, the dispatch stage and the backend where executed buckets are logged. Those are shown in FIG. 8.b The process starts by fetching a new thread Matrix/bucket/block, and then the new thread bucket is assigned into a vacant bucket slot in the bucket buffer. Each of the thread allocation pointers in the thread allocation pointer array 852 composes an interval of buckets that the thread is allowed physically to place its blocks/buckets of instruction in it. Each of those threads keeps allocating buckets into the bucket buffer array inside its corresponding interval of contiguous space in round-robin fashion. The buckets/blocks inside each thread space get assigned a new number 852 that is incremented each time a new bucket/block gets assigned. For each valid source in the bucket 850. The valid sources for each bucket has a valid read bit "Rv" indicating that this source is needed for the instructions inside this bucket. By the same convention, each destination register that is to be written back by instructions in this bucket has a valid bit "Wv" set in the bucket and it has a field in a destination inheritance vector 853. When a new bucket is to be fetched into the bucket buffer it inherits the destination inheritance vector from the previous allocated bucket pointed at by the thread bucket allocation pointer 852. The inheritance vector is copied from the previously allocated bucket and then it overwrites those valid destination fields that correspond to the registers which will be updated by those bucket instructions. The valid destinations will be labeled with the current bucket number, while the invalid destinations are copied from the corresponding inheritance vector inside the bucket. Then the thread bucket pointer is updated for the new fetched bucket by incrementing its pointer (it wraps around within its interval).

In the bucket dispatch and execute stage, whenever a bucket is executed without any exception handling, then the bucket execution flag (containing the bucket number) 854 is set and broadcasted through out the bucket buffer and is latched/monitored within each bucket that has a source with that bucket number as a source. It is also possible to pass other related information along the bucket number, such as information about virtual registers locations. When all the execution flags of the sources buckets are set within a bucket, then that bucket ready bit 855 is set and the bucket is ready to be dispatched and executed. When the bucket executes without any exception and it is ready to update the architecture state in the sequential order of the program, then it retires the bucket and the retirement thread pointer 857 is incremented to the next bucket in the array. The retired bucket location can be assigned to a new bucket.

Those closely related threads can all coexist inside the Matrix/bucket/block buffer; each thread will occupy an interval of consecutive buckets that belongs to that thread. The allocation pointer of that thread moves inside this interval of buckets in a round robin fashion fetching new instruction buckets and allocating them inside the thread interval in the described round robin fashion. With such interval sectioning, the whole bucket buffer is divided dynamically with different or equal interval lengths of buckets.

The concept of inheritance vector is introduced here for the instruction bucket as well as for the thread. Each instruction matrix/block/bucket writes into particular registers among the architectural registers. Each new bucket upon allocation stage updates this inheritance vector writing the thread and bucket number of its own into this vector leaving the fields for the registers that it does not write into unupdated. This bucket inheritance vector B_iv 856 is forwarded from each bucket to the next one in program order. In FIG. 8.b each matrix writes its own number into the architecture destination registers if the instructions in that matrix write into those registers, otherwise it inherits the value from the B_iv of the previous bucket in that thread.

Figure 9A:
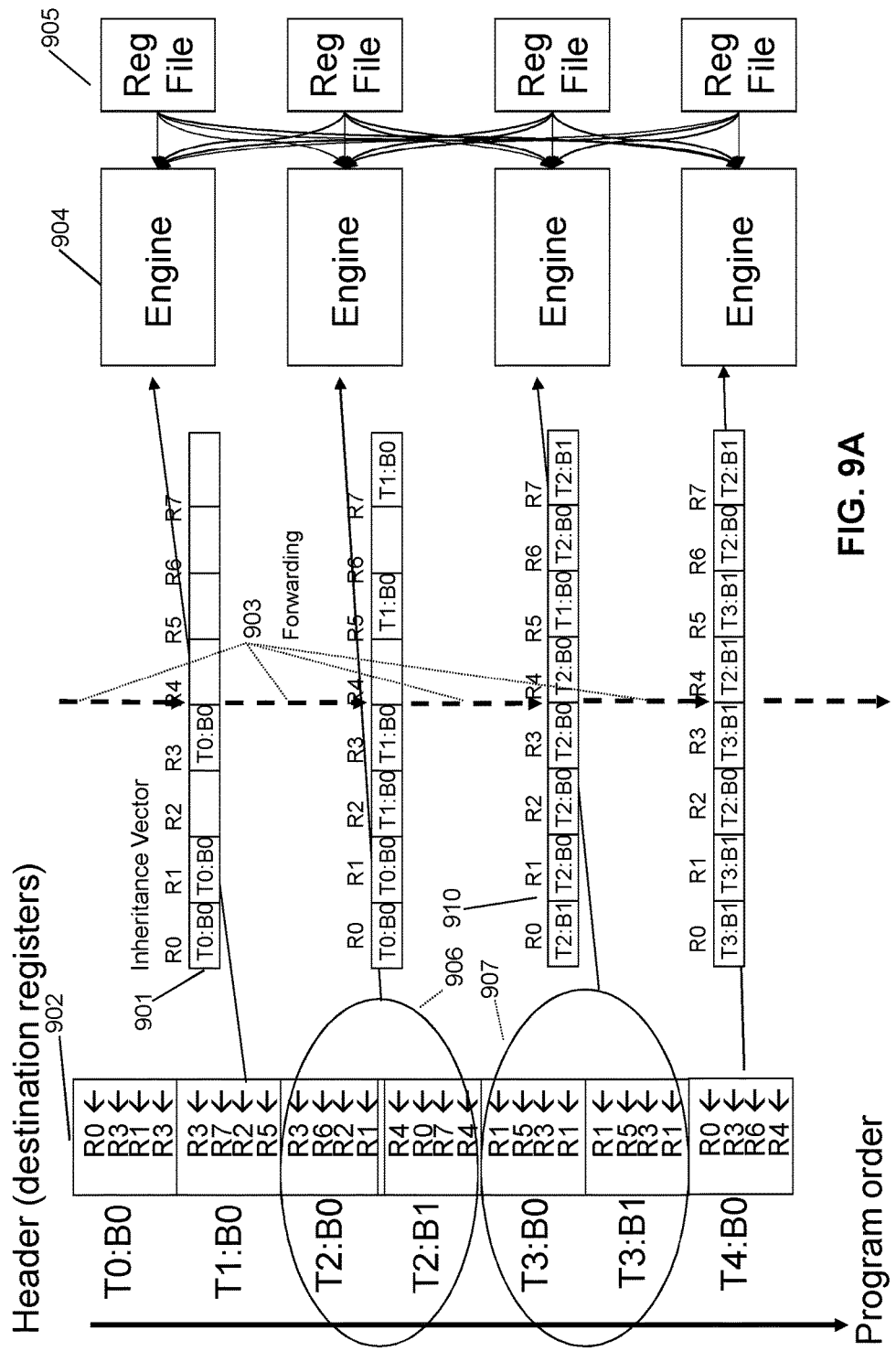
FIG. 9A illustrates a global front end and inheritance vector to enforce sequential consistency among threads across a group of cores in accordance with an embodiment of the invention.
Figure 9B:
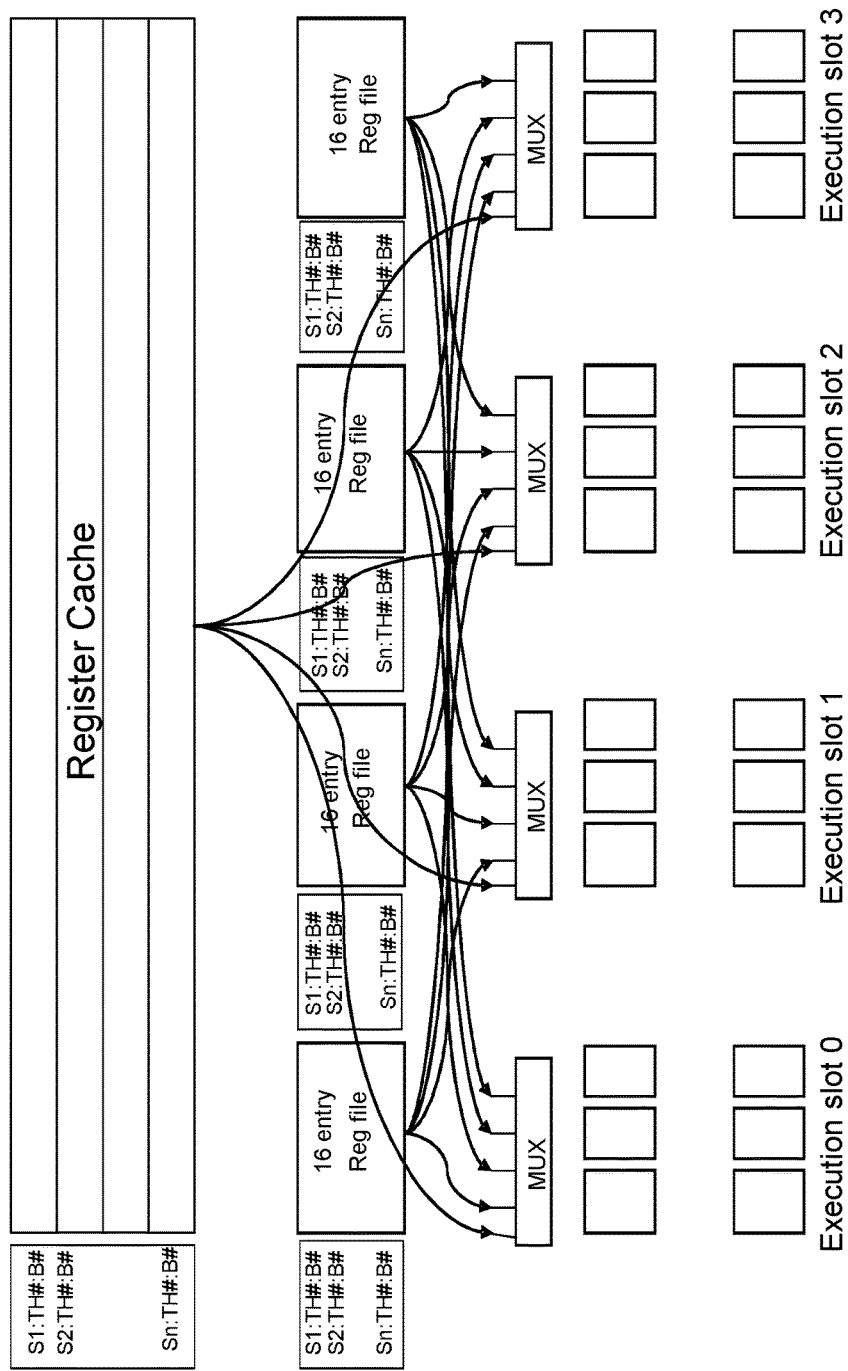
FIG. 9B illustrates register interconnect topology to allow inter-thread and intra-thread register communication across cores in accordance with an embodiment of the invention.
Figure 9C:
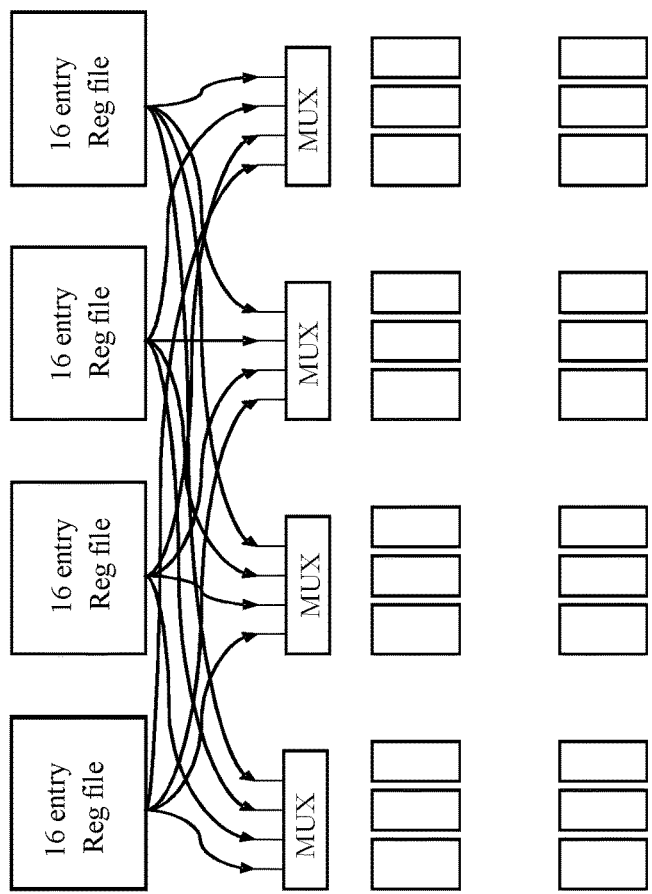
FIG. 9C illustrates a location based register referencing across a physically segmented architecturally unified register file in accordance with an embodiment of the invention.

This concept scales from a bucket buffer managing a small number of closely coupled threads into hardware circuits that manage multiple bucket buffers and threads as shown by way of implementation example in FIG. 9. Those circuits that can be expanded to process larger numbers of threads that might have less close interaction are describe as a global front end that process a thread header 902 but does not need to process the actual instructions within the thread to enforce the dependency check across those distant threads. The header of the thread and the sub headers of its buckets contain only information about the architecture registers that those threads and buckets writes into (destination registers of those instructions) no need in those headers to include actual instructions or sources of those instructions. Actually it is enough to list those destination registers or a bit vector where each individual bit is set for each register that is a destination for an instruction. The header does not need to be physically placed as a header for the instructions; it can be any formatted packet or compact representation or of the destination registers of the instructions within the threads, which may or may not be stored with the rest of the instructions information.

This global front-end fetches only the headers of the threads/blocks in program order and generates dynamic thread and/or bucket inheritance vectors 901 (Tiv and/or Biv). Each time a new thread is allocated, those inheritance vectors are forwarded by keeping the old fields that the current thread bucket will not write to or update as shown 903. Those inheritance vectors are distributed to a large number of engines/cores or processors 904 each of which might include a local front-end and a fetch unit (which will fetch and store the actual instructions produce the dependency vector for each bucket) and a local matrix/block/bucket buffer with local register files 905. The local front-ends then fetch the actual instructions and use the information from the inheritance vectors obtained from the global front end to fill the dependency information for the instruction sources of the instructions that are brought into those engines for execution. FIG. 9 illustrates a global front-end implementation and the way it disseminates the inheritance vectors to the different engines 904 using only concise information about the instructions (which is just the registers that those instructions write into). Other information that is of help to place in the header is that information about a change in the control path within or across the threads. A global branch predictor can be used to predict the flow of control across those threads. So such headers can include the branching destinations and offsets. In addition to the branch predictor to determine control flow, the hardware/compiler can decide to dispatch independent threads across the 2 control paths of a branch. In such case it will later merge the execution of those 2 paths using the inheritance vector as will be shown in FIG. 11. FIG. 9 also shows the forwarding process when a header of a new thread is fetched by the global front, thread 2 (906) for example will update the corresponding inheritance vector 901 that is forwarded to it resulting in vector 910 where registers 1,2,3,4,6,0 and 7 are updated with T2 labels. Note that in 910 register 5 was not written by T2 buckets and thus its label was inherited from a previous inheritance vector.

One interesting observation is that the register files allow cross communication among the cores/engines. An early request (to reduce the access latency) of the registers that are needed from cross engines can be placed as soon as the instruction buckets of the thread are fetched and allocated in the local bucket buffer at that time the source dependency information is populated such that cross engine threads references can be issued at that time probably long before the actual instructions are dispatched for execution. In any case, the instruction will not be dispatched until the cross referenced source is forwarded and arrived. This cross referenced source can be stored in the local multi-threaded register file or register cache. Although this cross referenced source can be stored in a buffer similar to the load store buffer (it can reuse the load store buffer physical storage and dependency check mechanisms but as a register load instead of memory load). Many topologies can be used to connect the register files across the engines/cores, which may be a ring topology or cross bar topology or mesh routed interconnect.

The following discussion can illustrate how register file segmentation can be used inside an engine and also across engines. When the bucket is dispatched, its sources are sent to both (simultaneously or sequentially) to the register file and the register cache. If the register file is physically unified and has direct support for threading, then the operand is read directly from the corresponding thread register section. If the register file is a virtual register, including a physically segmented register file that uses tags, then a tag match has to be done as a part of the virtual register read. If the tag matches, then the read happens from the segmented register file.

FIG. 9.*b* shows the overall virtual register file and register cache. It also shows the segmentation of the execution and the low level register files. A SIMD or MIMD instruction accesses the respective SIMD/MIMD register data segment in each section while a VLIW instruction accesses a different register in each segment independently. In threading mode, each section independently has separate instructions that access registers independently and can access cross segment registers in a unified view. More ways of how the threads can uses the register files hierarchies are shown in FIGS. 1-5

To allow for the option of keeping the instruction scheduling as composed by compiler auto parallelization or VLIW or SMID/MIMD composition without allowing the hardware to rearrange the section buckets independently, a locking mechanism is employed through the use of a bit or a flag that locks the 4 buckets together as a super bucket. If this bit or flag is set, then all the buckets within the super bucket (in this case 4 buckets) will execute in parallel within the same cycle. If the flag is not set, then those buckets are not locked to execute together and can be independently executed at various times.

Increased parallelism that results from threading or out-of-order execution or VLIW architectures puts huge pressure on the limited bandwidth register file. Usually register files are designed as a unified resource to allow access to all registers. Segmented register files have been designed before, but they have required handling of cross reads/writes at the architecture/software level, which prevents them from being utilized as a unified set of resources and adds overhead to the cross reads/writes.

Disclosed is register architecture that supports software threads, hardware generated threads, VLIW execution, SIMD & MIMD execution as well as emulation of out-of-order super-scalar execution. Although it is physically segmented, it looks as a unified architecture resource. This segmented register is part of the virtual register file which might include a register hierarchy and a register cache as well as mechanisms to store and check register tags. The tag access can be eliminated if we use a location based scheme that takes advantage of the dependency inheritance vector. The scheme works such that when the executed bucket number is broadcasted during dispatch stage all the sources of subsequent instructions perform a CAM (content addressable match) which compares their sources buckets with the just dispatched/executed bucket to set the ready flag for that source. Here the physical location of where that bucket executed can also be propagated along with the register number so that any ambiguity is resolved. For example in FIG. 9.*c* there are 4 register file segments, each contains 16 registers. For example upon dispatching a bucket #x to section 2 the bucket number x is broadcasted to the bucket buffer and also the segment #2 is broadcasted with it such that all sources that have a dependency on bucket x will record that it wrote all its registers in segment 2. When time comes to dispatch those instructions, they know that they need to read their register from segment 2 and not any other segment, even though the same register number exists in the other segments. This also applies to the register cache to avoid using tags. We can extend this concept to the global front end where in addition to the thread information the inheritance vector can specify in which engine the instruction bucket writing to this register was allocated.

The following is a description of an implementation of a unified dynamic execution architecture capable of issuing SIMD/MIMD, VLIW, ULIB bucket instructions as well as Dynamic and Static threading. The architecture also supports emulating a super scalar out-of-order implementation without the explicit support of out-of-order components. The invention may also encompass a physically segmented, architecturally unified register file and a possible register cache hierarchy.

Figure 10:
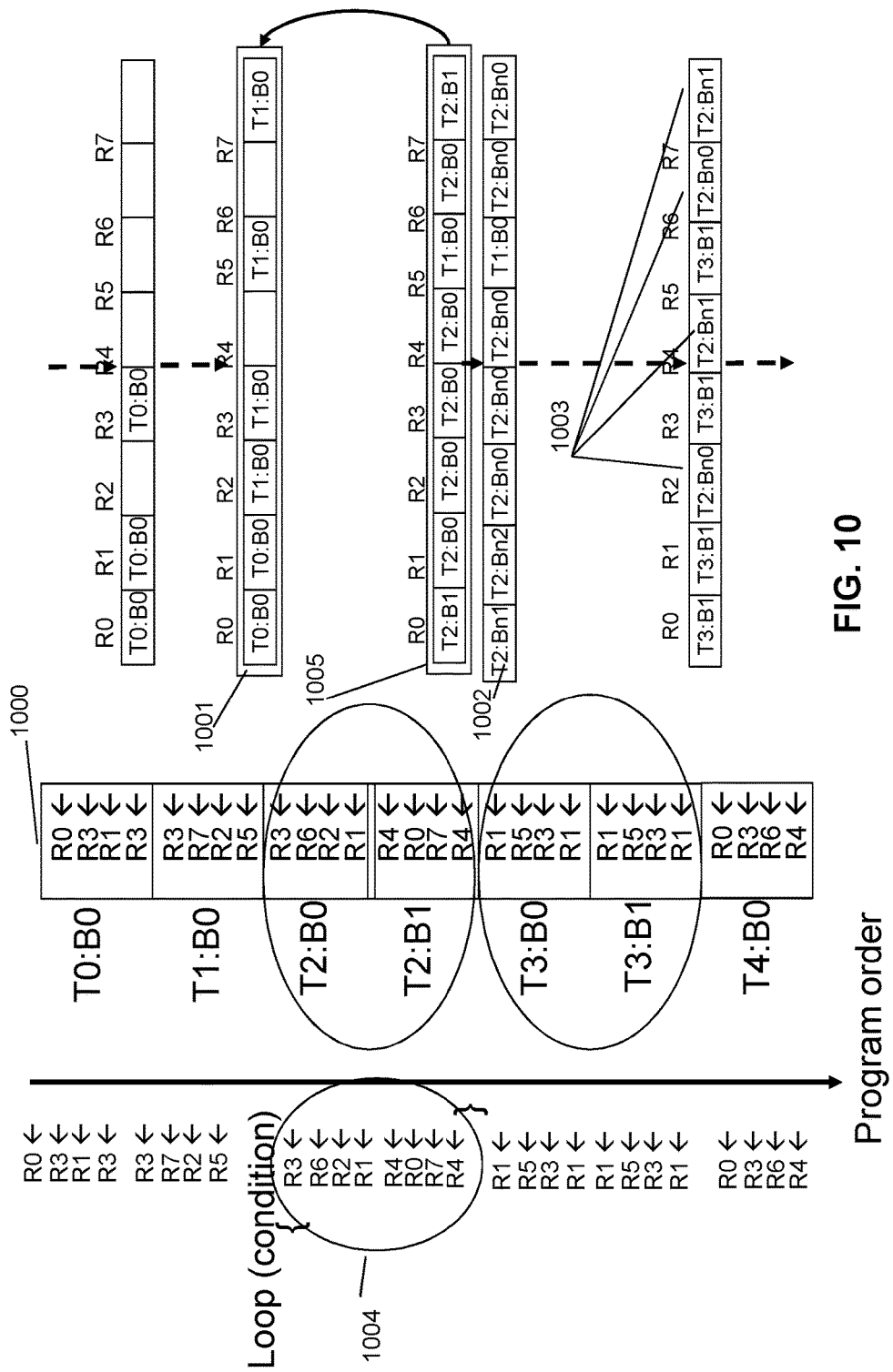
FIG. 10 illustrates a mechanism to automatically generate threads that span loop iterations and boundaries in accordance with an embodiment of the invention.

The disclosed techniques allow for both software initiated threads (static threads) as well as hardware generated threads (dynamic threads) to be executed using one unified method and implementation. As mentioned earlier, fine grain parallelism is hard to identify at the software static optimization level and thus the dynamic threading is a way that the hardware can generate this fine level parallelism by assigning dynamic thread contexts to software buckets, such as function calls, methods subroutines/procedures, independent object codes or parallel loops. This is accomplished with the disclosed implementation and method by reserving a few of the threads and their bit identification fields to the dynamic threads. For example, in the above implementation, the hardware dynamic threads can be assigned a subset thread group out of the "m" threads available. The hardware can use those allocated thread reservations to dynamically generate and/or issue hardware threads. For example, upon a function call or subroutine call (as indicated by an assembly "Call" instruction), the hardware can assign a new hardware thread to such call and eventually can claim back the thread reservation after the return function. The same can be said about loops where a hardware thread can be generated at the entrance of a loop (as indicated by an assembly "Loop" instruction) and can be reclaimed after the loop reaches its end instruction. Other instructions can also be used for possible hardware threading opportunities that map directly to software threading-applicable events, such as Object oriented method executions or object associated codes or any high level or object oriented programming thread opportunities. In all cases the synchronization of those threads can be resolved through register/bucket cross referencing and control flags, which can be tracked and resolved by the earlier described mechanisms. FIG. 10 illustrates how the hardware (or the compiler or run time system) can use the dynamic hardware threads to overlap execution of instructions in different regions around and within a loop body.

Again the thread header encapsulates the destination registers of each bucket within the loop body 1004 as well as the code outside the loop body. The hardware or the compiler in this case is allocating a thread T1 to the code before the loop body, and as an example only one thread to the loop body T2 (multiple threads can be assigned to the loop body by splitting the loop into multiple iterations to the extent where each loop iteration can be assigned to a thread, the amount of loop threading is a dynamic decision that can be decided at run time or based on compiler analysis) while the code after the loop is assigned to thread T3.

Note that the inheritance vector 1005 generated by the buckets of the loop body feeding back to the loop body itself T2 is slightly different from that inheritance vector 1005 forwarded to the thread outside the loop body T3. This is because T3 needs the last copy of the registers iterated on by the loop, this last copy is indicated in the inheritance vector 1002 by n. When the last iteration of the loop is reached then all the buckets in that last iteration carries a flag n that is set as a part of the bucket number (i.e., most significant bit).

T3 registers that depend on the loop body of T2 will depend on this last iteration n of the iterative loop of T2. This is what will also be recorded in the forwarded inheritance vector for T3. The assumption here is that T2 does not have any control path internally that changes the update of the loop registers to be at a different iteration instead of the last iteration, predication can be used to resolve such control path if it exists internal to the loop body. The identifier n can be carried and forwarded as a part of the inheritance vector as in 1003. It basically refers to the buckets that compose the last iteration of the loop. In addition, these dynamic threads can be assigned to branching code (the code that follows a branch or a control change).

Figure 11A:
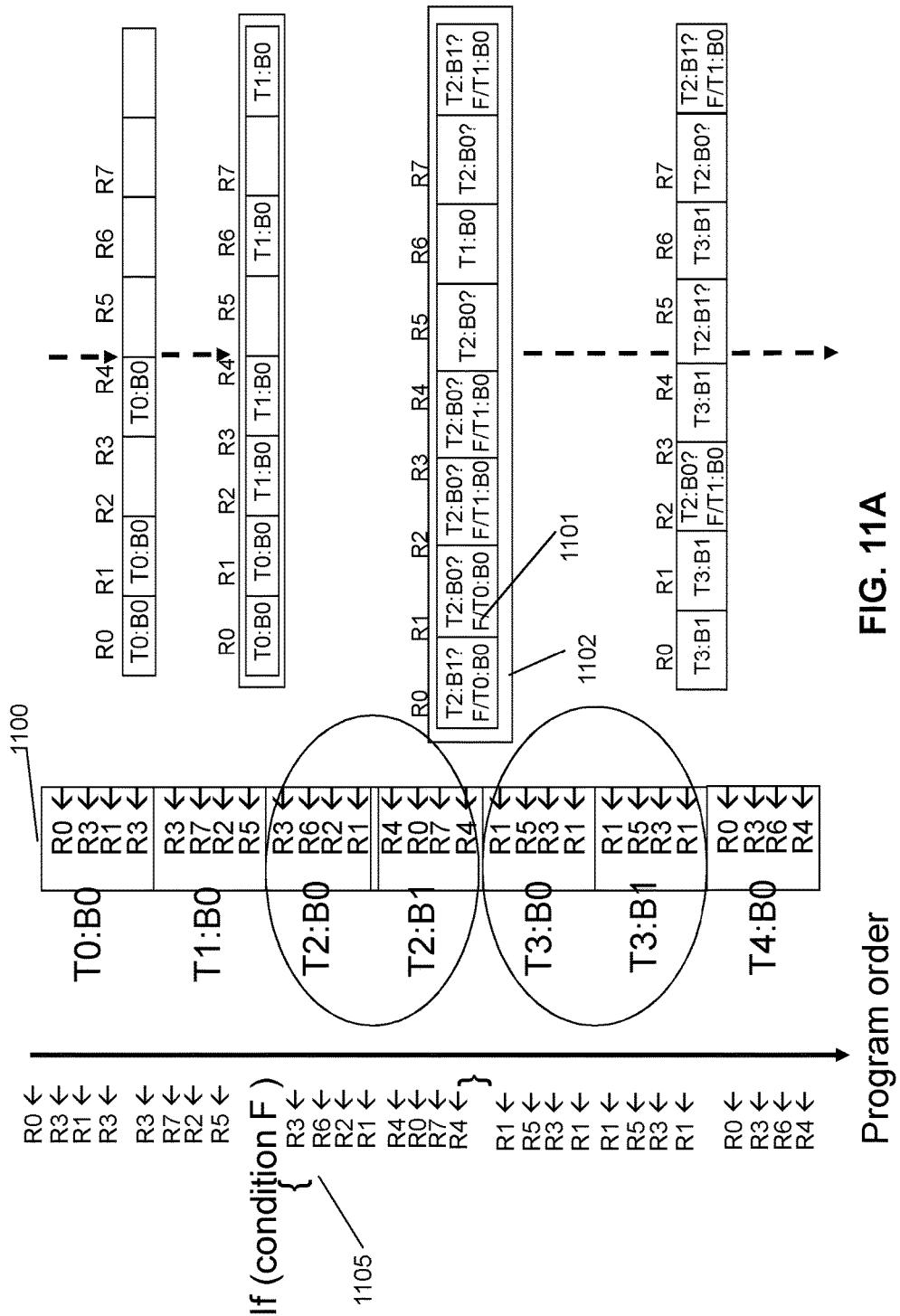
FIG. 11A illustrates mechanism to automatically generate threads that span across control paths in accordance with an embodiment of the invention.
Figure 11B:
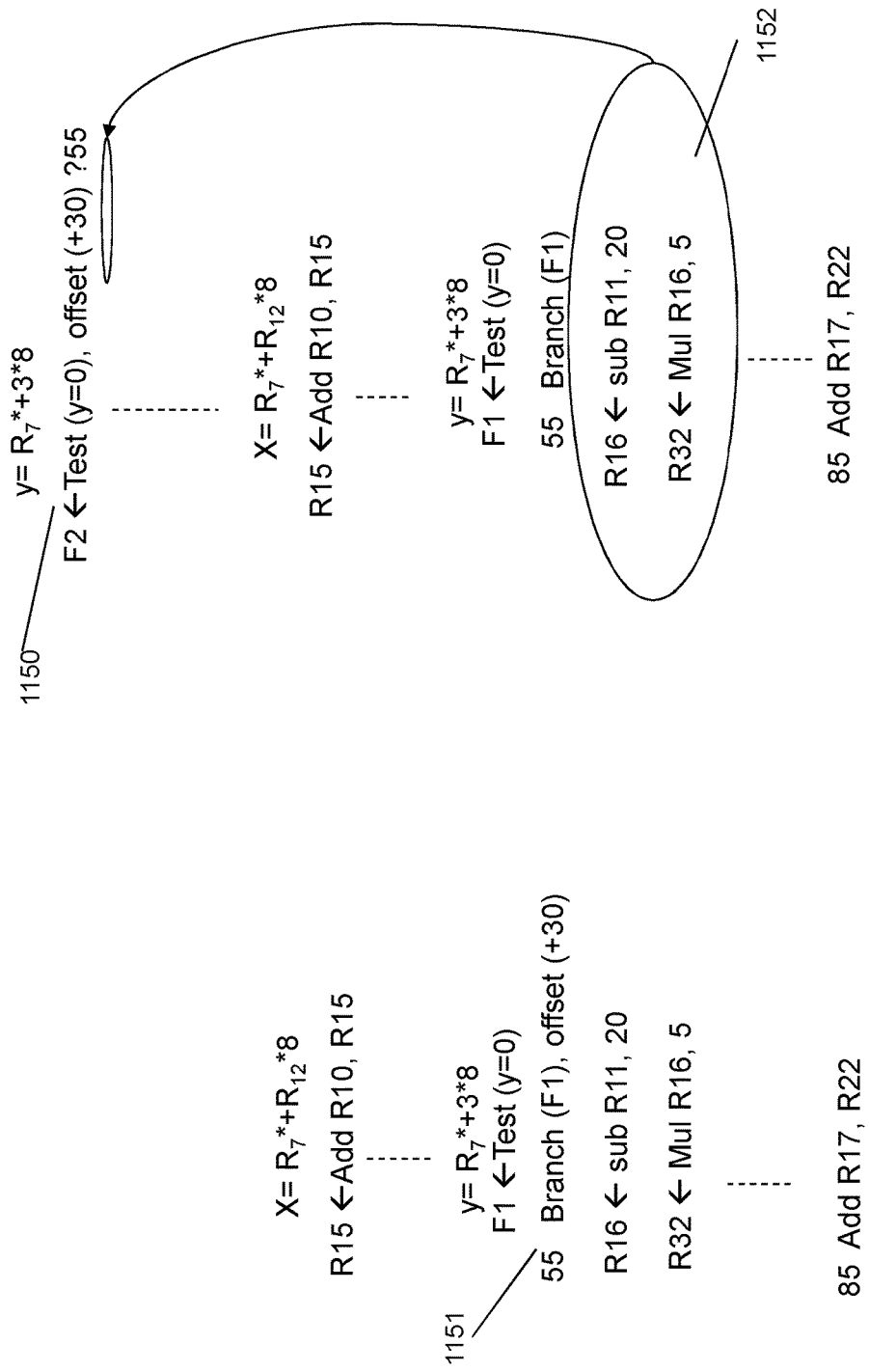
FIG. 11B illustrates test and branch instruction processing in accordance with an embodiment of the invention.

The technique can be used to issue 2 threads, one along each of the 2 possibilities of a branch. In such a case, one of the threads commits and the other is thrown away once the branch is resolved architecturally. To take care of the case where the 2 different control paths affect different registers, the inheritance forwarding vector will specify the flag condition F that the inheritance will embed into its bucket number field 1101. In this case, each source in the dependent buckets on this control path will specify the condition flag within the inheritance vector 1102 for those source registers that are impacted by the variable path of control. The flag will be broadcasted with the bucket number that executes/resolves that flag to all dependent buckets during the CAM dispatch match. This is illustrated in FIG. 11. The flag means that the distant buckets do not yet know (till the flag condition is executed and resolved) which thread will forward a particular register value they need. The threads along the 2 possible paths of the branch continue executing along their paths till the flag is resolved and one of them (along the miss predicted path) will be destroyed. But during the execution along those 2 paths, many other buckets following the branch have been fetched and allocated and their inheritance vector forwarded. Those need the flag so that they can substitute it (while waiting for their dependency to resolve) with the right bucket number from the thread of control along the correct path of execution. Note that we also can take advantage of the thread and bucket header to find out the needed information.

Another innovation is the inclusion of a flag field within each architecture register, such that each architecture or physical register has a flag field as part of the visible state. This allows for a simple predication mechanism for conditional execution of an instruction and the ability to easily create delay slots for branch instructions. For example, in a loop, the test instruction that tests the loop end condition has to be preceding the branch instruction with no other flag modifying instructions in between. Using the register flag field, and by specifying that this branch depends on the flag of a particular register (the destination of the test instruction in this example), the test condition could be placed at the beginning of the loop while the actual branch can be at the end of the loop. Therefore, by the time the branch instruction is at the front end of the machine, the test instruction has already been executed and the branch can execute at the front end stage rather than at the execution stage, thus removing bubbles. Those register flags also facilitate simple instruction predication or thread predication, where instructions or instructions in a particular thread can be predicated based upon the result of a particular instruction that does not need to be preceding it immediately in the execution sequence. This is illustrated in FIG. 11.b. The test instruction 1150 is executed ahead of where the branch is. Based on its result it will fetch the right path of the program instructions and keep them aside until the branch instruction 1151 is allocated at the front end and then it feeds those instructions in the pipeline. It is possible also for this architecture to predicate the instructions after the branch 1152 and execute them before the branch and uses a conditional move after executing the branch. It is also possible to issue 2 threads alongside the 2 possible control paths of execution as illustrated in FIG. 11.*b*.

Moreover as shown in FIG. 11.*b*, the test instruction 1150 can execute speculatively even if its sources are speculative or predicted by the hardware or the compiler, but it writes into a speculative flag F2, when the actual test instruction that precedes the branch 1151 executes it writes into the flag F1, at that point the 2 flags are compared and if they match the speculative thread of execution that started with the test instruction 1150 then that thread continues as being on the correct control path, while the other thread stops fetching instructions using the inheritance merging mechanism shown in FIG. 11.*a*. In the case the flags do not match, then the other thread continues fetching and the thread of the early test stops. This allows for thread speculation and fast recovery from miss speculation (no latency penalty for early speculation of branches).

The handling of memory cross referencing by threads is another key element in the thread auto generation and auto synchronization. Those references are made using memory accesses by loads and stores.

Figure 12:
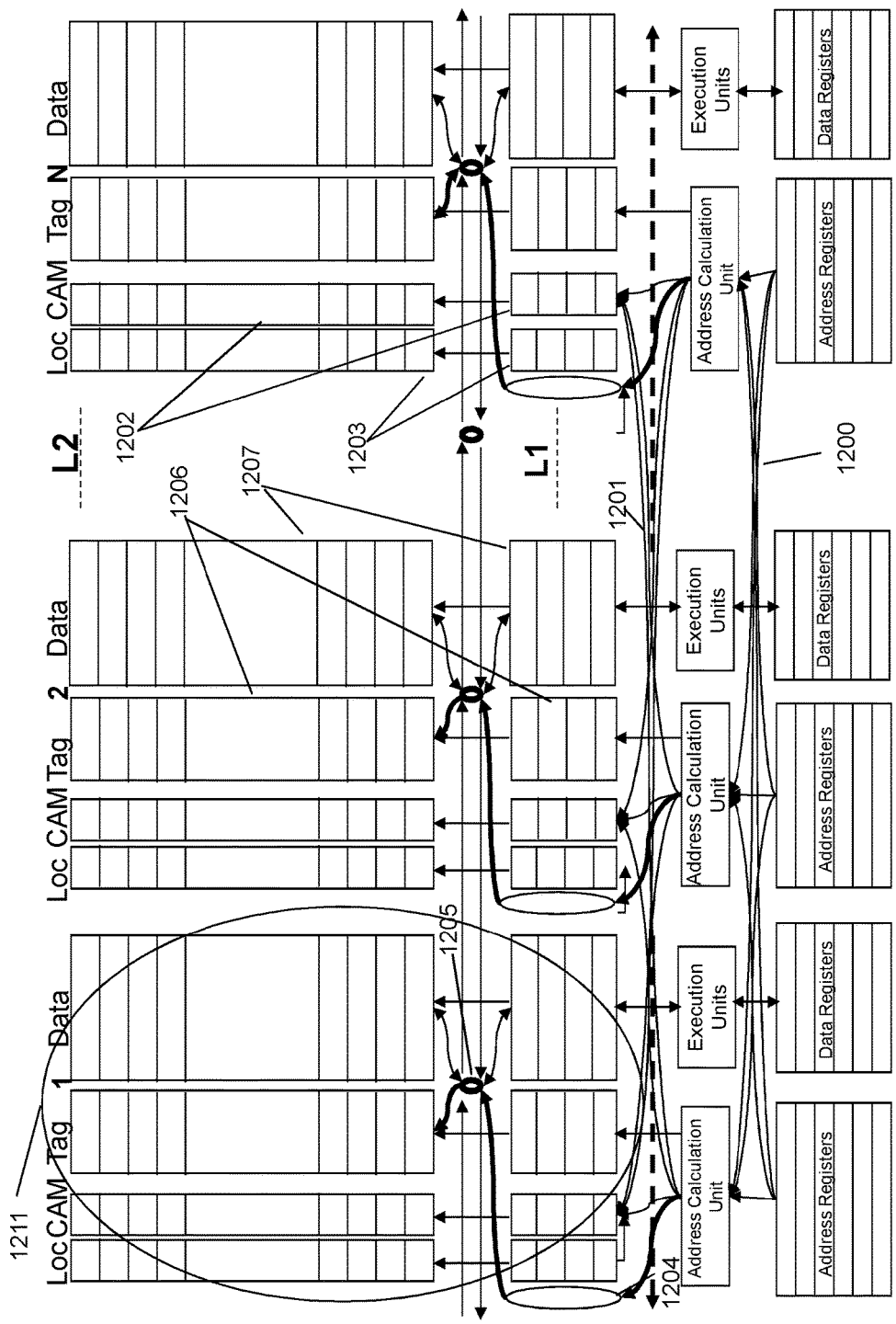
FIG. 12 illustrates a segmented/distributed cache with separate tag and data arrays utilized in accordance with an embodiment of the invention.

In FIG. 12 we show a comprehensive scheme and implementation of the synchronization scheme among threads and/or among loads and stores in general. The scheme describes a preferred method for synchronization and disambiguation of memory references across load/store architectures and/or across memory references and/or threads' memory accesses. In FIG. 12, we show multiple segments of register files (address and or data registers), execution units, address calculation units, level 1 caches and/or load store buffers and level 2 caches and address register interconnects 1200 and address calculation unit interconnects 1201. Those segmented elements could be constructed within one core/processor by segmenting and distributing its centralized resources into several engines or they can be constructed from elements of different cores/processors in multi-core/multi-processor configurations. One of those segments 1211 is shown in the figure as segment number 1; the segments can be scaled to a large number (in general to N segments as shown in the figure).

This mechanism also serves also as a coherency scheme for the memory architecture among those engines/cores/processors. This scheme starts by an address request from one of the address calculation units in one segment/core/processor. For example, assume the address is requested by segment 1 (1211). It can obtain and calculate its address using address registers that belong to its own segment and or from registers across other segments using the address interconnect bus 1200. After calculating the address it creates the reference address of either 32-bit address or 64-bit address that is used to access caches and memory. This address is usually fragmented into a tag field and a set and line fields. This particular segment/engine/core will store the address into its load store buffer and/or L1 and/or L2 address arrays 1202, at the same time it will create a compressed version of the tag (with smaller number of bits than the original tag field of the address) by using a compression technique. More the different segments/engines/cores/processors will use the set field or a subset of the set field as an index to identify which segment/core/processor the address is maintained in. This indexing of the segments by the address set field bits ensures exclusiveness of ownership of the address in a particular segment/core/engine even though the memory data that corresponds to that address can live in another or multiple other segments/engines/cores/processors. Even though the address CAM/tag arrays 1202/1206 are shown in each segment to be coupled with the data arrays 1207, they might be only coupled in physical proximity of placement and layout or even by the fact that both belongs to a particular engine/core/processor, but there is no relation between addresses kept in the address arrays and the data in the data arrays inside one segment. After the compressed address tag is formed, the set's field bits are used to identify the particular address CAM array 1202 that the request will be addressed to. Let us assume that it turned out that those set field bits identified segment/engine/core/processor N as the one that owns that address scope, then the compressed tag is sent to that segment/engine/core/processor (segment N) L1 CAM and/or corresponding L2 CAM arrays that will then perform Content address match (CAM) between the incoming compressed tag and the compressed tags it stores in its array. Since this is a compressed tag the CAM array width is minimal and thus we can afford to build a Cam array that has a similar number of entries to the data array (usually CAM arrays are very expensive and power hungry). After the CAM match is done it can result in hit or a miss or multiple hits (a good compression technique should reduce the number of multiple hits) Then in a case of hit/multiple hits the Loc array (location array) 1203 corresponding to the CAM hit entry in segment N is read to identify the location of the memory data that belongs to this address CAM hit. This location is sent back to the requesting address calculation unit in requesting segment (in this example segment 1). That address calculation unit request buffer 1204 sends the full address to the Address/Tag array of that location 1206 using the address bus of the interconnect 1205. Then a tag look up and compare is performed to ensure a confirmed/unique hit. Then if the hit is confirmed the data is returned using the data bus of interconnect 1205. If a miss happened in either the CAM or the complete Tag array, a request to the main memory is put on behalf of the requesting segment. It is possible also to cut the latency more and send the full address to the segment that owns that address scope (using the set field bits as an index) as described before, and at that segment the compressed tag is formed and accesses the CAM array first while the full address is held there till the result of the CAM is checked and the location array 1203 is read to identify the entry numbers in the tag array 1206 that was a hit in the compressed tag 1202. Then the full compare is done on the full address using comparators as opposed to the CAM. The implementation of the CAM array 1202 does not really need to be performing a CAM, since this compare is to be done on few bits that are obtained from the full tag and compressed, the CAM array can be implemented as a direct indexed memory array (RAM) or register file, for example if the compressed tag is formed as an 8-bit word then the whole CAM array of each segment can be constructed as a 256 entry RAM array, when the 8-bit compressed tag comes it directly gets decoded to read one of the 256 entries of the Location array 1202 (in reality for such case of 8-bit compressed tag, the CAM array does not need to exist as a physical array), it actually only need to be used as the decoder for the location array 1203.

Next we will describe a scheme that defines memory latency reduction by issuing memory loads a head of time without increasing register pressure by defining transient storage variables called "Temp" and "Chain". Temp is used only once to allow an instruction to refer to a location in memory and prefetch it to a particular location in the cache buffer. This is different from typical schemes of data prefetching to the cache because with Temps and chains there is a direct 1 to 1 mapping between the Temp prefetched value and its consuming instruction; similar to what a register assignment might achieve. On the contrary, in typical cache prefetching schemes the memory data is prefetched into an address location in the cache, the consuming instruction can only reference this prefetched data by its memory address. Which Is not known to the scheduler of the consuming instruction, thus the consumer instruction has no control over finding the data when it executes. In the case of the new Temp and chain schemes described here, the memory data is brought into the cache buffer (loaded into the cache) and is assigned a name "e.g. Temp0", the consuming instruction of this loaded data can now refer explicitly the Temp 0 name and expect to find it in the Temp 0 location with absolute guarantee when it executes. Because the Temp number is indicated as a source of dependency in the consuming instruction, thus the scheduler will not issue that instruction until the Temp is valid (the data was actually loaded from higher level caches or memory) similar to what happens when a memory value is loaded into a register. This has an extra benefit beside precise prefetching (1 to 1 mapping) and precise scheduling of the consuming instruction which is allowing for variable latency distributed caches as shown in FIG. 12.

To prevent destruction of the Temp and Chain before their consumer instructions freed them, the compiler will ensure that it will not reassign that register until its consumer instruction consumes it.

There are a few differences between a register assignment and Temp assignment; the Temp is used to bring the needed data into a transient location in the Cache buffer that get automatically de-allocated upon the consumption of that value by the consuming instruction (the instruction that references that transient location), this will insure that the live range of this temp is short and thus it is used very efficiently. One way the Temp can be assigned in a program is through using a label that goes with the load address calculation instruction (or with the address calculation instruction bucket) i.e.:

Label Temp0: Load@Address (R5, R2, offset)

. . .

. . .

R10←R17, Temp0

The labels for the temps that are to be used within a code segment or function must be allocated before they are used. So if the compiler is intending to use 10 Temp locations for prefetching its data, it should use an allocate instruction/ routine that allocates those Temp locations in the cache/ buffer. After each instruction consumes its Temp, the Temp location will be free. The hardware can reallocate those Temp locations/labels for another function through a context switch; this is possible by making the cache/buffer that stores the Temp data allocated with thread ID tagging. The hardware will assign a new thread ID and new Temp locations upon encountering the Label allocate instruction of the new function. If there is no space to occupy for a new thread in the cache/buffer, then during the execution of the allocate instruction/routine, the temp locations that are not free (because their instructions did not consume them yet) will get saved/stored in memory with the rest of the old thread context that is being switched. Those Temp data need to be restored and loaded back when that old thread context is brought back to continue execution. This will take care of unexpected executions of context switch (e.g. upon a call to an exception handler or a system call).

Chains are similar to Temps with 2 differences: the chain is a sequence of locations as oppose to just one, secondly the whole chain is labeled with one label no matter how many elements "locations" it has. Chain needs to be allocated using an allocation instruction/routine similar to the temp. Similarly, upon executing this allocate instruction if there is no new thread space for that chain in the cache/buffer that can be assigned to the new thread chain then that particular chain elements are checked to see which ones are already freed (because their consuming instructions used them) the ones that are not freed will be saved to memory and the new thread chain can use that space.

Figure 13A:
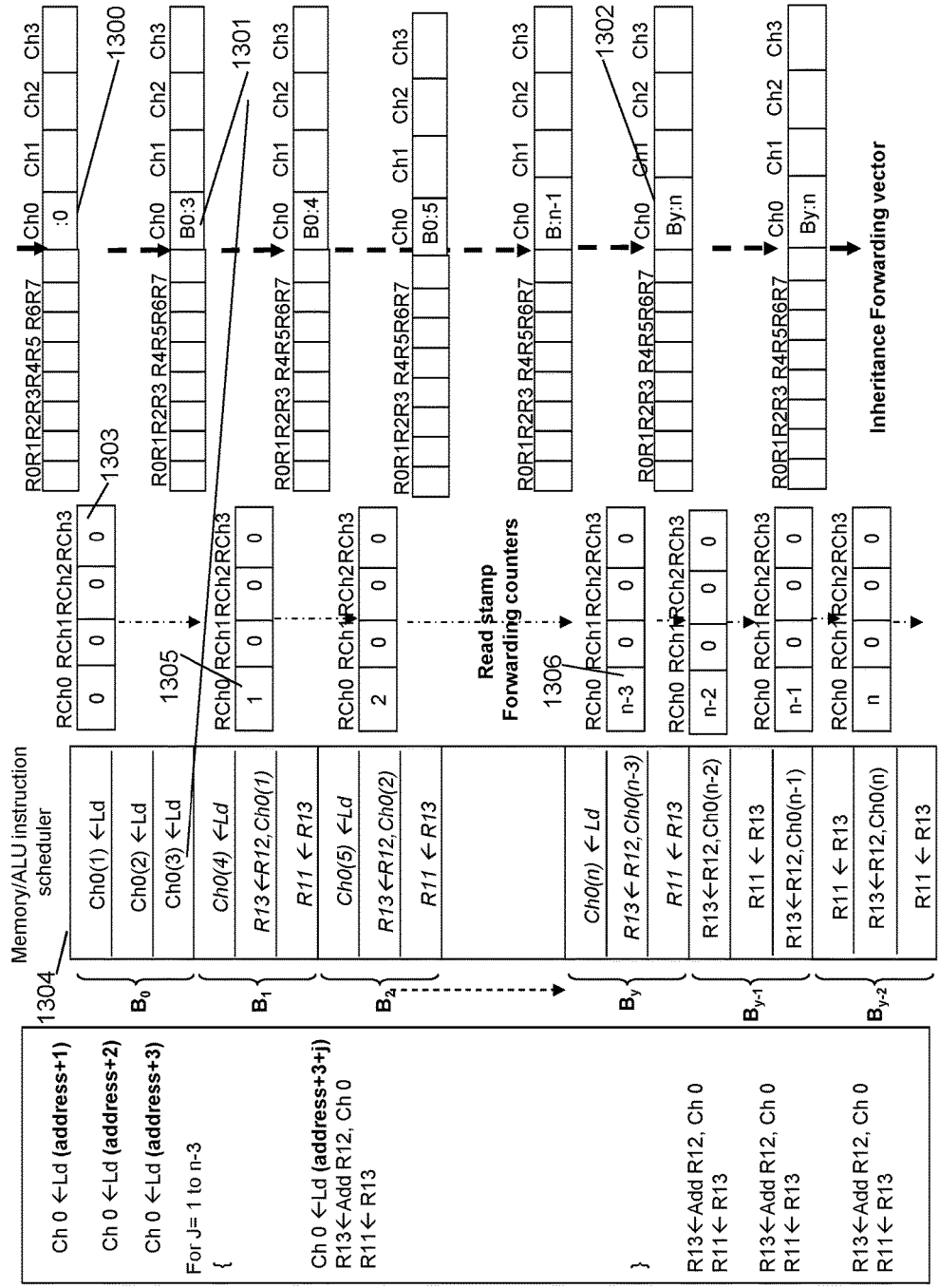
FIG. 13A illustrates a mapping mechanism to enable precise scheduling between a pre-fetch instruction and its load consuming instruction.
Figure 13B:
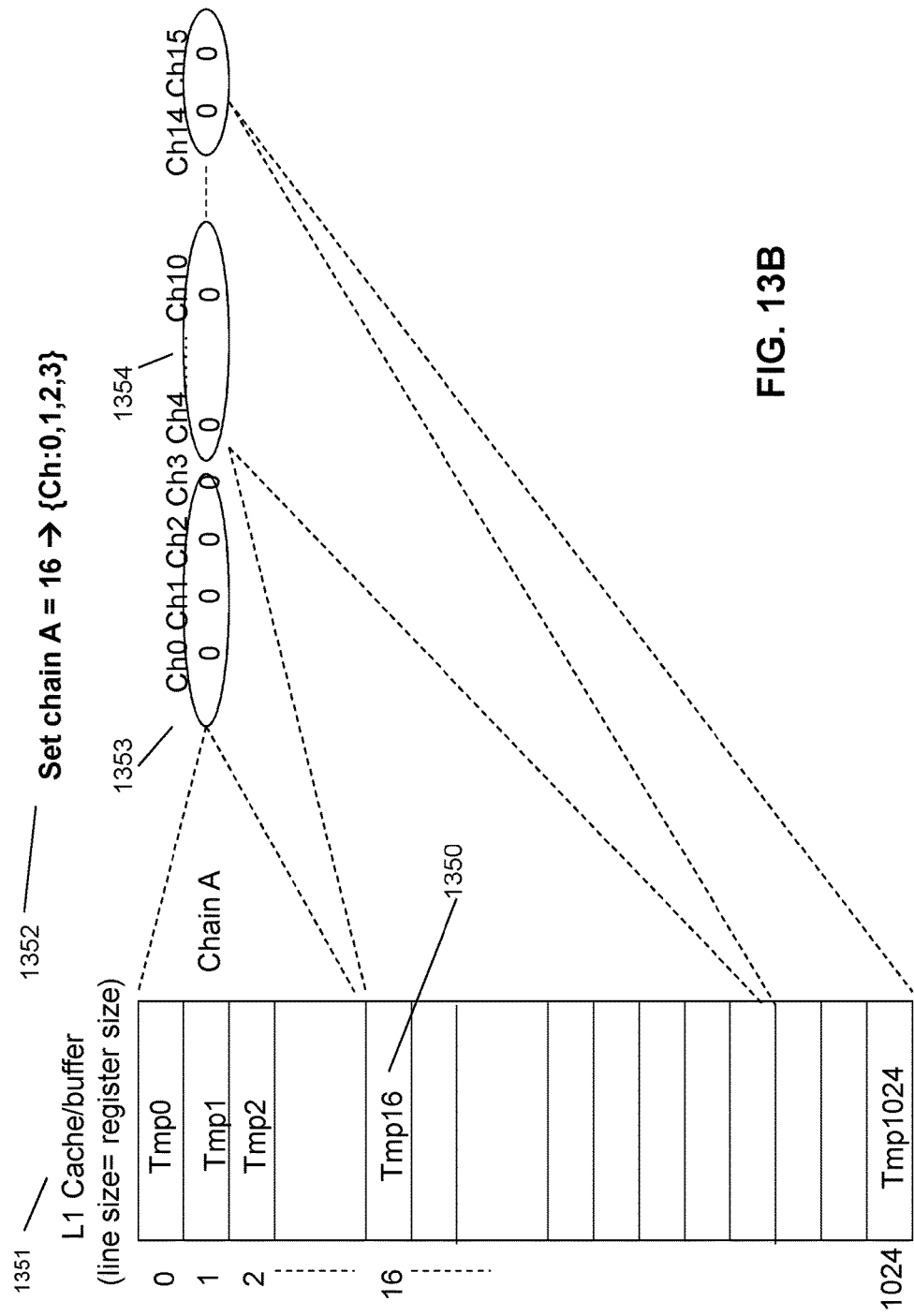
FIG. 13B illustrates dynamic allocation of temps and chains to physical storage by virtualizing hardware storage in accordance with an embodiment of the invention.

Chains allows to create a 1 to 1 mapping between a list of prefetching/loading instructions and the consuming instructions to allow obtaining an effect similar to having a register with a variable name number e.g. R(i). This is useful in accessing arrays inside loops where the chain can start prefetching the values inside the loop long before the consuming instruction in the loop need them. But without creating a register pressure. A cache structure or cache buffer can be used to store those Temp and chain elements. FIG. 13 shows an implementation for such concept in an out of order execution style. We show here again an instruction scheduler/block buffer 1304 and the forwarding inheritance vector. Once a chain is allocated it has its write counter 1300 in the inheritance vector reset to zero. With each new assignment through a load to the chain, the write counter is incremented and thus the destination element in each instruction that writes to the chain element will get this new incremented number e.g. after 3 assignments to load three memory locations into the cache buffer, the counter value will be three 1301. Inside the loop code and for each iteration of the loop, with every chain load instruction, the write counter will continue incrementing; those unrolled dynamic instructions that load into the chain will have those incremented numbers. On the consuming instruction side there is a read counter 1303 that also keep incrementing upon encountering each consuming instruction that read from a chain element. E.g. the first instruction to reference chain 0 to read its first element will increment the read counter from 0 to 1, then the next consuming instruction to read from the chain will increment the counter to 2 and thus it knows that it need to read from chain 0 $2^{nd}$ element. This scheme of write counters and read counters will ensure implicit synchronization between the loads of the chain elements and their consuming instructions without really relying on the actual address of the load. This will have a similar impact of having a variable register index e.g., R(i).

FIG. 13.b shows how the entries (e.g., Temp 16 shown as 1350) in the Cache or buffer 1351 can be dynamically assigned to the Temps and chains depending on the allocating instruction 1352 inserted by the compiler/hardware. In the figure chain A is assigned to hardware chains 0,1,2,3 (each having 4 locations in the buffer) by combining their storage 1353, thus chain A is allocated 16 entries in total). Shown in the figure how also the storage of chains and Temps are overlaid on top of each other, thus the storage can be assigned to one or the other at the same time.

Figure 14:
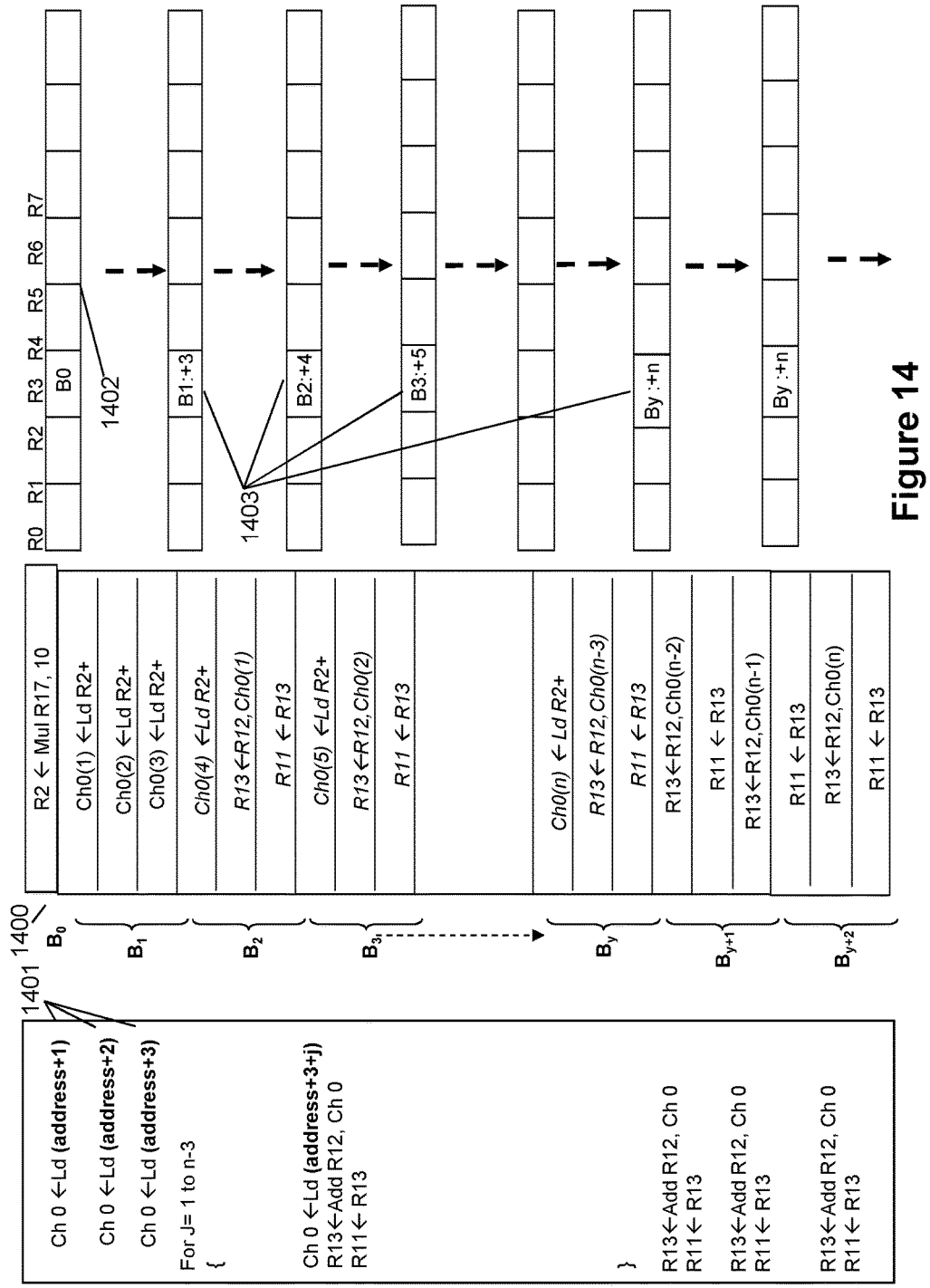
FIG. 14 illustrates a counter mechanism in a scheduler vector to enable renaming of address registers without the need for extra physical registers, as utilized in accordance with an embodiment of the invention.

FIG. 14 describes a mechanism to provide out of order execution to calculating the memory addresses using address registers but without excessive storage space needed to rename those address registers. The scheme takes advantage of the fact the address registers are usually updated by incrementing or decrementing them 1400, while the full memory address can be constructed by adding and scaling multiple of these address registers to form the full address (e.g. adding a base register to the index register and using a scaling factor and an offset). The scheme use the hardware scheduler/instruction bucket buffer 1401 and the inheritance vector 1402 to store the increment/decrement counter 1403, (i.e. every time an address register is incremented or decremented the inheritance vector notes the instruction/bucket that made that update and keeps track of the counter 1403 of the increment/decrement events inside the scheduler/bucket buffer. There will be only one actual physical address register per each address register name, (so no multiple physical registers that refers to the same register name as used in typical renaming schemes). To load other values or perform updates other than incrementing or decrementing the address register then the regular data registers must be used (since they are renamed and can store multiple versions of a register name and values). A copy of the data register will be sent to the one address register upon executing such involved update instruction and then thereafter, the address register can be incremented or decremented as described using the inheritance vector to keep track of the updates.

Figure 15:
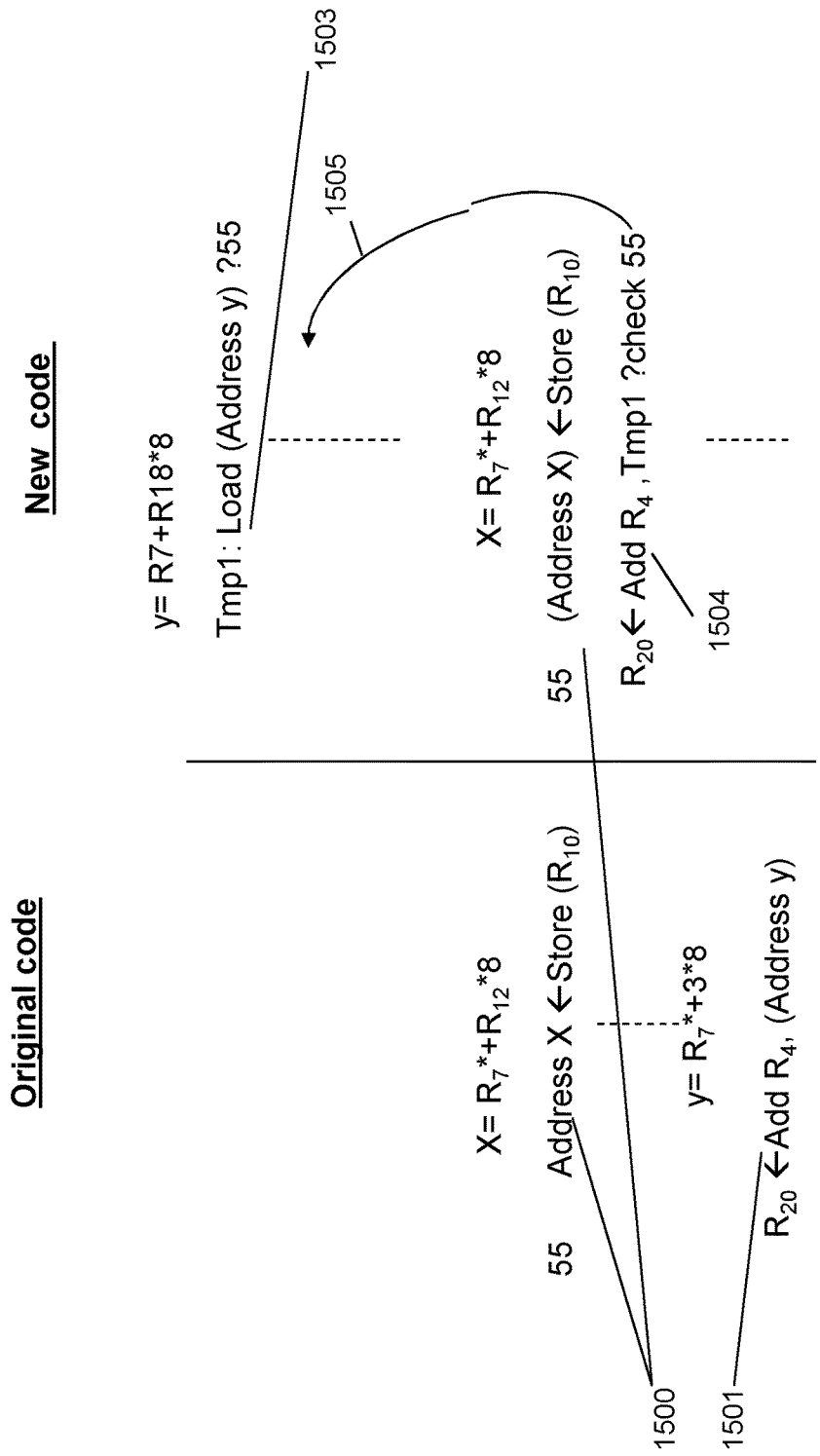
FIG. 15 illustrates a bypass and check mechanism implemented in accordance with an embodiment of the invention.

FIG. 15 extends the load usage to allow speculative prefetching/loading of the data passing earlier store instructions 1500 (those stores that precede loads in the program order), The scheme uses a qualifier in the Temp assigning instruction 1503 (the prefetch/load instruction). This temp assigning/prefetch instruction brings the data into the transient location in the cache it does not perform any ordering checks on the address (finding out id the address of the load matches that of a store that did not execute yet. This order check is done to prevent the load from bringing data from memory that is not yet updated by a store that precedes the load in sequential execution). The ordering check will be performed when the consuming instruction 1504 executes, at that point if the ordering check finds that the address of the prefetch is loading from the same address of the preceding store the consuming instruction 1504 will use a bypass mechanism to get the store value instead of the Temp value. The bypass mechanism can be implemented along the order checking process performed as part of the execution phase of the consuming instruction 1504 by inspecting the store buffer for a matching address and if one is found for an earlier store that was executed after the temp instruction loaded data from memory then the value of that store will be bypassed to the consuming instruction instead of the temp value. The consuming instruction itself can be executed speculatively ahead of the store instruction by using the same thread control speculation that we discussed in FIG. 11 by issuing and conditionally executing a prefetch/load thread on the ordering check that can be made explicitly or implicitly upon the execution of the preceding store 1500.

We showed throughout this invention description by way of example the implementation schemes using Temp, chains and instruction buckets but the schemes that we described can be applied to loads or single instructions in general.

Also the synchronization and coherency schemes that we illustrated does not only apply to distributed caches or separate address register files, they can also be used with centralized caches among different processors and they can also be used partially or by trivial modifications to the schemes.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A system to implement a multiple thread architecture, the system comprising:
   an execution bucket; and
   a register file hierarchy configured to support high bandwidth small capacity register files adjacent the execution bucket and lower bandwidth and larger capacity register files removed from the execution bucket, wherein the register file hierarchy includes a level that is configured to store virtual copies of a register set that is supported by an instruction set architecture for a plurality of contexts.

2. The system of claim 1, further comprising:
   a thread allocation pointer array coupled to the execution bucket, the thread allocation pointer array to store pointers to a set of buckets that a thread is allowed to place blocks of instructions into.

3. The system of claim 1, further comprising:
   a bucket retirement array coupled to the execution bucket, the bucket retirement array to store a retirement thread point that is incremented to a next bucket in the execution bucket upon retirement of each bucket.

4. The system of claim 1, wherein the register file hierarchy includes the register set that is supported by the instruction set architecture.

5. A system to support a context switch architecture, the system comprising:
   context switch circuitry to support capture of current state information; and
   a context storage mechanism configured to simultaneously store a portion of the current state information and a portion of previous state information during an incremental context switch.

6. The system of claim 5, wherein the context storage mechanism is a last in first out (LIFO) storage mechanism.

7. The system of claim 5, wherein the context switch circuitry switches registers that are not shared amongst multiple threads.

8. The system of claim 7, wherein the context switch circuitry maintaining registers that are shared between multiple threads during a context switch.

9. The system of claim 7, wherein a register is context switched when a next context attempts to access the register and the register contains an old context.

10. The system of claim 7, wherein multiple registers with a same register number from different contexts are differentiated by a context identifier.

11. The system of claim 7, wherein registers associated with static threads are not updated during a context switch.

12. The system of claim 11, wherein registers associated with dynamic threads are updated during a context switch.

* * * * *